United States Patent
Hsu

(10) Patent No.: US 7,741,898 B2
(45) Date of Patent: Jun. 22, 2010

(54) CHARGE PUMP CIRCUIT FOR HIGH VOLTAGE GENERATION

(75) Inventor: Jen-Shou Hsu, Hsinchu (TW)

(73) Assignee: Etron Technology, Inc., Hsin-Chu (TW)

( * ) Notice: Subject to any disclaimer, the term of this patent is extended or adjusted under 35 U.S.C. 154(b) by 329 days.

(21) Appl. No.: 11/656,733

(22) Filed: Jan. 23, 2007

(65) Prior Publication Data

US 2008/0174360 A1  Jul. 24, 2008

(51) Int. Cl.
*G05F 3/08* (2006.01)
*H02M 3/16* (2006.01)

(52) U.S. Cl. ................ 327/536; 327/537; 363/60
(58) Field of Classification Search ............... None
See application file for complete search history.

(56) References Cited

U.S. PATENT DOCUMENTS

| | | | | |
|---|---|---|---|---|
| 5,343,088 | A * | 8/1994 | Jeon ................... | 327/536 |
| 5,886,887 | A | 3/1999 | Jenq | |
| 6,501,325 | B1 | 12/2002 | Meng | |
| 6,646,493 | B2 * | 11/2003 | Butler ................. | 327/536 |
| 6,734,717 | B2 | 5/2004 | Min | |
| 6,878,981 | B2 * | 4/2005 | Eshel .................. | 257/299 |
| 6,952,129 | B2 * | 10/2005 | Lin et al. ............. | 327/536 |
| 7,023,260 | B2 | 4/2006 | Thorp et al. | |
| 7,030,683 | B2 | 4/2006 | Pan et al. | |
| 2007/0096796 | A1 * | 5/2007 | Firmansyah et al. .... | 327/536 |

OTHER PUBLICATIONS

Dickson CP circuit proposed by J. Dickson in IEEE Journal of Solid-State Circuits (see J. F. Dickson, "On-Chip High-Voltage Generation in MNOS Integrated Circuits Using an Improved Voltage Multiplier Technique", IEEE J. of Solid-state Circuits, vol. SC-11, No. 3, Jun. 1976, pp. 374-378, which is hereby incorporated by reference in its entirety) Dickson's architecture is a construction of diode-coupled switches and pumping capacitors responding to two complementary clock signals.

(Continued)

*Primary Examiner*—Lincoln Donovan
*Assistant Examiner*—Terry L Englund
(74) *Attorney, Agent, or Firm*—Saile Ackerman LLC; Stephen B. Ackerman

(57) ABSTRACT

A circuit and method are given, to realize a high efficiency voltage multiplier for integrated circuits generating an internal and flexible positive or negative high voltage on-chip supply voltage from low external positive or negative supply voltages or ground. Applying multi-phase control signals to voltage boost internal nodes allows for eliminating threshold voltage drop losses and thus improves the voltage pumping gain compared to circuits with diode-configured FETs of prior art. Making use of voltage signals from antecedent stages in order to bias the bulk of MOS transistors fabricated in triple-well technology enables relaxing of the gate oxide stress within high order stage MOS transistors. Such a method, called leap-frog bulk potential tracking method, makes MOS transistors from different stages exhibit about the same body effect, which is very important because MOS transistors of higher order stages now show the same performance as MOS transistors from lower order stages. Important also in terms of efficiency as the charge sharing speed of high order MOS transistors always dominates the total charge pump performance and the driving force of pumped currents, thus also allowing for a greater number of serially connectable stages overall or a smaller number necessary for a certain targeted output voltage.

50 Claims, 38 Drawing Sheets

OTHER PUBLICATIONS

"A new charge pump circuit dealing with gate-oxide reliability issue in low-voltage processes", Ker, et al., ISCAS IEEE, 2004, pp. I321-I324 describes the charge transfer switches can be turned on and turned off completely, so its pumping gain is much higher than the traditional designs.

"A new charge pump without degradation in threshold voltage due to body effect", Shin, et al., IEEE journal of solid-state circuits, vol. 35, No. 8, Aug. 2000, pp. 1227-1230 describes a new charge pump with the controllable body voltage. By adjusting the body voltage, the back bias effect removed and the threshold voltage of the MOSFET used as a switch is kept constant. With no threshold voltage increase, higher output voltage than the conventional charge pump can be obtained in the proposed charge pump.

"MOS charge pumps for low-voltage operation", Wu et al., IEEE journal of solid-state circuits, vol. 33, No. 4, Apr. 1998, pp. 592-597 describes a new MOS charge pumps utilizing the charge transfer switches (CTS's) to direct charge flow and generate boosted output voltage. Using the internal boosted voltage to backward control the CTS of a previous stage yields charge pumps that are suitable for low-voltage operation.

\* cited by examiner

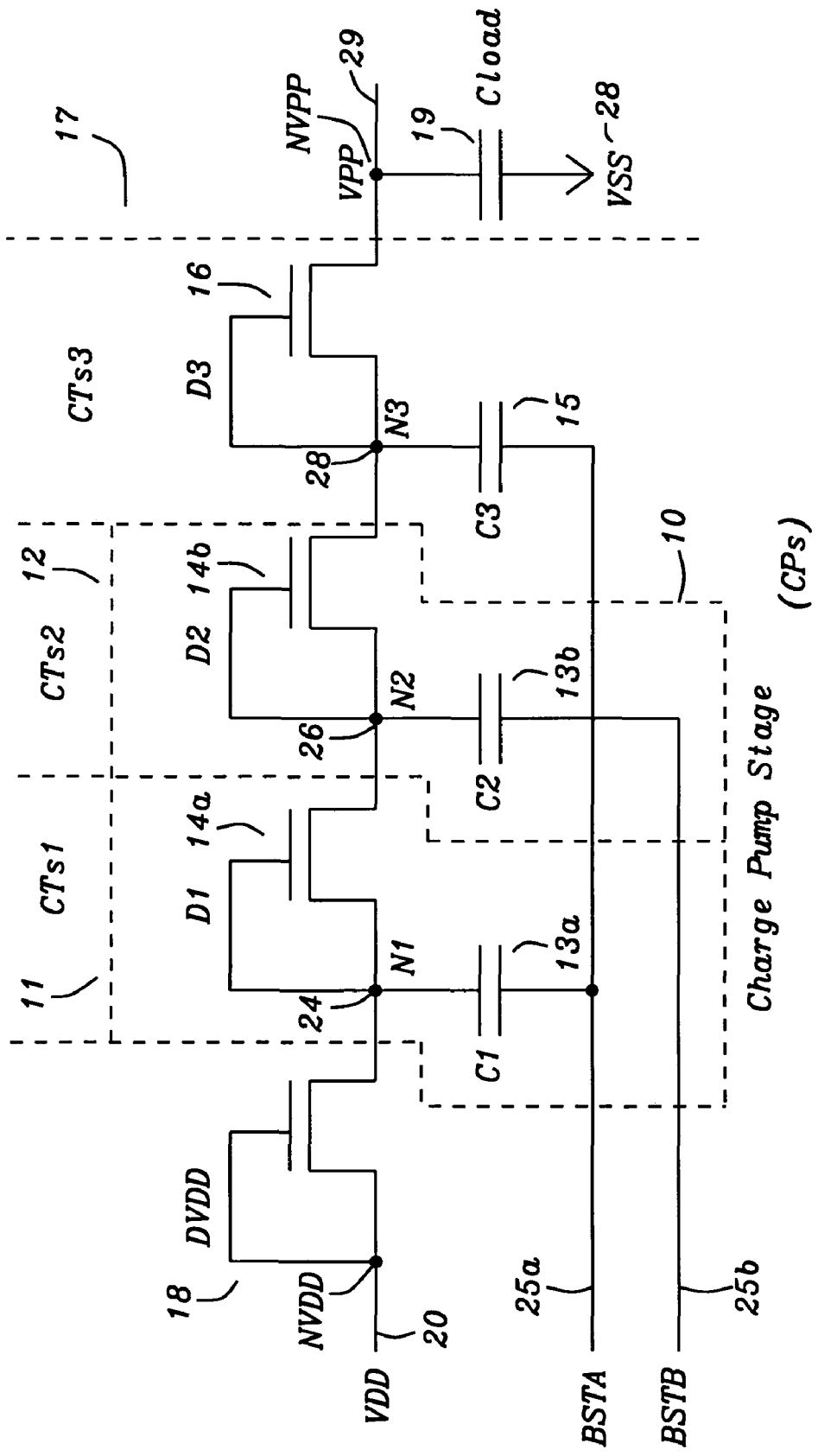
FIG. 1A – Prior Art

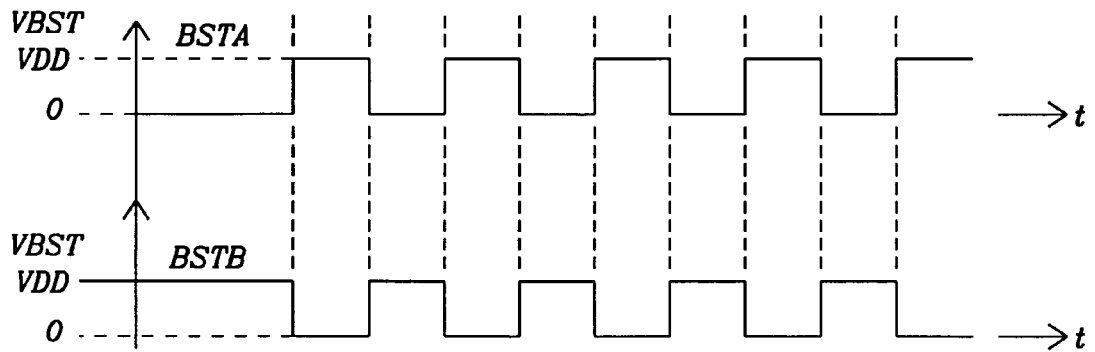
FIG. 1B - Prior Art
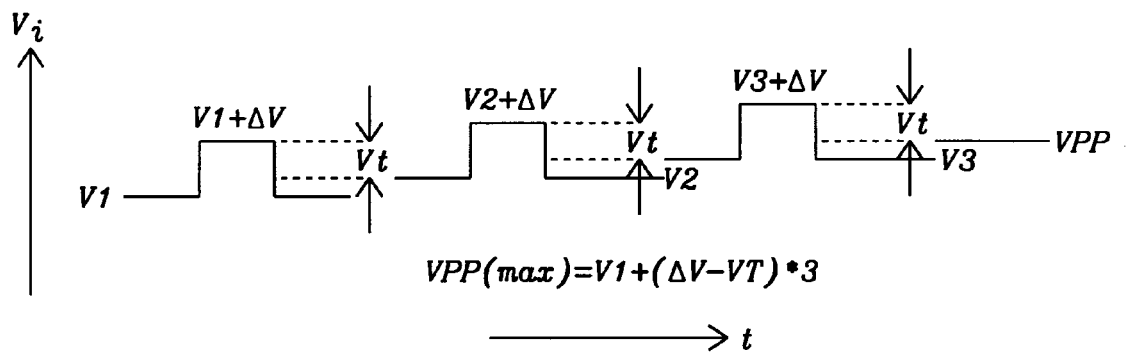
FIG. 1C - Prior Art

|    | MN0A | MN1APP | MN1AP | MN1A | MN1BPP | MN1BP | MN1B | MN2A | MN3A |
|----|------|--------|-------|------|--------|-------|------|------|------|
| T1 | ✗    | ◯      | ✗     | △    | ◯      | ✗     | ✗    | ✗    | △    |
| T2 | ✗    | ✗      | ◯     | ◯    | ◯      | ✗     | ✗    | ✗    | ◯    |
| T3 | ✗    | ◯      | ✗     | △    | ◯      | ✗     | ✗    | ✗    | △    |
| T4 | ◯    | ◯      | ✗     | ✗    | ◯      | ✗     | △    | △    | ✗    |
| T5 | ◯    | ◯      | ✗     | ✗    | ✗      | ◯     | ◯    | ◯    | ✗    |
| T6 | ◯    | ◯      | ✗     | ✗    | ◯      | ✗     | △    | △    | ✗    |

Notes: ◯ MOS switch completely turned on (no threshold voltage drop)
✗ MOS switch completely turned off
△ MOS switch incompletely turned on (i.e. threshold voltage drop effective)

F I G. 5B

| Provide for a voltage multiplier as Charge Pump Circuit for High Voltage Generation a basic circuit structure built up as a series connection of an initial stage and one or more of following twin circuit block stages of an essential four-pole or two-port character i.e. each stage having a pair of input terminals and a pair of output terminals, apart from additional pairs of auxiliary and pump signal terminals for each of the twin circuit blocks | — 901 |

↓

| Arrange said basic circuit structure in a, versus a virtual middle line, fundamentally symmetrical configuration exhibiting two parallel rails of virtual connection lines each endowed with a consecutive series of pairs of main nodes whereby all upper parts of said pairs located above said virtual middle line are designated as A-parts, all lower parts located below said virtual middle line as B-parts | — 905 |

↓

| Define "connect directly" as connecting A-part items to A-part items and B-part items to B-part items as well as "connect cross-over" as connecting A-part items to B-part items and vice-versa; translate this terminology also to other possible actions | — 910 |

↓

| Furnish a set of three pairs of multiphase control clock signals, whereby direct A-part signals are shifted by one half clock cycle compared to B-part signals or vice-versa by designation and each pair is individually named as primary, secondary and tertiary | — 920 |

↓

| Provide for each of said main nodes a coupling capacitor realized as MOSFET in capacitor configuration and fed by associated primary control clock signals out of said set | — 930 |

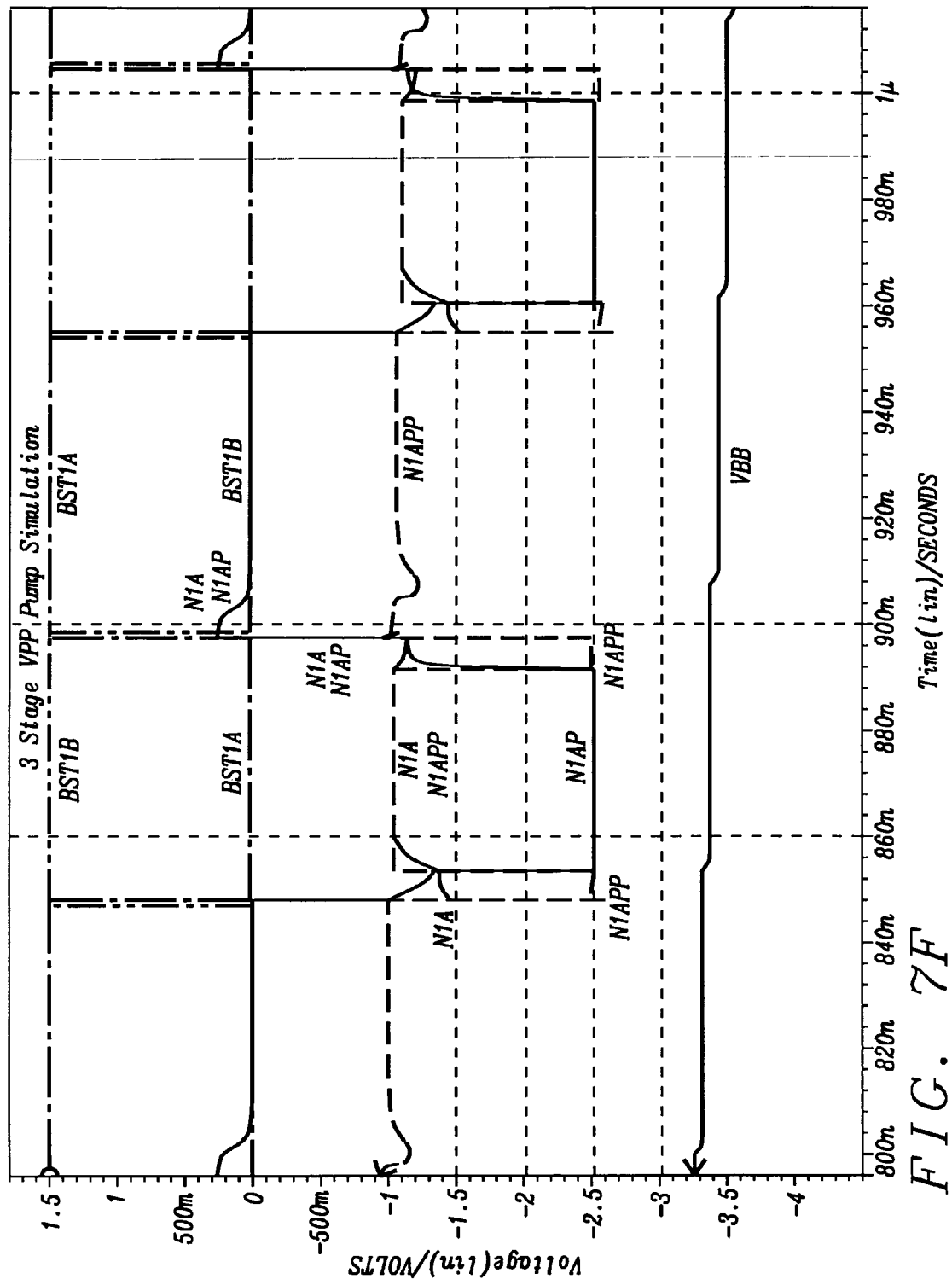

CHARGE PUMP CIRCUIT FOR HIGH VOLTAGE GENERATION

BACKGROUND OF THE INVENTION (1) Field of the Invention

The present invention relates in general to semiconductor voltage generator circuits, and particularly to capacitive voltage multiplier circuits using MOS transistors, even more particularly to voltage multiplier circuits using charge pumps manufactured as semiconductor integrated circuits.

(2) Description of the Prior Art

Recent developments in electronic devices for modern mobile and portable equipment for telecommunications and data processing have strengthened a tendency to an ever-continuing decrease of the applied supply voltages and furthermore to prefer components still needing one single supply voltage only. Portable devices are in general powered by batteries and weight and size of modern batteries play an important role in customer's acceptance, thus smaller devices with small batteries however furnishing low voltages only are in focus of current manufacturing and marketing strategies. Most modern integrated circuits utilizing a single power supply voltage incorporate on-chip circuitry to generate a "boosted" voltage having a magnitude greater than their own power supply voltage. Frequently this boosted voltage is used as a veritable power supply voltage for portions of the circuitry also contained on the integrated circuit and needing such higher voltages for their proper functioning. Common examples for integrated circuits comprising such portions are semiconductor memory devices of all kinds, such as Random Access Memory (RAM) circuits or special Non Volatile (NV)—RAM devices, like memory devices which make use of so-called 'floating gates' needing high voltages for their operation, like Flash-EPROM (Erasable Programmable Read-Only Memory) or E-EPROM (Electrically Erasable PROM) devices. Modern integrated memory devices using Magnetoresitive (MRAM) and Ferroelectric (FRAM) technologies are to be counted in also. Other types of circuits, e.g. for logic functions like EPLD (Erasable Programmable Logic Device) make also use of 'floating gates' and therefore need much higher voltages as their supply voltage VDD. Unlike many older devices, which required that two different power supply voltages be supplied, to operate the device (e.g., +5 and +12 volts), many contemporary devices now have only one single power supply voltage (usually called VDD: D as legacy from Drain) of (2.5-3.3) volts (relative to "ground" or VSS: S as legacy from Source). This VDD power supply voltage is typically utilized to power most of the device, within semiconductor memory devices also including the normal data read operation circuit parts. The higher voltage (frequently called VPP: P as legacy from Programming) is generated by an on-chip voltage generator having a typical value of +8 volts (again relative to VSS) rather than requiring a separate power supply voltage used for write operations within memory circuits. In many integrated circuits, such on-chip voltage generators are implemented as capacitive voltage multiplier circuits, largely because of the relative ease of implementing suitably large capacitors in a monolithic integrated circuit technology. These capacitive voltage multiplier circuits are usually called "charge pumps". Charge pumps are circuits that pump charge into capacitors to develop an output voltage higher than the supply voltage. Such voltage generators or voltage multipliers used to "pump" a voltage from a lower voltage level to a higher voltage level are well known. Typically, they are used in non-volatile memory arrays in which the high voltage is required to program or erase the non-volatile memory cells. The supplied voltage is the "low" voltage and the "high" voltage is used to program or erase the memory cells. In general, electronic devices built as integrated circuits for a capacitive voltage multiplier operation are made up of multiple stages essentially connected in series and comprising charge pumps in order to "pump" a voltage from a lower source level to a higher source level. Many charge pump circuit stages can thus be implemented serially to increase the voltages provided. Each stage contains a pair of diodes (or transistors configured as a diode) and two capacitors. The stages are driven by a pair of alternating clock signals. High voltage charge pumps are able to provide positive or negative high voltages.

FIG. 1A prior art shows the three (3)-stage design of a prior art single anti-phase clock voltage multiplier circuit. This circuit displays said serial connection of Charge Pump stages (CP/CPs) built with easy integrable components only: MOS transistors and MOS capacitors, whereby each MOS transistor is connected in a diode configuration and also each capacitor is implemented by a MOS transistor. Each CP-stage is comprised of two serially connected Charge Transfer stages (CT/CTs) e.g. CTs1 (11) and CTs2 (12). Each CT stage is made up of one diode connected MOS transistor, e.g. D1 (14*a*) or D2 (14*b*) and one charge storage MOS capacitor, e.g. C1 (13*a*) or C2 (13*b*). Each CT stage has input node and output node, e.g. CTs1 nodes N1 (24) and N2 (26), CTs2 nodes N2 and N3 (28) respectively. The above-mentioned stage count of three for the circuit is based on this definition. The exemplary CP-stage 10 shall thus be consisting of diodes D1 and D2 and its two corresponding capacitors C1 and C2 as first stage 10. Capacitors C1 and C2 supply the two complementary control (clock) signals BSTA (25*a*) and BSTB (25*b*) to nodes N1 and N2 respectively, whereby all odd numbered (or alternately even-numbered) CT stages are supplied by BSTA and all even numbered (or alternately odd-numbered) CT stages by BSTB, which is clocked in anti-phase to BSTA. The abbreviation BST shall hereby remind of BooST, the action which is crucial for the circuit and which gets controlled by these signals, the letters A and B are used persistently to designate complementary pairs of items. An input isolation diode DVDD (18) feeds supply voltage VDD at node NVDD (20) to input node N1 connected to D1 and C1. Output node N3 connected to D2 leads eventually to the following CP-stages, in our case however only one further CT stage is following, namely CTs3 (17), set-up by MOS capacitor C3 (15) and diode connected MOS transistor D3 (16), whereby capacitor C3 is again supplying said clock signal BSTA to one electrode of diode D3. The other electrode of said diode D3 is now furnishing the output voltage VPP 29 of the multiplier circuit to a final load capacitor Cload 19, also connected to VSS 28 or ground. For future reference: the voltages at the individual nodes 24, 26 and 28 corresponding to the diode-capacitor combinations D1-C1, D2-C2 and D3-C3 shall be designated as V1, V2 and V3 respectively. The drawing in FIG. 1A prior art shows a so-called Dickson CP circuit proposed by J. Dickson in IEEE Journal of Solid-State Circuits (see J. F. Dickson, "On-Chip High-Voltage Generation in MNOS Integrated Circuits Using an Improved Voltage Multiplier Technique", IEEE J. of Solid-state Circuits, vol. SC-11, No. 3, June, 1976, pp. 374-378, which is hereby incorporated by reference in its entirety). Dickson's architecture is a construction of diode-coupled switches and pumping capacitors responding to two complementary clock signals.

Referring now to FIG. 1A prior art again for a summary, the voltage multiplier circuit includes a plurality of serially connected CP-stages, one of which is labeled 10. Each CP-stage includes two CT stages, each made up of a diode D1 or D2 as charge transfer switch and a capacitor C1 or C2 as charge storage device, thus forming CTs1 and CTs2, each having an input node and an output node with corresponding voltages V1 at node N1, V2 at node N2 and V3 at node N3. A complementary pair of clock signals BSTA and BSTB is provided to drive the various pump stage capacitors C1 and C2. The input node N1 of the first serially-connected CP-stage is usually connected to the VDD power supply (at least for generating a boosted positive voltage) via an isolation diode DVDD, which may also be considered as part of another serially-connected CT stage, and the output voltage being VPP of the last CT stage, here CTs3, taken from output node NVPP (29) (which could otherwise be considered as output node of a last serially-connected CT stage) and measured over load capacitor Cload versus VSS or ground. Not previously mentioned are second order or side effects such as forward diode drop voltages or threshold voltages (V.sub.th) of the MOS-transistor diodes and parasitic stray capacitances (C.sub.s) formed in MOS circuits from said transistor drain and storage capacitor nodes versus ground. In practice, the diodes are frequently implemented as diode-connected MOSFETs, each with its gate terminal and drain terminal connected together to form one terminal of the diode, and its source terminal forming the other terminal of the diode. Also, the capacitors are frequently implemented as large area MOSFETs, each with its source terminal and drain terminal connected together to form one terminal of the capacitor, and its gate terminal forming the other terminal of the capacitor. Furthermore, the output voltage is usually somewhat less than this theoretical value, due to said stray capacitances, incomplete charge transfer, DC current flow provided into the output node, and other effects, which have been well studied in the literature and which shall be re-examined later. These have to be considered however in more detail because it is well known that voltage multiplier circuits based on Dickson's architecture fail to provide sufficient pumping efficiency when the power supply voltage VDD becomes very low, in which case their output gains for boosting voltages decrease to an unusable condition.

A time diagram of the anti-phase control clock signal of the circuit shown in FIG. 1A prior art is depicted in FIG. 1B prior art, displaying the voltage VBST for the two complementary clock signals BSTA and BSTB as a function of time t. These complementary control clock signals are usually driven with full VDD-level swings (i.e., transitioning between a low level of VSS and a high level of VDD). Consequently, each CP-stage boosts the voltage conveyed to its input node by an amount equal to VDD less a diode drop (assuming relatively negligible DC load current and ignoring second order effects).

In such a design the output voltage VPP 29 measured versus ground (VSS) is determined by the following equation, generalized for M stages and assuming no current load is required from the load capacitor Cload at output node 29:

$$VPP=(VDD-V.\text{sub.th})+M^*(VBST^*C/(C+C.\text{sub.s})-V.\text{sub.th})$$

wherein:

(VDD−V.sub.th) is the voltage at the input node N1 to the first CT or CP-stage of the voltage multiplier after the voltage has passed through the transistor DVDD, configured as diode;

(V.sub.th) is the threshold voltage or forward diode drop voltage of each diode connected MOS transistor D(2n−1) and D(2n) in the multiplier; C is the capacitance of the coupling storage MOS capacitors C(2n−1) and C(2n) in the nth CT stage of the multiplier, with C(2n−1)=C(2n);

(C.sub.s) is the stray capacitance versus ground (VSS) at the drain-capacitor node of each diode connected MOS transistor D(2n−1) and D(2n) in the multiplier; VBST is the voltage of the clock signals BSTA and BSTB, normally equaling VDD; M is the total number of stages of the multiplier; and n is a running index (1 . . . M). Typically, C/(C+C.sub.s) is about 85% and (V.sub.th) can vary from approximately 1 Volt to 2.5 Volt or higher depending on the degree of the body effect of the transistor, which varies from process to process. VBST typically is the same as VDD, When VDD is less than 3 V, the term VBST*C/(C+C.sub.s) is very close to V.sub.th. As already mentioned, this will severely degrade the pumping efficiency of the multiplier. Thus, the prior art tried to eliminate V.sub.th or its effect to obtain a larger gain, e.g. to get higher VBST on the gate of the transistors N, or to use multiphase clock signals.

The voltage diagrams presented in FIG. 1C prior art depict three internal node voltages (V1, V2, and V3 at N1, N2, and N3 respectively) during operation of the voltage multiplier circuit of FIG. 1A prior art driven by the complementary clock signals BSTA and BSTB shown in FIG. 1B prior art under some premises: all forward diode voltage drops equal (V.sub.th), all stray capacitances are neglected, no load current is drawn from output node 29 with voltage VPP. The circuit from FIG. 1A prior art can provide a supply voltage minus threshold voltage as node voltage V1=(VDD−V.sub.th) to node N1. An increase at each stage of (.DELTA.V)=VBST is obtained. If VBST=VDD the voltage increment (.DELTA.V) reaches VDD. The output voltage VPP of the circuit can thus attain VPP=V1+3* (.DELTA.V−(V.sub.th))=(VDD−V.sub.th)+3* (.DELTA.V−(V.sub.th)). However, the amplitude VBST of clock pulses BSTA and BSTB, pump capacitance (C) of capacitors C1, C2, and C3, parasitic stray capacitance (Cs), and load current are factors that can limit the voltage gain achieved at each pump stage. Thus (.DELTA.V) is the voltage increment reached under these constraints. For a capacitor charge to be passed fully from a lower stage to a higher stage, the increase in voltage for the stage (.DELTA.V) must be greater than the transistor threshold voltage (V.sub.th), the forward diode drop voltage.

Notes:

V1, V2, and V3 are the pre-boost voltage levels of nodes N1, N2, and N3 respectively. V1+(.DELTA.V), V2+(.DELTA.V), and V3+(.DELTA.V) are the post-boost voltage levels of nodes N1, N2, and N3 respectively.

The circuit in this prior art scheme of FIG. 1A prior art has a number of disadvantages, some have been already mentioned above. Five major drawbacks shall be listed in the following:

First, its charge sharing process is not completely executed, which is owed to the threshold voltage of the diode connected MOS transistor, i.e. there is always one forward diode drop voltage difference between two adjacent charge sharing nodes, which thus reduces efficiency. In other words an internal voltage value of at least one threshold voltage drop higher than the desired output voltage must be generated.

Second, owed again to said threshold voltage drop we need more CP-stages connected in series to achieve a certain target voltage up to which we want the charges to be pumped to. The more CP-stages are connected in series the less pumping efficiency is obtained, or in other words, extra stages are required to reach said certain target voltage due to this lowered efficiency.

Third, owed to the body effect the threshold voltage of higher order CP-stage's will gradually increase. It is well known, that the body effect to which integrated NMOS transistors are subject to, will increase the threshold voltage of this NMOS transistor itself. This will also limit the number of serially connected CP-stages and thus a possible higher voltage generation, because said increased threshold voltage may be higher than the available external supply voltage VDD, especially in future very low VDD voltage supply applications. If the threshold voltage of diode connected NMOS transistors is higher than the boost voltage VDD, the NMOS diode cannot be turned on and no charge sharing process will be executed. In other words, when it comes to low supply voltage levels the circuit does not perform well.

Fourth, the charge sharing speed is rather slow because the diode-configured NMOS transistors are always working in saturation region. It is well known that the effective resistance of NMOS transistors in saturation region is very large. This will increase the charge sharing time and also reduce the magnitude of the pump current within the CP because the value of the CP's settlement current is reciprocal to the charge sharing time, i.e. the time during which two capacitors are connected together.

Fifth, the breakdown voltage of the diode connected MOS transistors must increase as CP output voltage increases, which signifies that the higher order MOS transistors oxide stress is gradually increased, which will decrease the rise time of the pumping circuit and also degrade reliability. It would be desirable to have a CP circuit that can efficiently develop a high positive or negative output voltage from a low input voltage without requiring higher breakdown voltage transistors.

At lower power supply voltages, the diode drop voltage lost within each CP-stage significantly affects the final output voltage achievable by such a CP circuit. Consequently, other approaches to design voltage multiplier circuits replace the diode type charge transfer device with a Charge Transfer Switch (CTS) device in each CP-stage. Additionally multiphase control signal schemes are used, to more effectively control the pumping process. It is also desirable to more accurate control the CTS to reduce the forward voltage drop across the CTS when turned on to transfer charge from input to output, and to carefully control the time that the CTS is turned on to prevent back transfer of charge from output to input. A variety of solutions are found in the prior art for controlling a CTS device in attempt to simultaneously achieve these two competing goals. Nevertheless, additional improvements in CP circuits are desired. Moreover, such voltage generator circuits also may consume a significant amount of power relative to the remainder of the circuit, and thus increase the current that must be supplied by the user (e.g. by the VDD power supply). Consequently the unwanted increase in power dissipation increases the temperature of the die during operation. In a battery-powered environment, any increase in power consumed by a device has significant implications for battery life, and any additional heat generated is also more difficult to dissipate. Therefore continued improvements in CP circuits are needed. It is therefore a challenge for the designer of such circuits to achieve a higher efficiency solution. There are various patents referring to such solutions.

U.S. Pat. No. 5,886,887 (to Jenq) presents a voltage multiplier with low threshold voltage sensitivity including a voltage multiplier having a number of electrically-like stages. Each of the stages receives two input signals and a pump signal, whereby the stage has an MOS transistor with a first source/drain region and a second source/drain region and a gate. Each stage also has means for receiving a pump signal and for separately pumping the first source/drain region and the gate of the first transistor by the pump signal. The two input signals are supplied to the first source/drain region and the gate of the first transistor, respectively. A first output signal is supplied from the second source/drain region of the first transistor, and from the first source/drain region of the first transistor. A voltage signal is supplied as the input signal of the first stage and a clock signal having a first phase is supplied to the first stage as the pump signal of the first stage. The first and second output signals of the first stage are supplied to the second stage as the input signals of the second stage and a clock signal having a second phase different from the first phase is supplied to the second stage as the pump signal of the second stage.

U.S. Pat. No. 6,501,325 (to Meng) discloses low voltage supply higher efficiency cross-coupled high voltage charge pumps including an apparatus comprising a number of cross-coupled charge pump stages configured to generate an output voltage in response to (i) a supply voltage, (ii) a first signal, and (iii) a second signal, where the output voltage has a greater magnitude than the supply voltage.

U.S. Pat. No. 6,734,717 (to Min) describes a charge pump circuit which includes a first switch for connecting an input terminal to a first pumping node, a first pumping capacitor for boosting up a voltage level of the first pumping node in response to a first control signal, a second switch for connecting the first pumping node to an output terminal, a third switch for connecting the input terminal to a second pumping node, a second pumping capacitor for boosting up a voltage level of the second pumping node in response to a second control signal, and a fourth switch for connecting the second pumping node to the output terminal. The charge pump circuit decreases a loss of an output voltage and prevents malfunctions in MOS devices by preventing damages of gate oxides of the MOS devices due to excessively high voltage differences.

U.S. Pat. No. 7,023,260 (to Thorp et al.) teaches a charge pump circuit incorporating corresponding parallel charge pump stages and method therefore wherein an improved charge pump circuit efficiently utilizes multiple charge pump stages to produce output voltages much larger than the power supply voltage by incorporating, in some embodiments, two parallel strings of series-coupled charge pump stages. Each corresponding charge pump stage in one string is controlled at least by a node in the corresponding charge pump stage of the other string.

In the prior art, there are different technical approaches for achieving the goal of a higher efficiency operation for integrated voltage generator circuits. However these approaches use often solutions, which are somewhat technically complex and therefore also expensive in production. It would be advantageous to reduce the expenses in both areas.

Although the above-mentioned patents describe circuits and/or methods close to the field of the invention they differ in essential features from the circuit, the system and especially the method introduced here.

SUMMARY OF THE INVENTION

A principal object of the present invention is to realize a circuit for voltage multiplier applications implementing a Charge Pump (CP) Circuit for High Voltage Generation exhibiting low power consumption and at the same time high conversion efficiency values.

Another principal object of the present invention is to provide an effective and very manufacturable method for implementing a circuit for voltage multipliers as an integrated circuit (IC) for high positive as well as negative output voltages.

Also a principal object of the present invention is to always being able to give a circuit for voltage multipliers for either positive or negative output voltages consisting only of one type of MOS transistors, i.e. either PMOS or NMOS.

Another still further object of the present invention is to allow generating high positive and negative output voltages arbitrarily starting out from positive, negative supply voltages or ground.

Further another object of the present invention is to give a method for the design of a multiple CP-stage circuit with MOSFET components, diminishing the so-called body or substrate bias effect.

Another further object of the present invention is to reduce the threshold voltages of integrated MOSFET devices by implementing the voltage multiplier circuit as monolithic IC in triple-well MOS technology.

Also an object of the present invention is to give a method using MOSFET devices as triple-well realizations within the voltage multiplier circuit and tracking their bulk voltage potentials as close as possible to their unconditional necessary operating points.

A still further object of the present invention is to give a method for the design of the Charge Pump (CP) Circuit for High Voltage Generation in order to expand the circuit, as far as the number of CP-stages is concerned, up to an arbitrary number.

Another still further object of the present invention is to give a method wherein the crucial MOSFET components of the integrated circuit implementation are relieved from unnecessary oxide stress.

Still another object of the present invention is to simplify the design of high voltage multiplier circuits by an easy adaptability to specification demands, being that a positive or negative output voltage polarity or different output voltage values.

Again another object of the invention is to always present an efficiency maximized circuit version with respect to power conversion as far as the generation of high positive or negative supply voltages out of positive or negative voltages or ground is concerned.

Also an object of the invention is to always present an efficiency optimized method for a power conversion as far as the generation of high positive or negative supply voltages out of positive or negative voltages or ground is concerned.

Also still another object of the present invention is to simplify the production of high voltage multiplier circuits by simple and quite regular layouts, as made possible by using a multitude of identical circuit structures.

Again a further object of the invention is to present a voltage multiplier circuit based on charge pump principles with minimized transfer losses.

Further still another object of the present invention is to make better use of battery powered devices, by offering a higher power efficiency of on-chip voltage generation circuits employed.

In accordance with the objects of this invention a new circuit is described, capable of realizing a Charge Pump Circuit for High Voltage Generation used for voltage multiplier devices and consisting of a basic circuit structure arranged in a, versus a virtual middle line, fundamentally symmetrical configuration and being controlled by a set of three multiphase pairs of control clock signals either as a first pair of complementary signals or as second and third pairs of signals each member signal of which is shifted by one half clock cycle versus its other member signal, comprising: an input stage; an output stage; one or more of twin circuit block stages, each stage of an essential four-pole or two-port character i.e. each stage made up of a pair of circuit blocks each having an input terminal and an output terminal, apart from having two additional pairs of auxiliary terminals for each of said twin circuit blocks, which themselves are built as symmetrical items mirrored to each other, each of identical structure and layout and each consisting of the same number and kind of components; one pair of parallel virtual rails provided for possible connections as lines between said input stage, one or more of said twin circuit blocks and said output stage and arranged symmetrically in parallel to said virtual middle line located in the middle between said pair of possible connection lines; and a consecutive series of an arbitrary number of pairs of main nodes being situated on said pair of possible connection lines arranged in such a way, that each pair of main nodes has one part of it allotted to each part of said pair of possible connection lines respectively.

Further in accordance with the objects of this invention a new circuit is described, capable of realizing a Charge Pump Circuit for High Voltage Generation comprising an arbitrary number of CP-stages, each consisting of a pair of mirrored CTS devices, wherein said CTS devices used in said general CP-stages comprise FETs consisting of MOS transistors fabricated in triple well technology, each endowed with a separate bulk voltage connection terminal for each MOSFET and each such bulk voltage connection terminal able to be separately used in order to set the related bulk potential, and where each of said separate bulk voltage connection terminals of said MOS transistors for every CTS device of each CP-stage are commonly connected to anteceding main nodes in such a way that CTS devices located above said virtual middle line are alternatingly connecting their bulk voltage connection terminals to anteceding main nodes located below said virtual middle line and vice-versa, starting out with even numbered stage two as first CP-stage, followed by odd-numbered CP-stage three, now connecting said bulk voltage connection terminals of its CTS device located below said virtual middle line to anteceding main node located above said virtual middle line and vice-versa and so on, thus establishing a leap-frog bulk potential tracking method, whereby the odd-numbered CP-stage one, not having any anteceding main node connects said separate bulk voltage connection terminals of said MOS transistors directly with said first pair of complementary multiphase control signals.

Also in accordance with the objects of this invention a new method is described, capable of implementing a Charge Pump Circuit for High Voltage Generation device with multiphase control clock signals and with one or more CP-stages implemented as MOS transistor components and realized as an Integrated Circuit (IC) fabricated in MOS technology and using MOS transistors manufactured under a triple-well process, comprising the steps of: providing a basic circuit structure built up as a series connection of an initial stage and one or more following twin circuit block stages operating as CP-stages, each stage of an essential four-pole or two-port character wherein each stage has a pair of input terminals and a pair of output terminals, apart from additional pairs of auxiliary and pump signal terminals for each of the twin circuit blocks; arranging said basic circuit structure in a, versus a virtual middle line, fundamentally symmetrical configuration exhibiting two parallel rails of virtual connection lines each endowed with a consecutive series of pairs of main nodes whereby all upper parts of said pairs located above said virtual middle line are designated as A-parts, all lower parts located below said virtual middle line as B-parts; defining "connect directly" as connecting A-part items to A-part items and B-part items to B-part items as well as "connect crossover" as connecting A-part items to B-part items and vice-versa; and translating this terminology also to other possible actions; furnishing a set of three pairs of multiphase control clock signals, whereby direct A-part signals are shifted by one half clock cycle compared to B-part signals or vice-versa by designation and each pair is individually named as primary, secondary and tertiary; providing for each of said main nodes a coupling capacitor realized as MOSFET in capacitor configuration and fed by associated primary control clock signals out of said set; providing for auxiliary nodes connecting to each of said auxiliary and said pump signal terminals a coupling capacitor realized as MOSFET in capacitor configuration and fed by associated secondary and tertiary control clock signals out of said set; providing as twin circuit block stage a general symmetrically cross-over connected Charge Pump (CP)—stage made up of a pair of symmetrically arranged Charge Transfer Switch (CTS) circuit blocks, also named A-part and B-part CTS blocks, whereby these A-part and B-part blocks are identical in structure and assembly of components only differing in their layouts which are mirrored to each other, thus both also designated commonly as CTS parts; providing as said CTS circuit block an assembly of three MOSFETs, having one input terminal, one output terminal, a pair of auxiliary terminals named first and second, and another pair of pump signal terminals named first and second and all terminals named additionally as CTS part related; connecting cross-over said pairs of first and second auxiliary terminals of each of said pair of CTS circuit blocks thus making up a symmetrically cross-over connected CP-stage in such a way, that first A-part auxiliary terminal links to second B-part auxiliary terminal and vice-versa; connecting said pairs of input and output terminals of said general symmetrically cross-over connected CP-stages to said consecutive series of main nodes on each virtual connection line in such a way, that a real serial connection of all of said CP-stages is guaranteed according to their four-pole or two-port character; one main node on each A- and B-part rail arranged as consecutive pairs connects to said pair of input terminals from one CP-stage respectively and the next main node on each A- and B-part rail connects to said pair of output terminals belonging together to said one CP-stage respectively, in order to now guarantee a serial connection of CP-stages also said pair of input terminals of the following CP-stage is connecting to this same pair of main nodes (to A- and B-part main nodes respectively) and so on for all following stages and main node connections; and feeding said two pairs of auxiliary nodes connecting to said pump signal terminals by pairs of secondary and tertiary control clock signals respectively.

Finally in accordance with the objects of this invention a new method is described, capable of implementing a Charge Pump Circuit for High Voltage Generation device where the step of providing as CTS circuit block an assembly of three MOSFETs, having one input terminal, one output terminal, a pair of auxiliary terminals named first and second, and another pair of pump signal terminals named first and second and all terminals named additionally as CTS part related, comprises MOSFETs consisting of MOS transistors fabricated in triple well technology, each endowed with a separate bulk voltage connection terminal and each terminal separately added to the number of auxiliary terminals of said CTS circuit blocks and where each of said separate bulk voltage connection terminals of said MOS transistors for every CTS block of each CP-stage are commonly connected to anteceding main nodes in such a way that A-part and B-part CTS blocks are alternately connecting to B-part and A-part anteceding main nodes and vice-versa, starting out with even numbered stage two as first CP-stage, followed by odd-numbered CP-stage three and so on, thus establishing said leapfrog bulk potential tracking method, whereby the odd-numbered CP-stage one, not having any anteceding main node connects said separate bulk voltage connection terminals of said MOS transistors to the respective primary pair of multiphase control signals directly, observing directly also the A and B-part CTS block relations, and also comprising additional steps for optimizations concerning the reduction of power consumption and transfer losses during charge transfer, as well as maximizing the conversion efficiency by choosing a six part segmentation for said three pairs of multiphase control signals defining time segments T1 to T6, and by choosing the specification of the related control signal transition voltage window limits adapted to its desired output voltage generated in such a way, that the highest voltage available in an external system serves as upper limit when generating a high positive voltage and the lowest voltage serves as lower limit when generating a high negative voltage.

BRIEF DESCRIPTION OF THE DRAWINGS

In the accompanying drawings forming a material part of this description, the details of the invention are shown:

FIG. 1A prior art shows the schematics of a prior art (CP principle by John F. Dickson) single anti-phase clock voltage multiplier circuit with 3 CT stages.

FIG. 1B prior art depicts the complementary (anti-phase) control clock signals for the circuit FIG. 1A prior art as time diagram.

FIG. 1C prior art presents the voltage diagrams of three internal Node Voltages V1, V2, and V3 at N1, N2, and N3 respectively, during operation of the Dickson voltage multiplier circuit.

FIG. 2A presents the circuit schematics for said newly proposed three-stage voltage multiplier in detail.

FIG. 2B exhibits a generalized circuit and block diagram of a CP-stage for the new circuit of FIG. 2A, whereby CTS sub circuits and their components as shown in FIG. 2A are combined into exemplary circuit blocks as CTS2$a$As and CTS2$a$Bs (s=1,2,3).

FIG. 2C presents the circuit schematics for said newly proposed three-stage voltage multiplier again, but now as block diagram drawn with the help of the CTS circuit blocks CTS2$a$As and CTS2$a$Bs (s=1,2,3) as depicted in FIG. 2B. This redraw of the circuit from FIG. 2A serves mainly to obtain an easy overview and also to simplify its description.

FIG. 2D shows a time diagram for the six essential multiphase control signals of the circuit of FIGS. 2A or 2C used in operation of the new circuit.

FIG. 2E gives voltage diagrams of three internal node voltages within said referred three stages.

FIG. 4I exhibits a generalized circuit and block diagram of CP-stages 2 and 3 for the new circuit of FIG. 4G, whereby CTS sub circuits and their components as shown in FIG. 4G are combined into the exemplary circuit blocks CTS3cAs and CTS3cBs (s=2,3).

FIG. 5B gives in form of a table an overview of the switching operations taking place in the circuit of FIG. 2A during the stated six time segments of operation depicted by FIG. 5A.

FIGS. 6A-6E describe with the help of a flow diagram the relevant method for constructing and operating the new circuits for voltage multipliers devices according to this invention and as shown in the figures and described in the specification.

FIGS. 7A-7J demonstrate the operation of the new circuits according to this invention by displaying simulation results in form of time diagrams of characteristic voltages (waveforms of control clock signals and node voltages, as well as the output voltage) during pumping activities for the CP-stages and CTS circuit blocks involved.

DESCRIPTION OF THE PREFERRED EMBODIMENTS

The preferred embodiments disclose novel realizations for "A New Charge Pump Circuit for High Voltage Generation" also known as voltage multiplier circuits. These circuits do exist as prior art in numerous variants but all have well-known sometimes significant drawbacks as already listed above. The technical approach for achieving the goal of avoiding most of the disadvantages is to make use of intelligent charge transfer switching (CTS) techniques i.e. replace diode connected MOSFETs by switching MOSFET structures, additionally substitute simpler anti-phase control schemes by more sophisticated multiphase control schemes in order to avoid losses during charge transfer transactions and last not least make use of an advanced technology for manufacturing the new circuits in integrated circuit implementation e.g. realizing crucial internal circuit parts of the chip as triple-well MOSFET structures. Using the intrinsic advantages of that solution—as described later on in every detail—the construction of the circuits and the method for using these circuits according to the invention as realized with standard CMOS technology is described and explained.

Figure 2A:
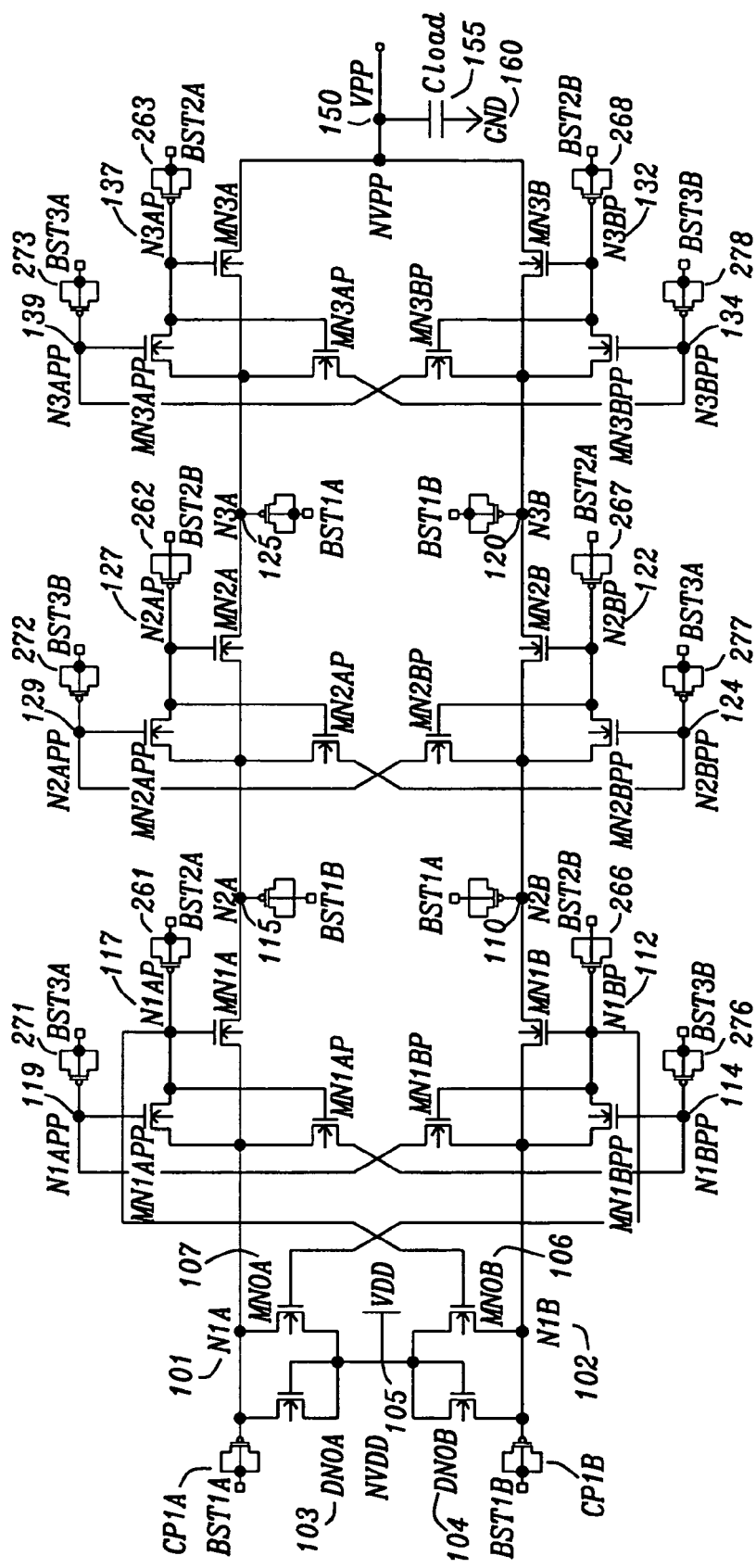
FIGS. 2A-2E describe a first embodiment of a new voltage generation device according to this invention proposing a new three-stage voltage multiplier circuit. The stages hereby consist of Charge Transfer Switches (CTS) implemented by MOS transistors.

Contemplating now FIG. 2A, a detailed circuit diagram of a first new design for a voltage multiplier circuit with CPs according to this invention for realization as MOS integrated circuit is depicted. As can be seen from the schematics there are mainly three CP-stages arranged in series, serially connecting corresponding pairs of complementary main nodes namely N1A (101) with N2A (115), and N1B (102) with N2B (110), N2A with N3A (125), and N2B with N3B (120), and finally N3A and N3B both with NVPP (150) thus delivering the output voltage VPP to load capacitor Cload (155). One common feature of all proposed voltage multiplier circuits in the current invention is their symmetrical structure, symmetrical with reference to a horizontally thinkable or virtual middle line connecting both nodes: NVDD (105) on input with NVPP on output, horizontal because of the format in which the schematics are currently drawn and thus separating upper and lower parts of the circuit and always symbolized by corresponding symbol letters A and B in every circuit block, circuit component or control signal name. Each CP-stage is symmetrically made up of a pair of CTS circuit blocks controlling the charge transfer actions between their according main nodes and in generalized form drawn separately in FIG. 2B. Three pairs of multi-phase control clock signals are now applied to these CP-stages with their CTS parts in order to control the boosting process: BST1A, BST2A, and BST3A together with their counter parts BST1B, BST2B, and BST3B. It shall be emphasized here, that the first pair of signals BST1A and BST1B are complementary to each other, whereas the second and third pair of signals are signals shifted by one half period versus each other. Diagrams of these control clock signals are shown separately in FIG. 2D. These signals are fed into the new circuit without exception via MOS transistors configured as capacitors which are connected to said three pairs of main nodes (external to each CP) and additionally also to three twin-pairs of auxiliary nodes (internal to each CP), thus supplying energy to nine different pairs of nodes: three pairs of complementary main nodes N1A & N1B, N2A & N2B, N3A & N3B, as well as three twin-pairs of complementary auxiliary nodes N1AP (117), N1APP (119) & N1BP (112), N1BPP (114), and N2AP (127), N2APP (129) & N2BP (122), N2BPP (124), and N3AP (137), N3APP (139) & N3BP (132), N3BPP (134). The capacitor-type MOS transistors are designated according to their respective nodes, namely CP1A & CP1B, CP2A & CP2B, CP3A & CP3B, and CP1AP1 CP1APP & CP1BP, CP1BPP, and CP2AP, CP2APP & CP2BP, CP2BPP, and CP3AP, CP3APP & CP3BP, CP3BPP respectively, whereby the letter P following the letter C stands for a PMOS type realization of the pertinent transistor as well as the letter N stands for an NMOS type realization, and not for node. The numbering scheme is chosen corresponding to the three CP-stages with their components. Additionally to these three CP-stages, which essentially constitute the new circuit, an initial pre-charge stage is configured, also found in the block diagram of the new circuit, which illustrates this structure more generally and is presented in FIG. 2C.

Figure 2B:
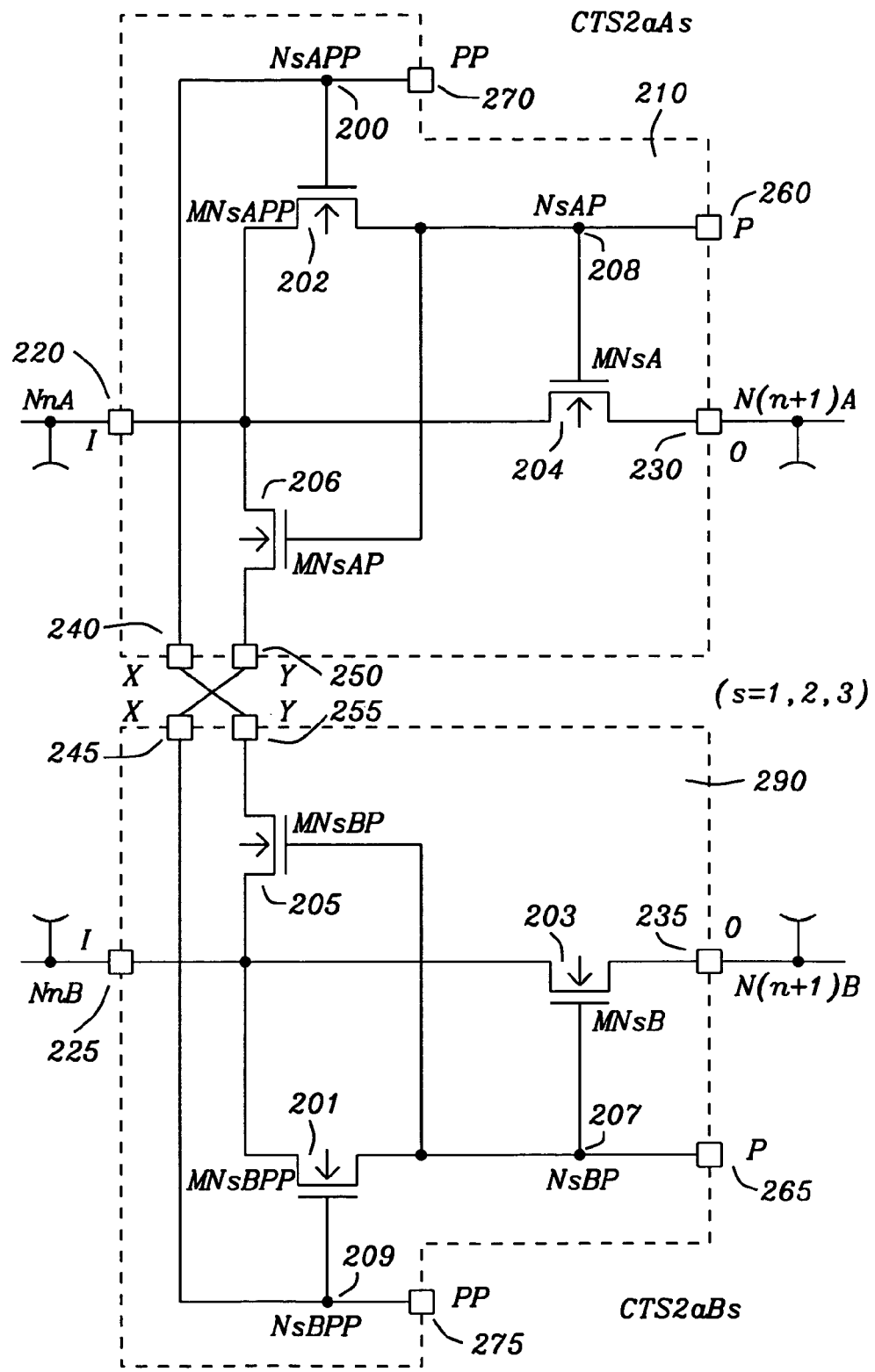

In FIG. 2B the above-mentioned generalized form of a CP-stage is drawn, symmetrically configured as a pair of CTS circuit blocks CTS2aAs (210) and CTS2aBs (290). The A-version refers to the upper CTS part, the B-version to the lower CTS part of the CP-stage, s is a running index abbreviated from stage, in this case for s=1,2,3. The upper A-part CTS can be topologically mirrored to the B-part CTS and vice-versa. Hence every CTS part exhibits the same number of components, such as three MOS FETs MNsA (204), MNsAP (206), and MNsAPP (202), two internal nodes NsAP (208) and NsAPP (200), and six external terminals 1 (220), 0 (230), X (240), Y (250), P (260) and PP (270) for the A-part CTS. Naming conventions hitherto not explained are M for MOSFET, P and PP for the Pumping operations activated via pump terminals, I for Input and O for Output, X and Y designate the cross-over terminals; s refers to said running index for the stage number. Correspondingly for the B-part CTS there are the three MOSFETs MNsB (203), MNsBP (205), and MNSBPP (201), the two internal nodes NSBP (207) and NsBPP (209), and the six, for simplicity reasons identically named as for the A-part CTS but in fact in each case different, external terminals I (225), O (235), X (245), Y (255), P (265) and PP (275).

The topological and electrical assembly of the components for the A-part CTS can be described by a common connection of the drains of all three MOSFETs to its input terminal 1, whereby the source of the first transistor MNsA directly connects to its output terminal 0. The source of the second transistor MNsAP directly connects to its crossover terminal Y and the source of the third transistor MNsAPP connects to node NsAP that is identical to its pump terminal P. This pump node also drives the gates from transistor MNsA and MNsAP. Node NsAPP identical to the other pump terminal PP however connects directly to the other cross-over terminal X and at the same time to the gate of transistor MNsAPP. The assembly of the B-part CTS is explained basically analogous, only the component designation's letters A have in each case to be replaced by B. The transistors MNsA and MNsB can thus be switched into diode configuration by feeding appropriate control clock or pumping signals into the corresponding terminals P and PP for each A-part and B-part CTS, therefore enabling an execution of the operations for a charge transfer from its input terminals I to its output terminals 0. One special observation from FIG. 2B shall be emphasized here; all MOSFETs have their bulk potential coupled to ground. The voltage difference between the source and the bulk may therefore be varying from stage to stage and the threshold voltage of a MOSFET is affected by the voltage which is applied to the back contact or bulk, i.e. the so-called substrate bias effect or body effect may cause problems.

Figure 2C:
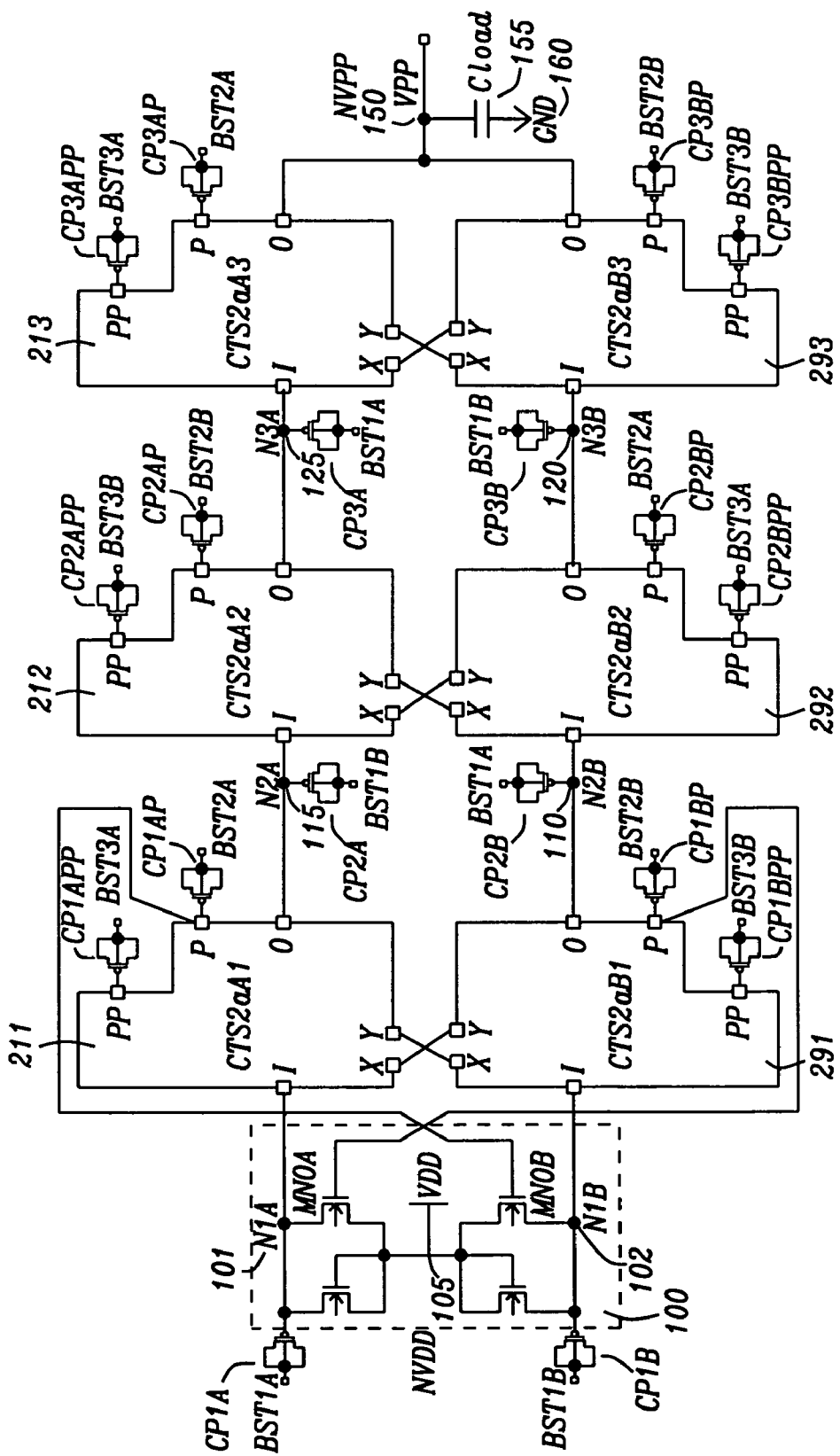

This general CP block just explained is now reused identically in structure, regarding components and terminals, on different positions in the new circuit of the invention, see FIG. 2C. Each CP-stage consisting of A- and B-part CTS is embedded into the new circuit between two consecutive pairs of main nodes NnA, NnB connected by its terminals I and N(n+1)A, N(n+1)B connected by its terminals 0 for every A- and B-part CTS respectively. The designation parts n and (n+1) are deduced from a general counting index n characterizing the consecutive order of said main nodes, which is also important, as well as the whole generalization method, when it comes to expanding the circuit up to an arbitrary number of CP-stages.

Examining FIG. 2C the circuit block 100 with input node NVDD (105) has to be explained, serving as initial precharge stage controlling the behavior of the nodes N1A (101) and N1B (102) and itself controlled by indirectly applied i.e. capacitively coupled control clock signals BST1A and BST1B fed to said nodes as well as by backwards and cross-over applied capacitively coupled control clock signals BST2A and BST2B, received from first CP-stage pump terminals P (117) on A-part CTS and P (112) on B-part CTS respectively. Revisiting FIG. 2A shows the common node NVDD connected to VDD surrounded by four MOSFETs all connected with its drains to said terminal. The first two transistors additionally also have their gates connected to said common terminal 105 and thus are diode configured as DN0A (103) and DN0B (104), they connect with their sources to nodes N1A and N1B respectively. The other two transistors are operating as switches MN0A (107) and MN0B (106) and thus connect with their sources to nodes N1A and N1B respectively. Their respective gates are cross-over connected to nodes N1BP (112) and N1AP (117), which are at the same time identical to said above mentioned pump terminals P of the B- and A-part CTS of said first CP-stage feeding said control clock signals BST2B and BST2A correspondingly. Now coming back to FIG. 2C: the representation as block diagram is especially apt to explain the cooperation of the six control clock signals BST1A, BST2A, BST3A and BST1B, BST2B, BST3B with the CTS parts of the CP-stages on one side and the CT capacitors and the control clock or pumping signals on the other side. Recalling the main nodes of FIG. 2A as N1A (101), N2A (115), and N3A (125) as well as N1B (102), N2B (110), and N3B (120), and finally NVPP (150) they can be easily identified herein as I and O terminals, i.e. input and output terminals of the CP-stages. It is also advantageous at this point to recall the identities of the auxiliary nodes N1AP (117), N1APP (119) & N1BP (112), N1BPP (114), and N2AP (127), N2APP (129) & N2BP (122), N2BPP (124), and N3AP (137), N3APP (139) & N3BP (132), N3BPP (134) from FIG. 2A and the according pump terminals P and PP on the CP-stages, respectively their A- and B-part CTS blocks. Given the semantic explanations to the choice of designations above, an identification should be easily possible. Further given the names of the capacitor configured transistors as CP1A & CP1B, CP2A & CP2B, CP3A & CP3B, and CP1AP, CP1APP & CP1BP, CP1BPP, and CP2AP, CP2APP & CP2BP, CP2BPP, and CP3AP, CP3APP & CP3BP, CP3BPP together with the explanation for their node coordinated designations allows for an easy identification also. It can now be observed from the block diagram FIG. 2C that, following said initial precharge stage 100 responsible for the clock signal controlled distribution of the power supply voltage VDD (low!) at node NVDD (105) to the symmetrical A- and B-branches of the new three-stage voltage multiplier circuit, said three CP-stages with their symmetrical A-part (210) and B-part CTS (290) defined above with the help of FIG. 2B in a general manner, are all connected serially and in the same way and are all controlled by appropriate control clock or pumping signals all fed via capacitor configured transistors into the circuit, in order to generate the elevated output voltage VPP (high!) at the load capacitor Cload (155) on node NVPP (150). Thus we have three pairs of identical CTS circuit blocks as CP-stages cooperating with three pairs of control clock signals; CTS circuit blocks named generally CTS2aAs (210) and CTS2aBs (290): individually CTS2aA1 (211) and CTS2aB1 (291) as first, CTS2aA2 (212) and CTS2aB2 (292) as second and CTS2aA3 (213) and CTS2aB3 (293) as third CP-stage. The main nodes N1A & N1B and N3A & N3B are receiving control signals BST1A and BST1B respectively i.e. directly, main nodes N2A & N2B is receiving the same signals but in a complementary mode, i.e. BST1B and BST1A respectively. Similarly do the auxiliary nodes or pump terminals P and PP of the A-part as well as the B-part CTS of CP-stages one and three receive the control signals BST2A and BST3A as well as BST2B and BST3B directly, alone CP-stage two receives the control signals in cross over mode, i.e. pump terminals P and PP get the control signals BST2B and BST3B for the A-part CTS as well as BST2A and BST3A for the B-part CTS.

Figure 2D:
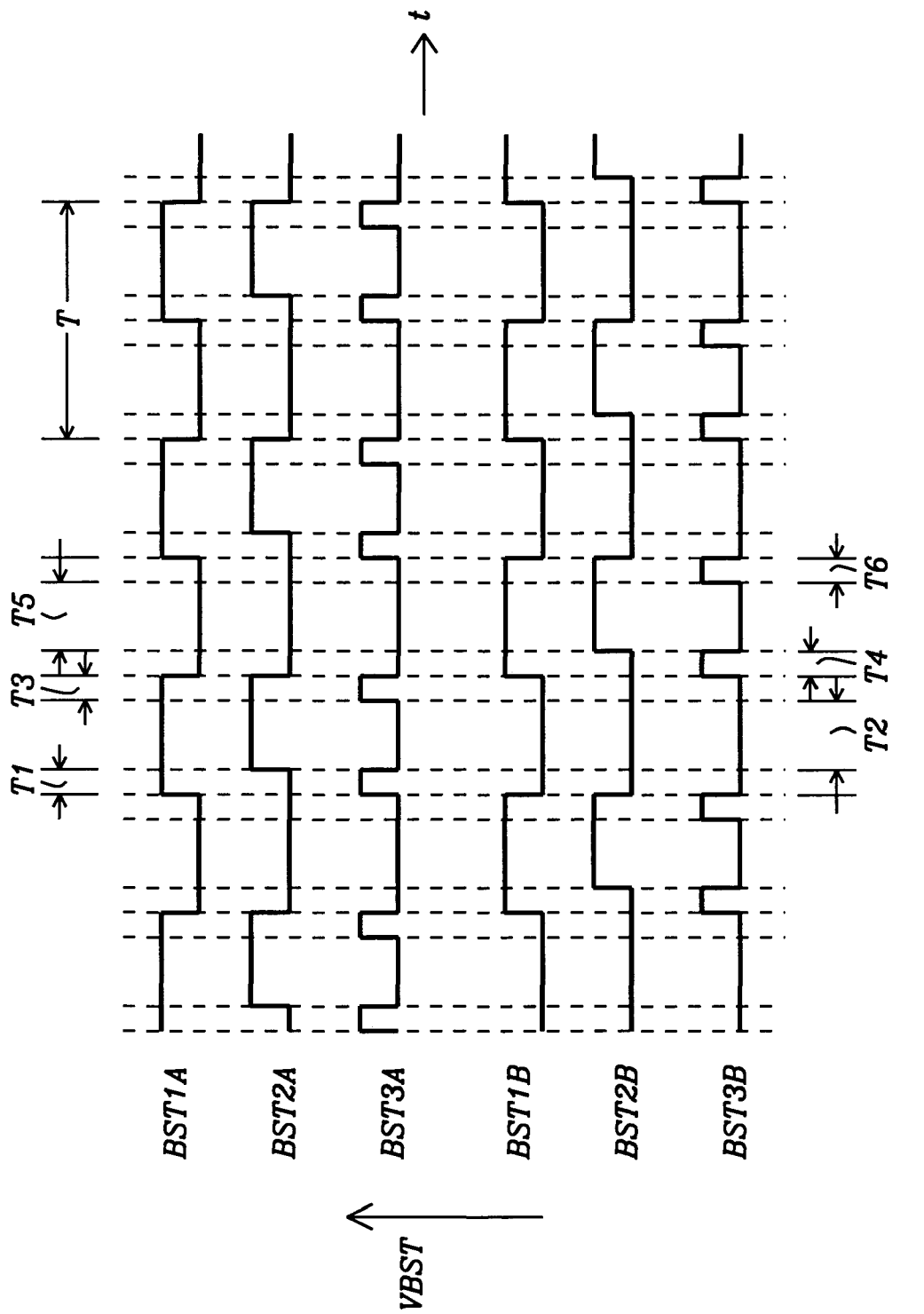

FIG. 2D depicts the time diagram for the six essential multiphase control signals as three pairs of control clock signals BST1A, BST2A, BST3A and BST1B, BST2B, BST3B used in operating the new circuits of FIGS. 2A-3F. One basic period of these periodic signals is subdivided into six individual time segments T1-T6, the operational influence of which on the circuit and its function is later on explained in greater detail.

Figure 2E:
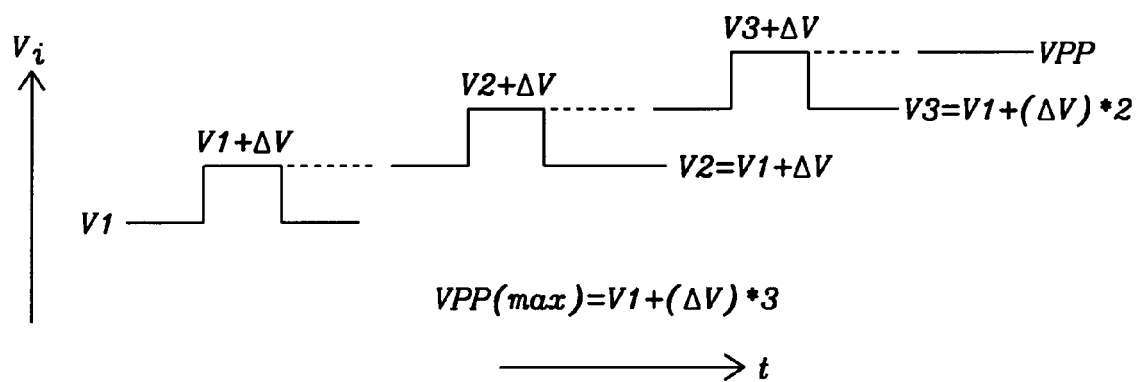

The voltage diagrams over time presented in FIG. 2E depict three internal node voltages (V1, V2, and V3 at N1A, N2A, and N3A respectively) during operation of the new voltage multiplier circuit of FIGS. 2A or 2C driven by the multiphase control clock signals shown in FIG. 2D under some premises made possible by the new circuit of the invention: due to the new CTS blocks and the multiphase control scheme are threshold voltages or forward diode voltage drops almost avoided i.e. charge sharing is virtually ideal or in other words: charge transfer is nearly complete. All stray capacitances are neglected; no load current is drawn from output node NVPP (150) with voltage VPP. The attainable output voltage can thus reach VPP=V1+3* (.DELTA.V) wherein (.DELTA.V) has already been explained above.

Notes:

V1, V2, and V3 are the pre-boost voltage levels of nodes N1, N2, and N3 respectively. V1+(.DELTA.V), V2+(.DELTA.V), and V3+(.DELTA.V) are the post-boost voltage levels of nodes N1, N2, and N3 respectively.

Reconsidering now the common practice in the development of cost effective electronic appliances and their circuit boards with modern IC systems, where negative supply voltages are not furnished any longer by the power source for the boards itself, for reasons of an economical production of the appliances, a reliable and effective solution is necessary to generate negative voltages or high negative voltages when and wherever needed and this only with the aid of the available positive supply source voltages or out of ground. VDD and VSS (this name is used for Ground or 0 voltage) are the most common power source voltages in monolithic IC. Fortunately it doesn't matter if generating a high positive voltage or a high negative voltage, because theoretically this generation can be started from positive, ground, or negative voltages by the present invention. This is made possible because the precharge power source voltage can be chosen independently of the multi-phase control clock signal voltages. Thus for the same reason, the transitions of the control clock voltages are also not limited to the window extended by VDD to ground. Their transitions can take place in a window extending from negative voltage to ground or from negative voltage to positive voltage as well or vice-versa. Generally, the most convenient combination of power source as precharge voltage source and appropriate voltage transitions for the control clock signals will be used. Convenience is hereby expressed in terms of efficiency, reliability and manufacturing costs. Thus for generating a high positive voltage, normally VDD is used as the precharge source voltage, and VSS to VDD for the control clock signals' transition window. For generating a high negative voltage, VSS (ground) is used as the precharge source voltage, and VDD to VSS for the control clock signals' transition window. For legacy reasons the designation VSS can still stand for a negative supply voltage, however it is generally used for designating ground, because negative voltages are not supplied separately as explained above. If now an IC itself needs negative voltages for a specific application, it needs negative charge pump circuits (as presented in the current invention here) to generate those negative voltages with the help of a positive voltage and ground.

In order to better understand the operation of a Charge Pump (CP) circuit using two capacitors and two switches—thus implementing a basic CP-stage—the process to generate a negative voltage VBB using VSS or ground (GND) and a positive voltage VDD is explained by the help of FIGS. 3A-3G showing the given CP circuit in diagrams at seven consecutive time steps, corresponding to the time segments T1-T6 (and back to T1 again) already introduced in FIG. 2D. These segments are also shown later on, in a for this case appropriately adapted form in FIG. 4K, which then exhibits the necessary time diagram of the used multiphase control signal BST allowing an action of charge transfer with this circuit resulting in polarity inversion. The circuit consists of a basic stage comprising two equally sized capacitors C1 and C2 (thus C1=C2; no functional requirement, for simplicity reasons only!) and two switches SW1 and SW2. The first capacitor C1 is connected at one side to a terminal furnishing the time dependent voltage of the multiphase BST control signal, varying between VDD and VSS (GND), then C1 is leading with its other side to node N1 which is a common terminal for both switches SW1 and SW2, whereat switch SW1 leads when closed to a voltage VSS (GND) and switch SW2 leads when closed to the output terminal VBB as well as to one side of the second capacitor C2, again connected with its other side to said voltage VSS (GND)=0.

Figure 3A:
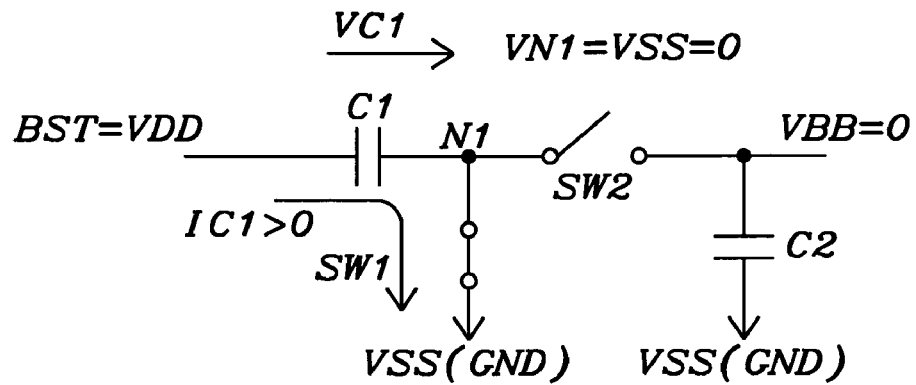
FIGS. 3A-3G show for a switched two capacitor CP-stage at seven time steps for the time segments as defined in FIGS. 2D & 4K (periods T1-T6 and T1 again) the detailed action of charge transfer resulting in polarity inversion.

FIG. 3A illustrates for step 1 the operation at time segment T1 when switch SW1 is closed and switch SW2 is open. The voltage value at the terminal for control signal BST is BST=VDD. Thus a load current IC1>0 is flowing through capacitor C1 precharging C1 up to voltage VC1, whereby node N1 is at voltage VN1=VSS=0, because SW1 is closed; some power is consumed. The output voltage VBB at capacitor C2 is VBB=0.

Figure 3B:
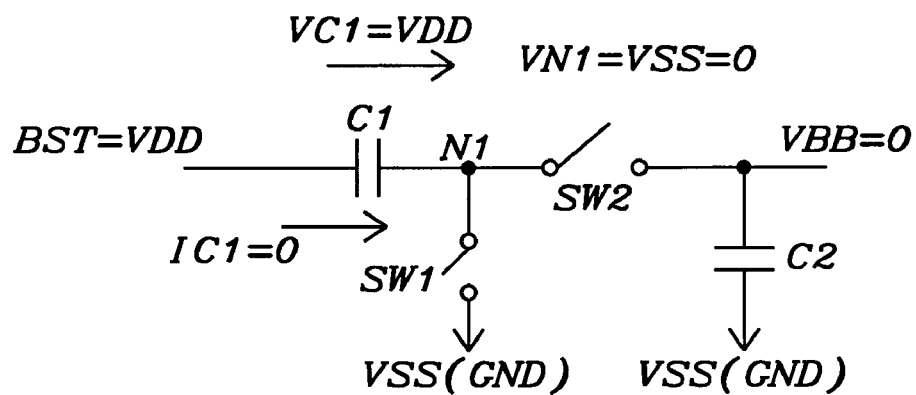

FIG. 3B illustrates for step 2 the operation at time segment T2 when switch SW1 and switch SW2 are both open. The voltage value at the terminal of control signal BST remains at BST=VDD. The load current IC1=0 has stopped flowing; no power is consumed any more. Capacitor C1 has reached its final voltage value VC1=VDD, whereas node N1 remains at voltage VN1=VSS=0 because of IC1=0, although SW1 is open now. The output voltage VBB at capacitor C2 remains at VBB=0.

Figure 3C:
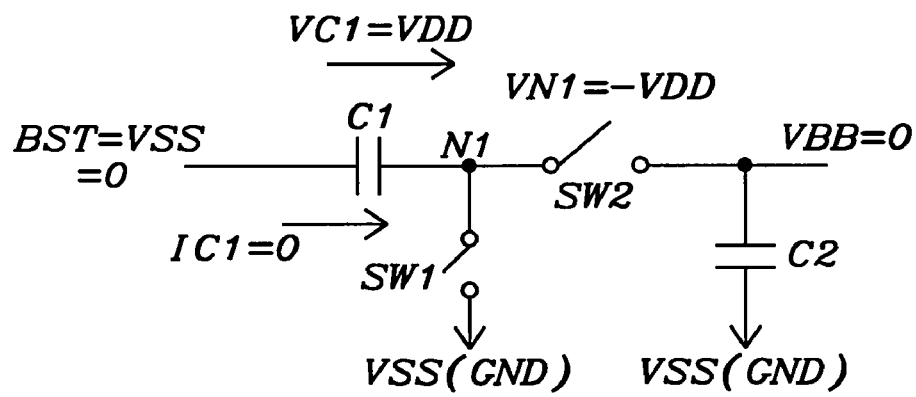

FIG. 3C illustrates for step 3 the operation at time segment T3 when switch SW1 and switch SW2 are still both open. Now the voltage value at the terminal of control signal BST is changing to VSS, thus transiting from BST=VDD to BST=VSS=0. The load current IC1=0 is unchanged; thus no power is consumed. Together with capacitor voltage VC1=VDD from step 2 the node voltage VN1 at node N1 is now shifted by −VDD from VN1=VSS=0 to VN1=−VDD, because Kirchhoffs voltage law enforces VC1+VN1=0, therefore allowing equalization of the voltages at the terminal of control signal BST and the GND terminal, which is VSS=0 also.

Figure 3D:
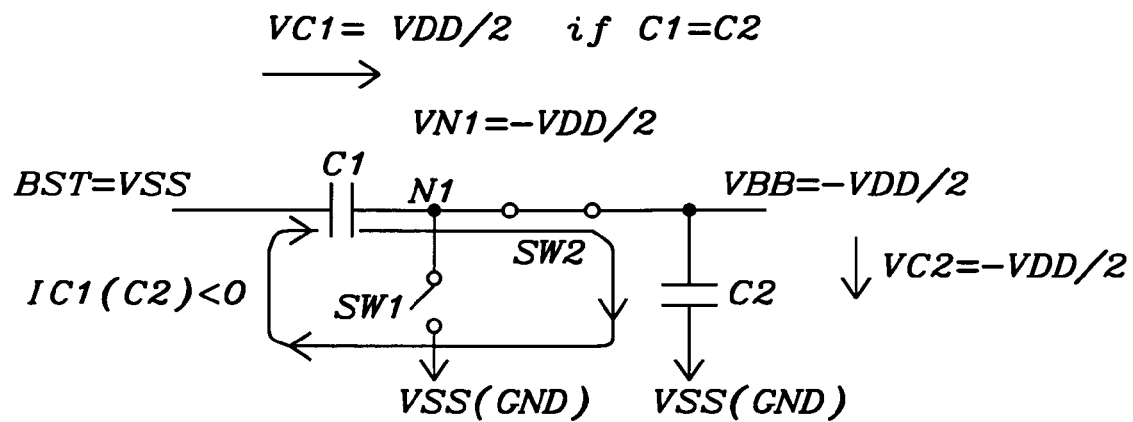

FIG. 3D illustrates for step 4 the operation at time segment T4 when switch SW1 is still open, switch SW2 is now closed however. The voltage value at the terminal of control signal BST is remaining at BST=VSS=0. Thus both capacitors C1 and C2 are now connected in series and are forming a closed circuit for charge sharing. An equalizing current IC1(C2)<0 is flowing, as the charge from capacitor C1 is distributed via charge transfer on capacitor C2 in same amounts, because of C1=C2 being capacitors of the same size and thus leading to a first capacitor voltage VC1=VDD/2 resulting in a voltage VN1=−VDD/2 for node N1 and thus a second capacitor voltage VC2=−VDD/2, because switch SW2 is closed. The output voltage VBB has therefore changed from VBB=0 to VBB=VC2=−VDD/2, exhibiting now said desired polarity inversion. In ideal cases no power is consumed.

Figure 3E:
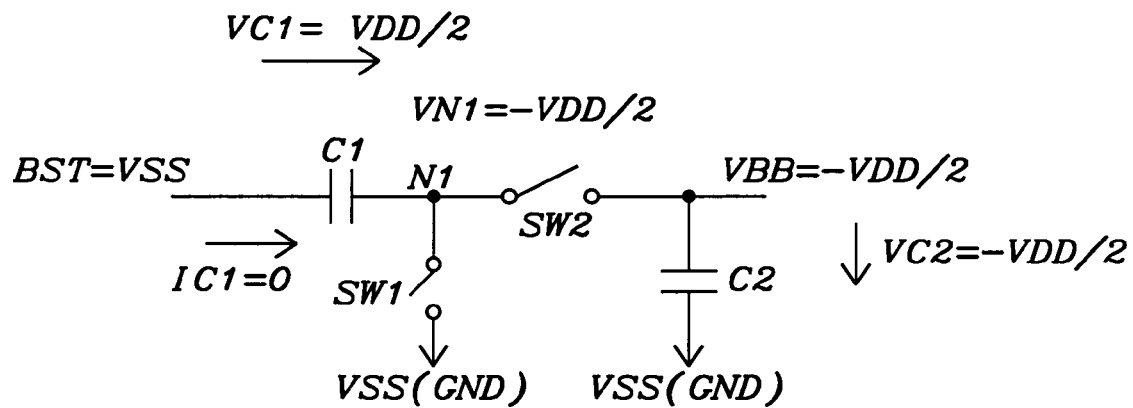

FIG. 3E illustrates for step 5 the operation at time segment T5 when switch SW1 and switch SW2 are both opened again. The voltage value at the terminal of control signal BST is still remaining at BST=VSS=0. The equalizing current IC1(C2) <0 is not flowing any more, because switch SW2 has been opened, thus the current through capacitor C1 is IC1=0 again, and again no power is consumed. All the voltages for capacitors C1 and C2 as well as node N1 and output VBB remain unaltered compared to step 4.

Figure 3F:
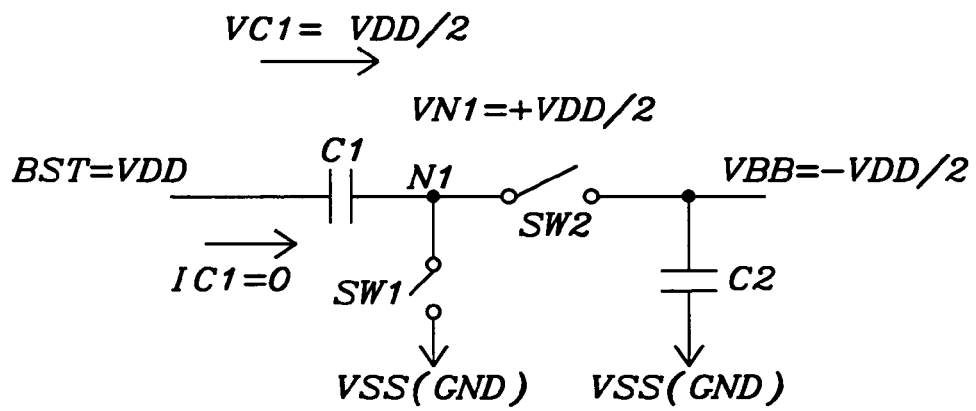

FIG. 3F illustrates for step 6 the operation at time segment T6 where both switches SW1 and SW2 are remaining open. The voltage value at the terminal of control signal BST is changed back to BST=VDD however, thus transiting from BST=VSS=0 to BST=VDD. The current through capacitor C1 is remaining still at IC1=0, still again no power is consumed. Due to the changed voltage of control signal BST Kirchhoffs voltage law enforces now VC1+VN1=VDD, whereby the voltage of capacitor C1 still remains at VC1=VDD/2 thus shifting the voltage level of node N1 by VDD from VN1=−VDD/2 to VN1=VDD/2. The output voltage VBB=−VDD/2 is unaltered again.

Figure 3G:
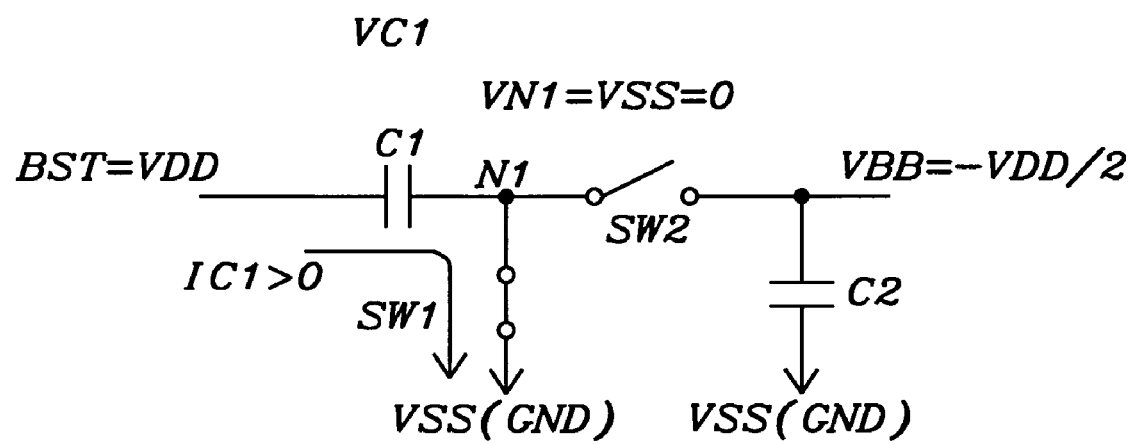

FIG. 3G illustrates for step 7 the operation back at time segment T1 again, when switch SW1 is closed and switch SW2 is open. The voltage value at the terminal of control signal BST is remaining now at BST=VDD, which is the same value as in step 1. Because of the closed switch SW1 a charge current IC1>0 is again flowing through capacitor C1 thus raising the voltage of capacitor C1 from VC1=VDD/2 to finally VC1=VDD; some lesser power is consumed compared to the initial situation. Due to the closed switch SW1 the voltage at node N1 is precharged to VSS=0 again, same as in step 1. Differing now however from the conditions in step 1 is the output voltage VBB=−VDD/2, compared to VBB=0 in step 1 above. The output voltage VBB has thus been pumped from 0 to −VDD/2, resulting in a voltage with inverted polarity compared to VDD!

Figure 4A:
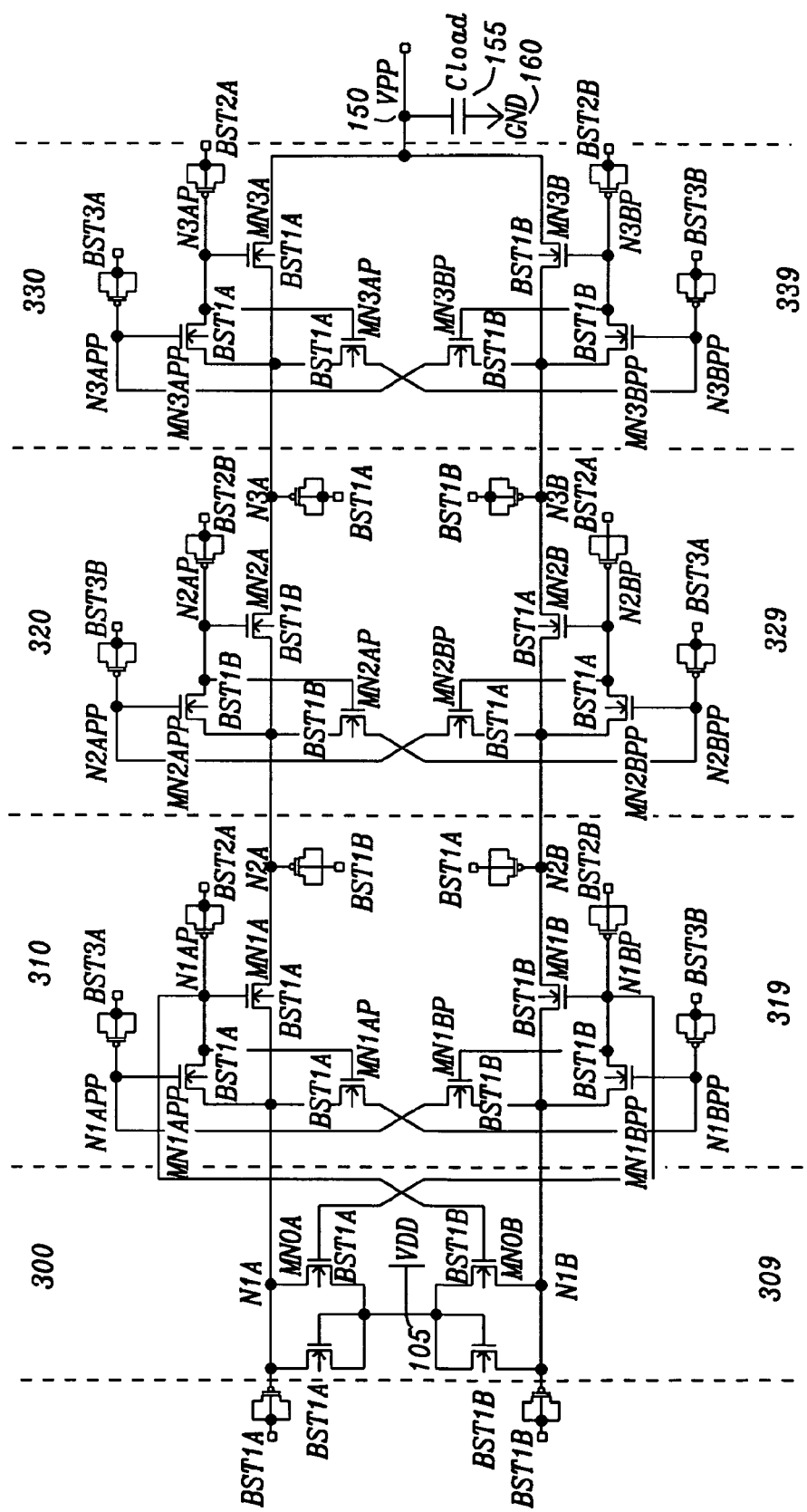
FIG. 4A presents the detailed circuit schematics of a modified new three-stage voltage multiplier device making use of a triple-well IC manufacturing technology for another embodiment according to this invention.
Figure 4B:
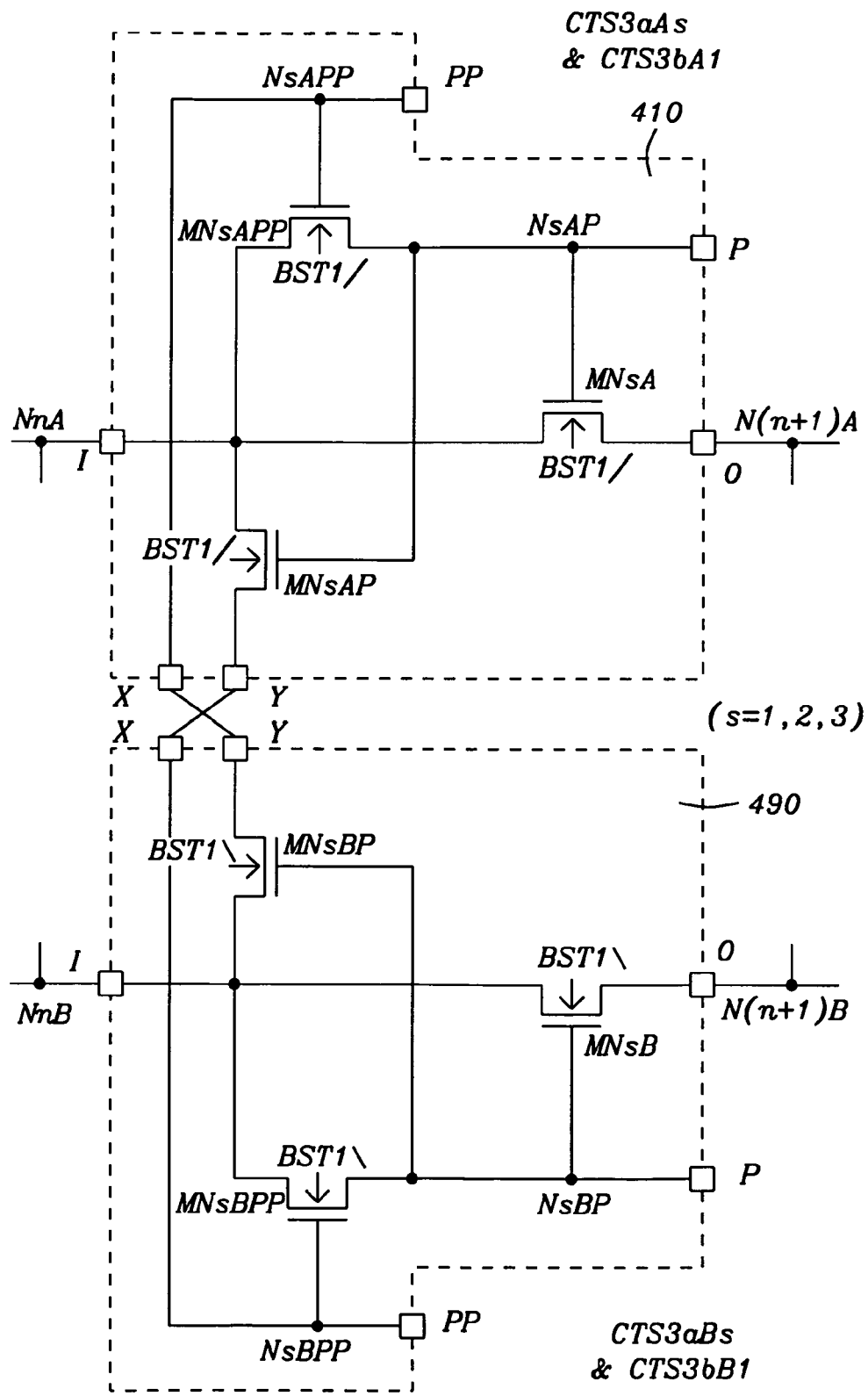
FIG. 4B exhibits a generalized circuit and block diagram of a CP-stage for the new circuit of FIG. 4A, whereby CTS sub circuits and their components as shown in FIG. 4A are combined into exemplary circuit blocks as CTS3aAs and CTS3aBs (s=1,2,3). This same circuit block representation is further used also in conjunction with FIG. 4F as CTS3bA1 and CTS3bB1.
Figure 4C:
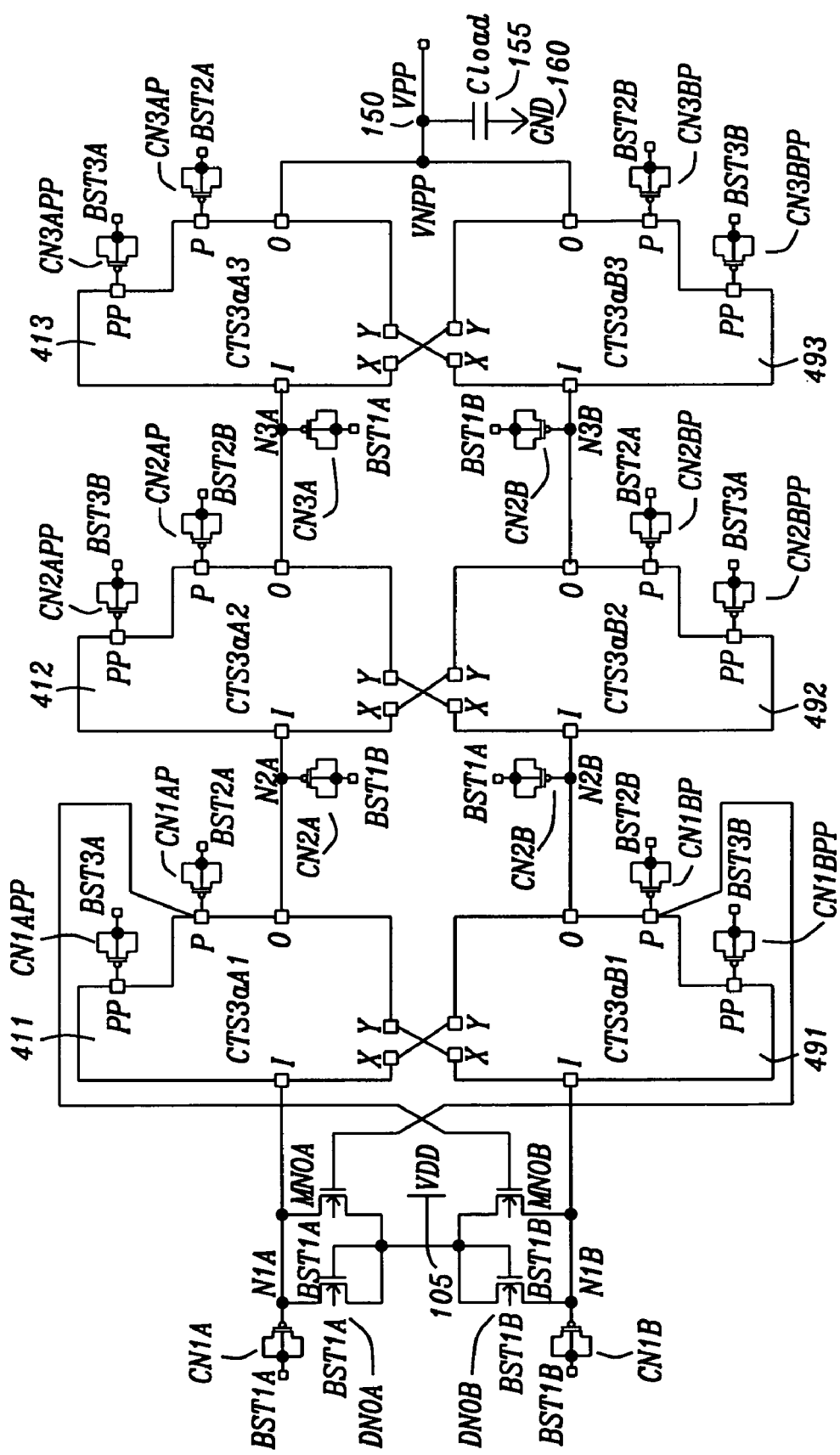
FIG. 4C presents the circuit schematics for said modified new three stage voltage multiplier again, but as block diagram now drawn with the help of the CTS circuit blocks CTS3aAs and CTS3aBs (s=1,2,3) as depicted in FIG. 4B.
Figure 4D:
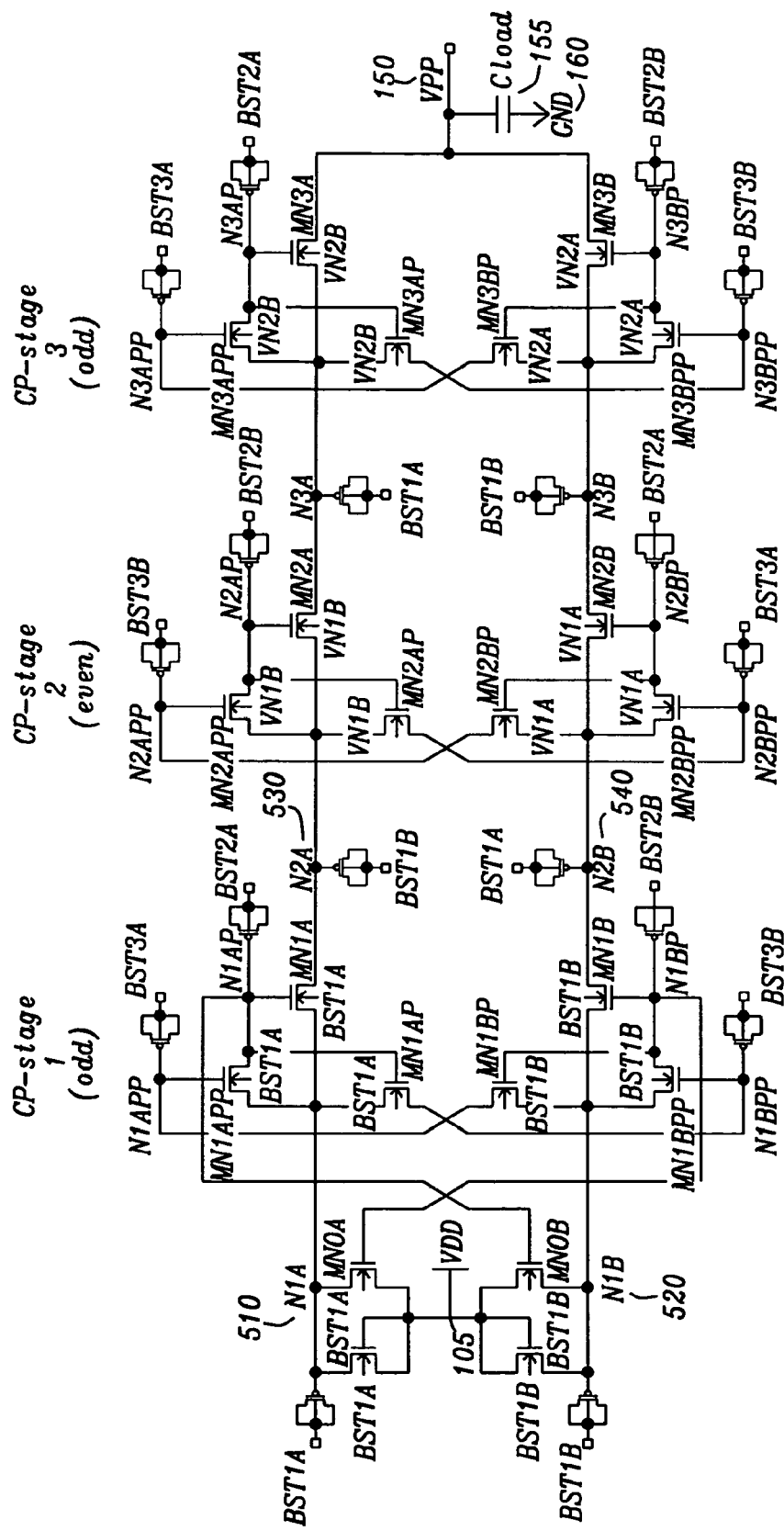
FIG. 4D presents the detailed circuit schematics of a further modified new three-stage voltage multiplier device generating a positive output voltage as further embodiment according to this invention.
Figure 4E:
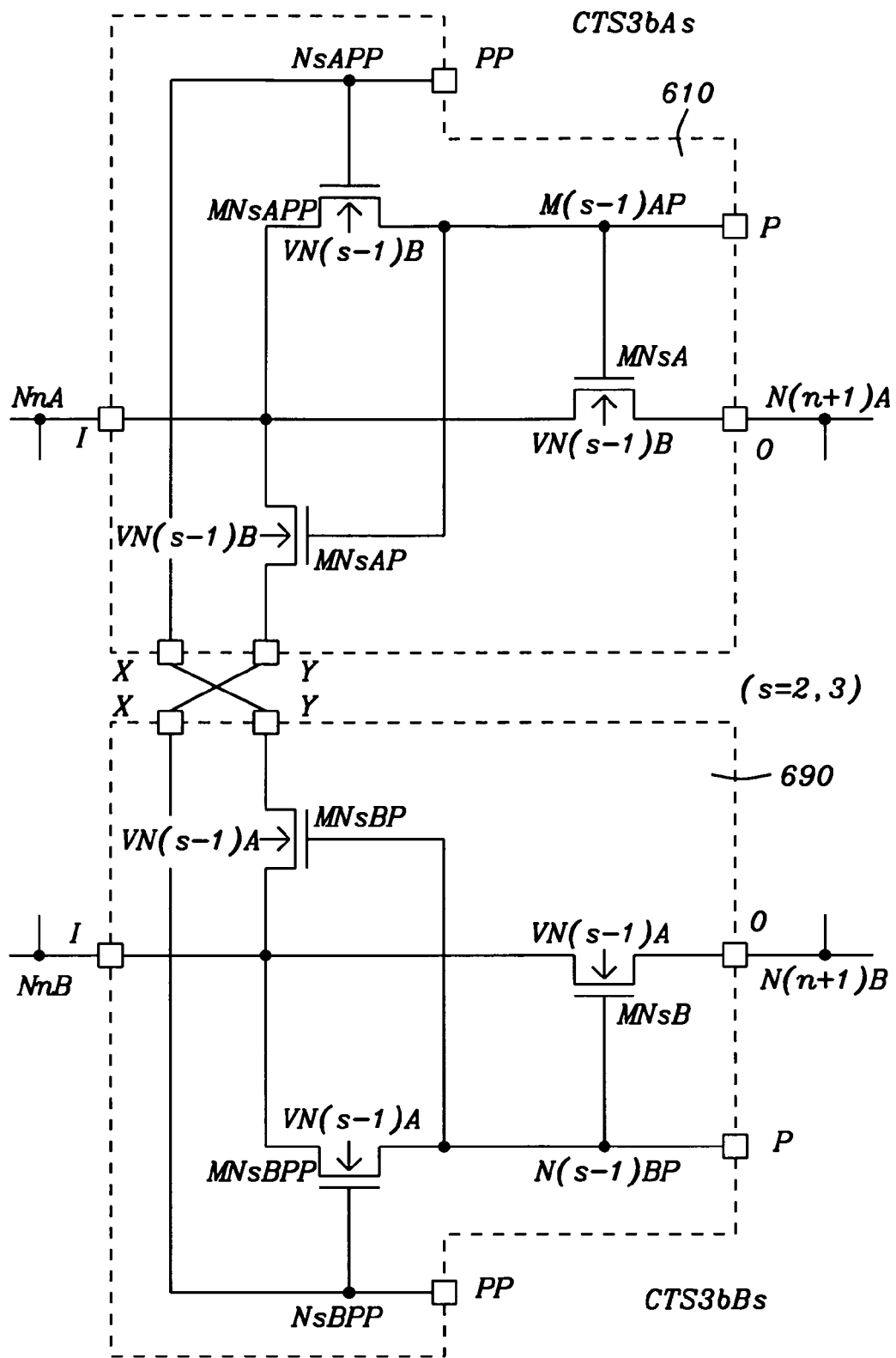
FIG. 4E exhibits a generalized circuit and block diagram of CP-stages 2 and 3 for the new circuit of FIG. 4D, whereby CTS sub circuits and their components as shown in FIG. 4D are combined into exemplary circuit blocks as CTS3bAs and CTS3bBs (s=2,3).
Figure 4F:
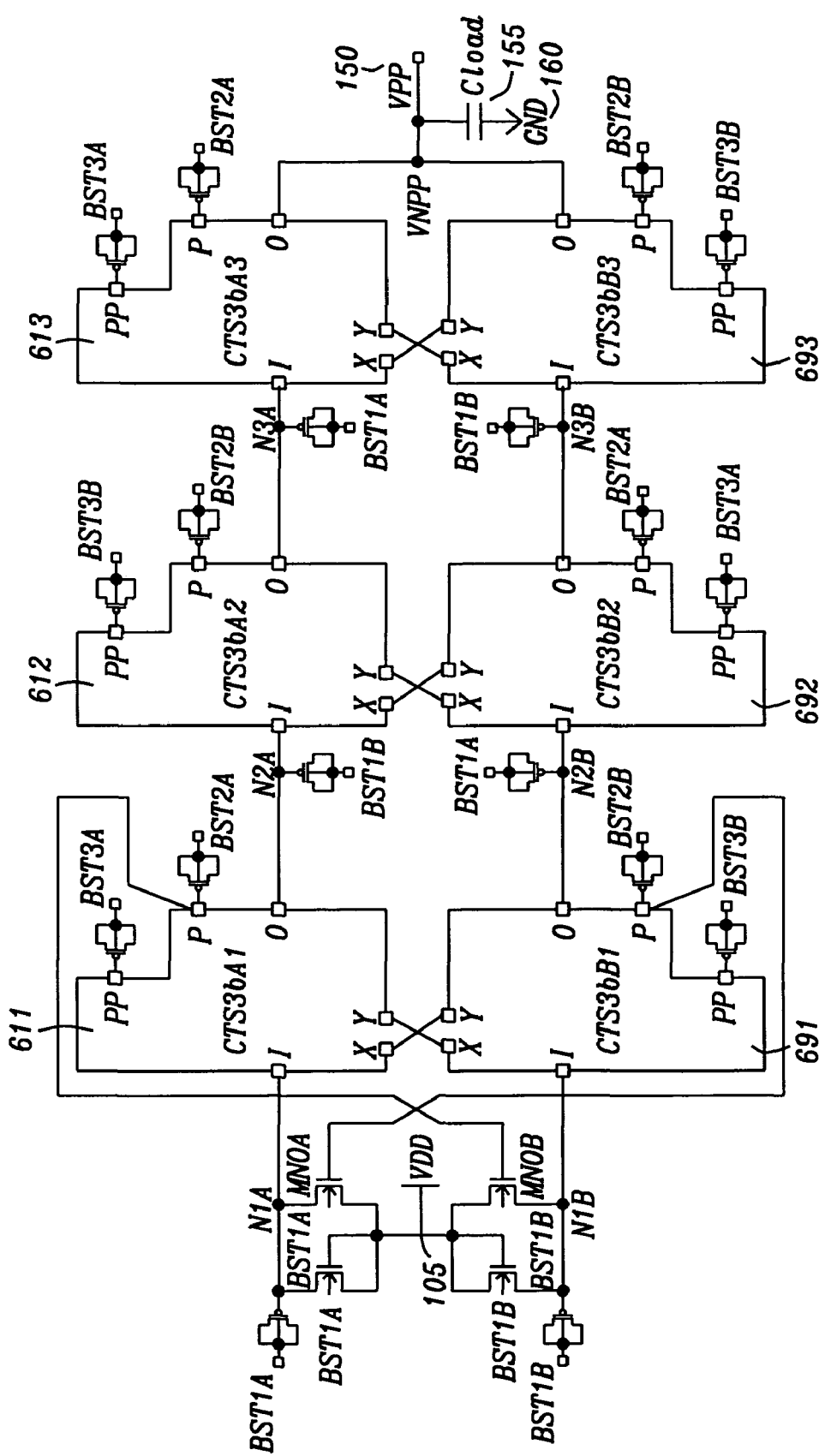
FIG. 4F presents the circuit schematics for said further modified new three stage voltage multiplier again, but as block diagram now drawn with the help of the CTS circuit blocks CTS3bA1 and CTS3bB1 as depicted in FIG. 4B and CTS3bAs and CTS3bBs (s=2,3) as depicted in FIG. 4E.
Figure 4G:
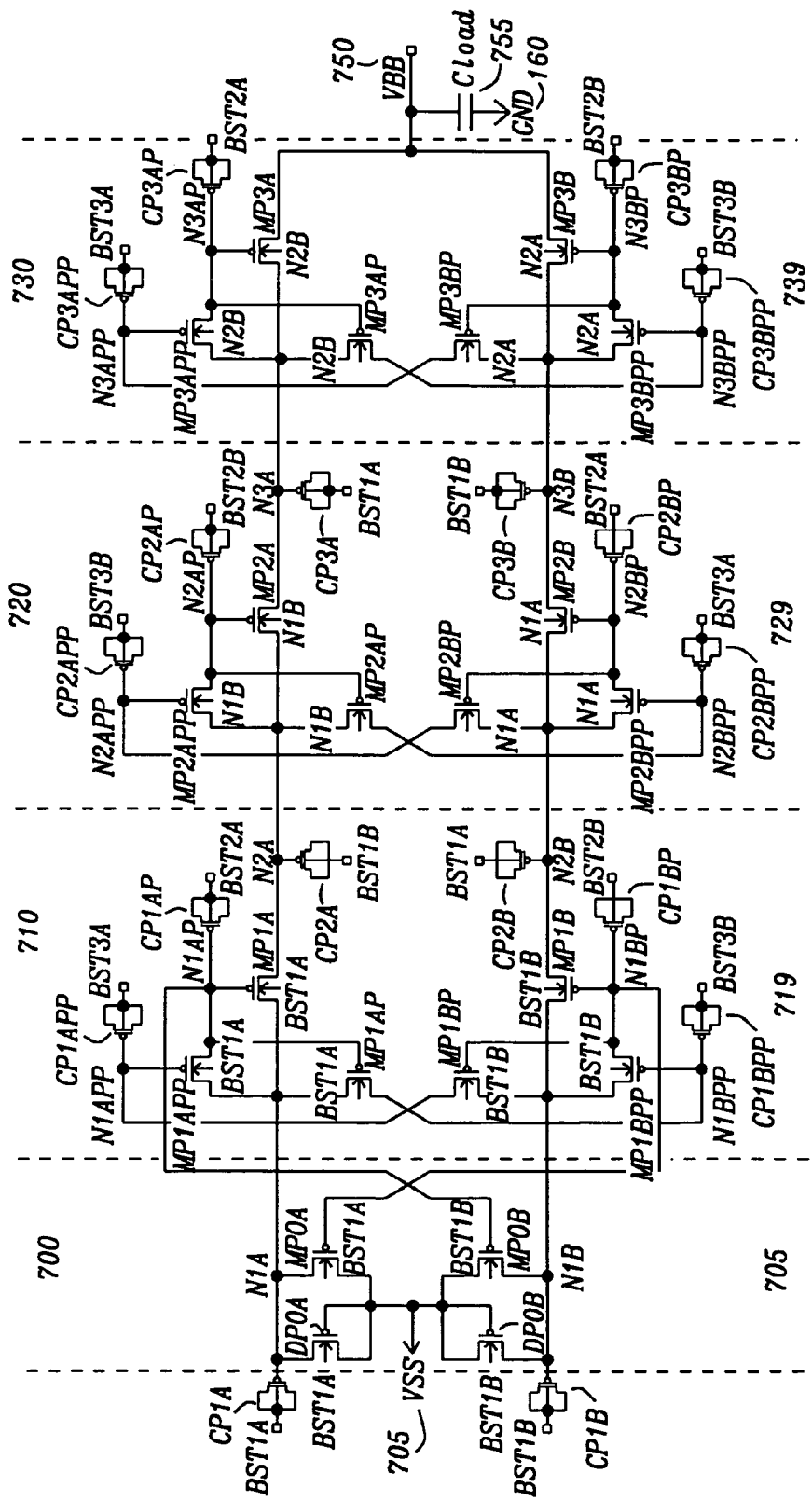
FIG. 4G shows the detailed circuit schematics of a further new and modified three-stage voltage multiplier device generating a negative output voltage, thus representing another further embodiment according to this invention.
Figure 4H:
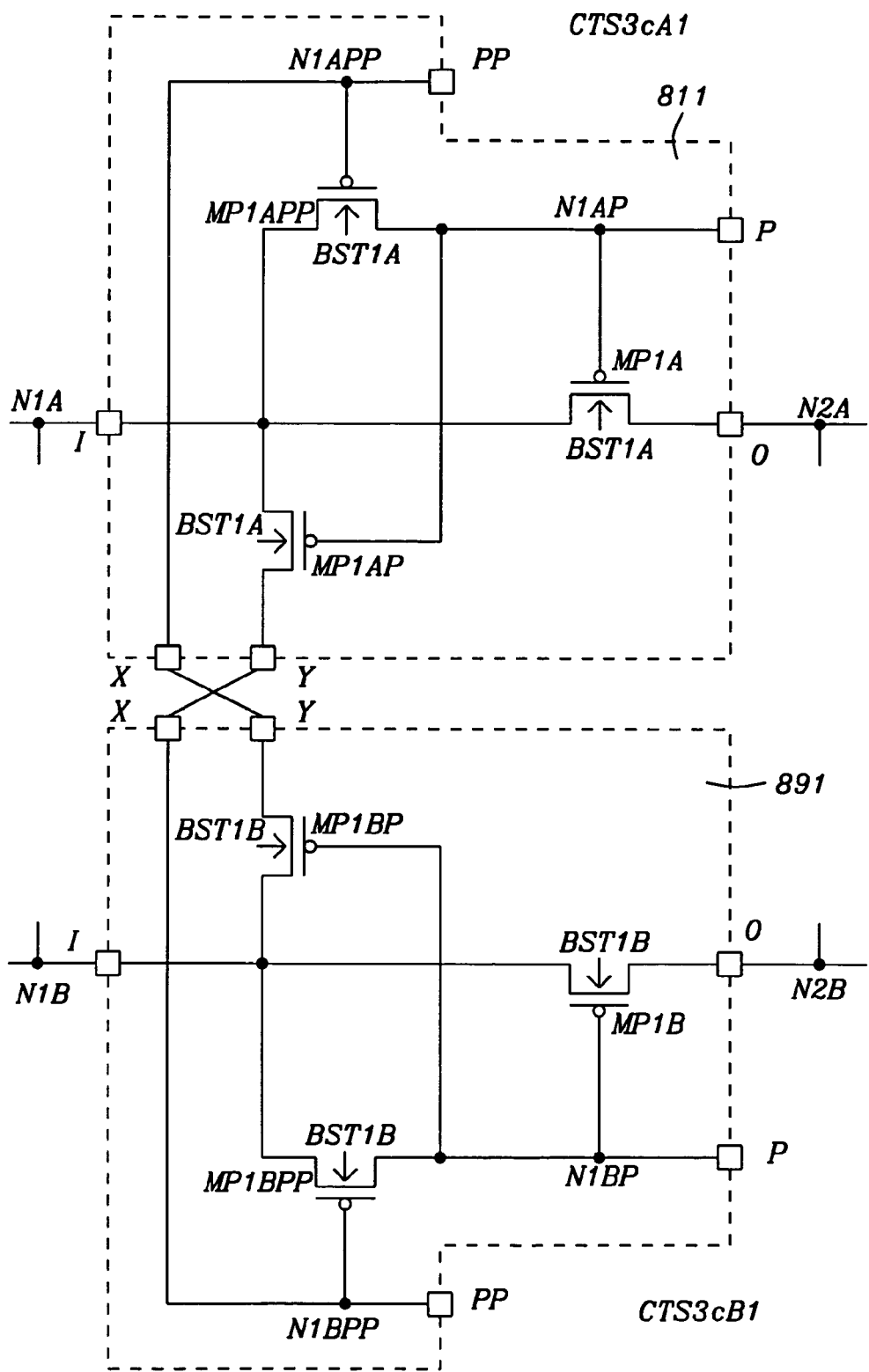
FIG. 4H exhibits a generalized circuit and block diagram of CP-stage 1 for the new circuit of FIG. 4G, whereby CTS sub circuits and their components as shown in FIG. 4G are combined into the exemplary circuit blocks CTS3cA1 and CTS3cB1.
Figure 41:
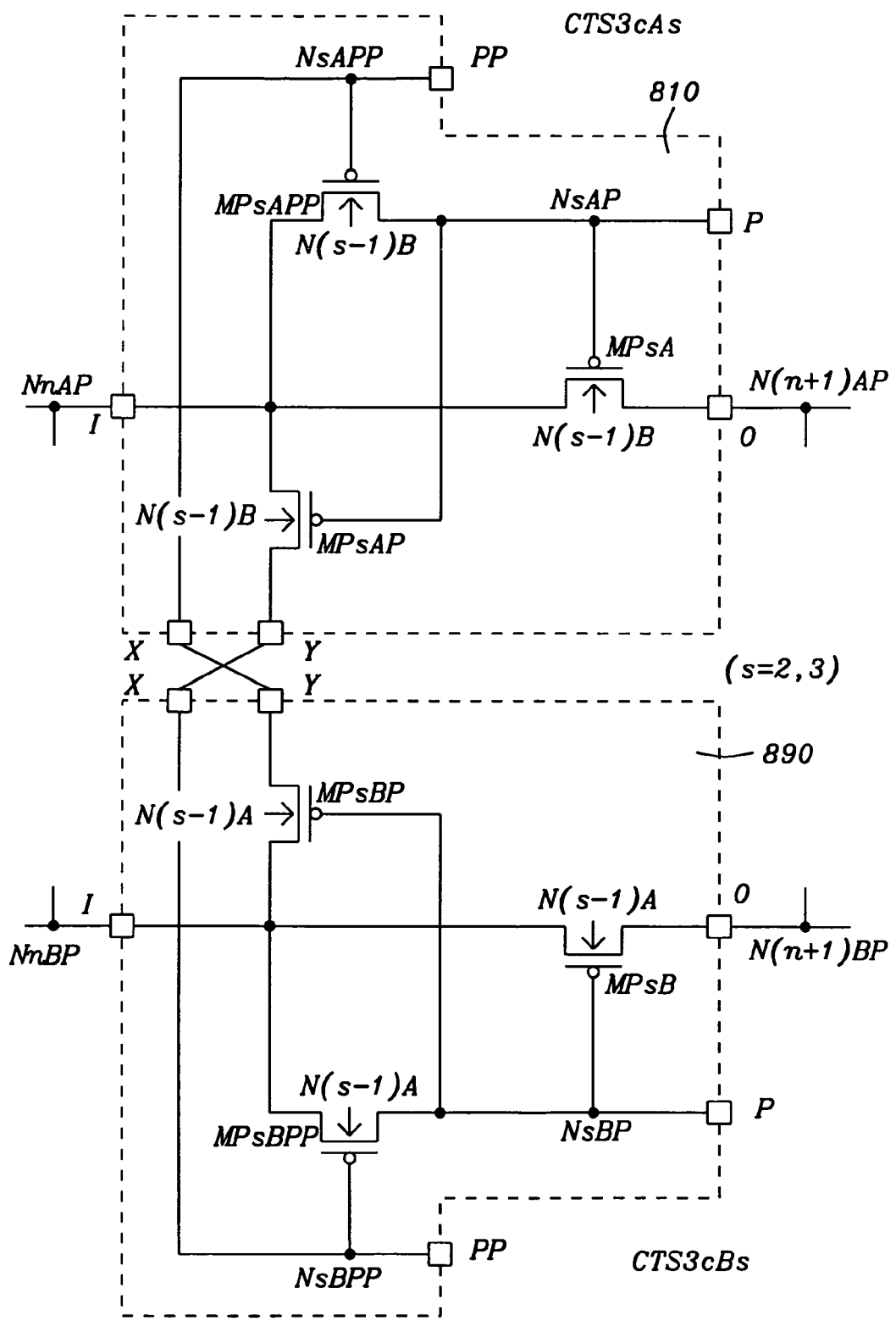
Figure 4J:
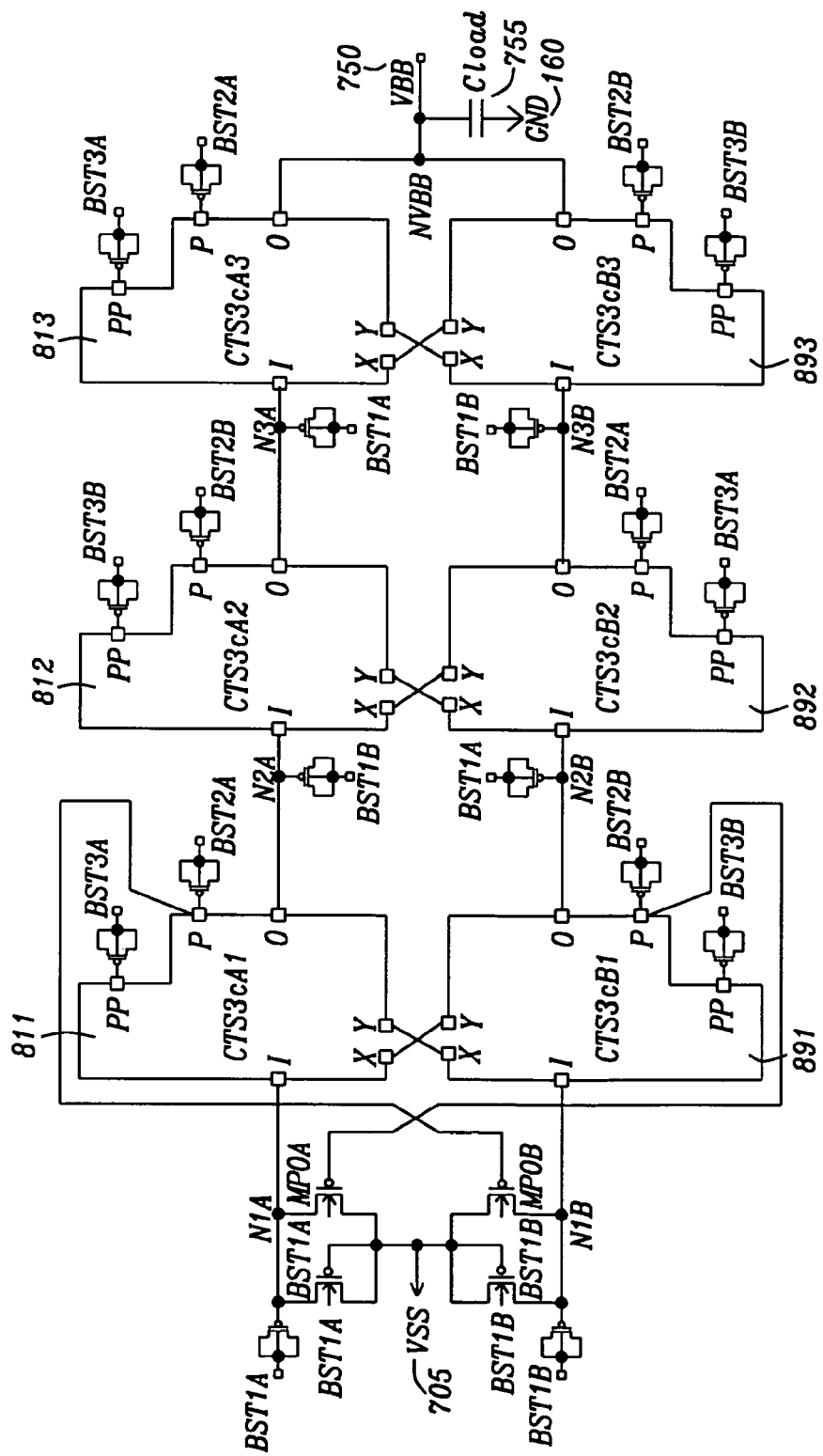
FIG. 4J presents the circuit schematics for said further new and modified three stage voltage multiplier again, but as block diagram now drawn with the help of the CTS circuit blocks CTS3cA1 and CTS3cB1 as depicted in FIG. 4H and CTS3cAs and CTS3cBs (s=2,3) as depicted in FIG. 4I.
Figure 4K:
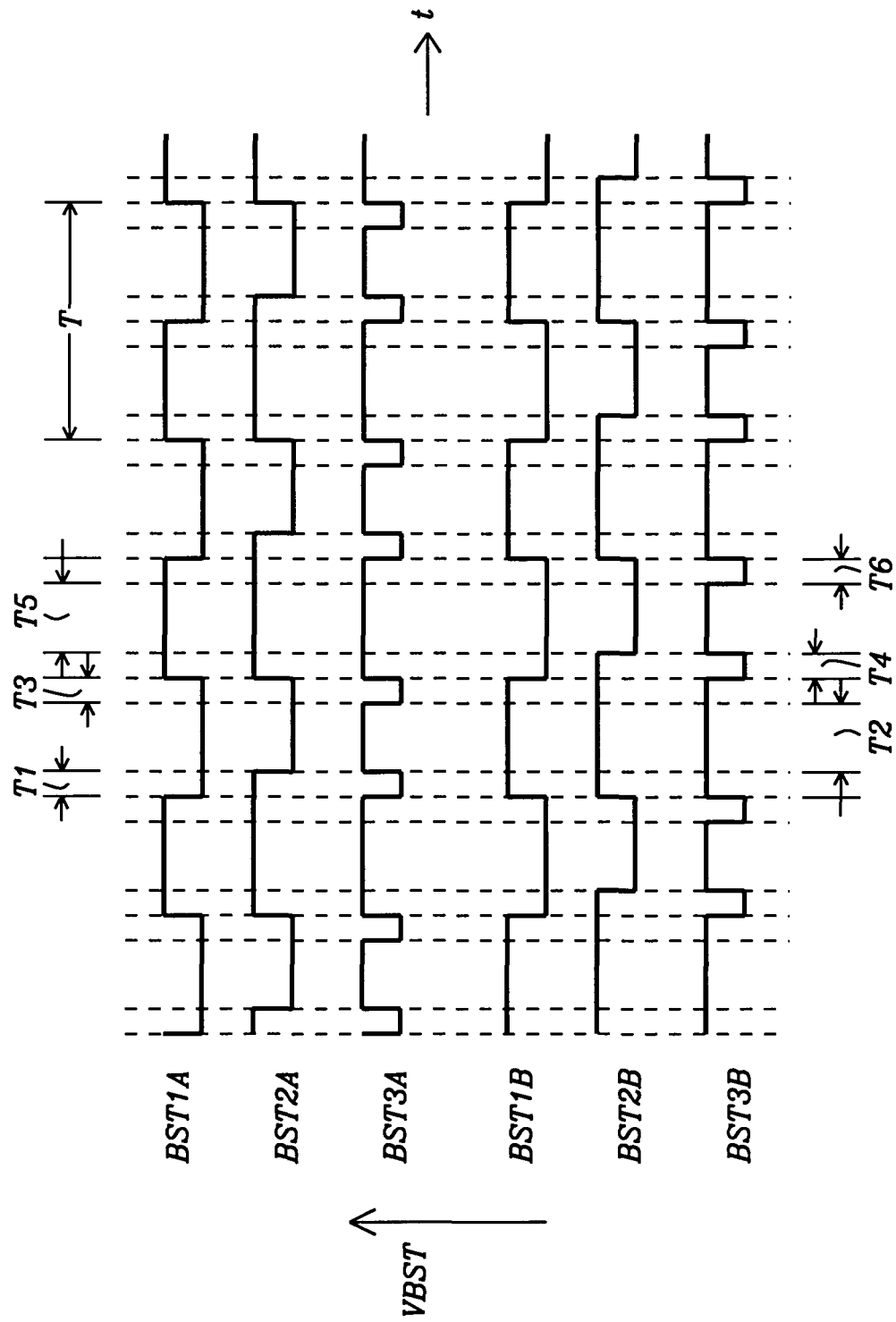
FIG. 4K depicts the time diagram for the six essential modified multiphase clock control signals for the circuit given in FIG. 4G.

Having understood the underlying principles of operation with the help of a basic CP-stage in case of pumping with polarity inversion the general construction method for more sophisticated multiphase control signals can be specified, applicable to multi CP-stage circuits in all the cases for generating high positive or high negative output voltages derived from positive or negative source voltages or ground, also for both polarity combinations i.e. with and without polarity inversion: thus leading to the multiphase control signal schemes given in FIG. 2D for non-inverting voltage generation operations and FIG. 4K for inverting voltage generation operations for multi stage voltage multiplier circuits according to this invention. Thereto also belongs the optimal choice of available supply voltages when generating the needed high output voltages in combination with an optimal determination of CP-stage counts and the specification of the related control signal transition voltage window, all this done under consideration of minimal power consumption or transfer losses and maximal conversion efficiency. Another aspect influencing these consumption, loss and efficiency figures and not mentioned until now is an optimized calculation of the component values, especially capacitors under consideration of on/off resistances of non-ideal MOS switches, which in turn determines the emerging capacitor load or charge currents and consequently also determines the timing behavior of the circuit as well as duration of time segments or in other words, the switching frequency for the circuit and its pertinent control signals. As can be seen from FIGS. 2D & 4K the lengths of the time segments are prearranged such that a period T of the pulse is summing up to T=T1+T2+T3+T4+T5+T6, further that T1+T2+T3=T4+T5+T6, whereas approximately T2=T5 and also T1=T3=T4=T6, whereby T2 and T5 are set as approximately 2-4 times T1. All these parameters have to be optimized by the help of appropriate design tools, thus leading to the simulation results as shown in FIGS. 7A-7J.

An important embodiment of the current invention described as follows and applying the operational principles explained above additionally makes use of a more sophisticated technological manufacturing process for integrated circuits.

Looking at FIG. 4A a nearly identical circuit compared to FIG. 2A is recognized. The MOSFETs are fabricated however as triple-well structures, which means that individual bulk voltage potentials can be established thus maintaining always the same operating conditions for the transistors in every stage. A process technology providing triple well MOSFET structures is employed whereby an NMOS transistor is buried in an isolated or buried P-Well, which is separated from the P-Substrate by circumferential N-Well and base forming Deep N-Well layers, thus the P-Well of the buried NMOS transistor can be boosted, i.e. its voltage potential can be appropriately adapted reducing the body effect, therefore lowering the threshold voltage drop and therewith also relaxing the gate oxide stress for the buried NMOS transistor.

This is indicated in FIGS. 4A-4C by applying adequate voltage signals to the bulk connections of the MOSFET components, suitably employing the correspondent control clock signals BST1A and BST1B, utilized according to the MOSFETs in A- or B-parts of initial precharge stage and of the CTS segments and for the individual CP-stages respectively. Thus we need the signal BST1A for all MOSFETs within the A-part 300 of the initial precharge stage and for all MOSFETs of the A-parts (310 & 330) of CTS in odd numbered stages and the B-parts (329) of CTS in even numbered stages and signal BST1B for all MOSFETs within the B-part 309 of the initial precharge stage and for all MOSFETs of the B-parts (319, 339) of CTS in odd numbered stages and the A-parts (320) of CTS in even numbered stages. This is clearly shown in the complete detailed drawing of FIG. 4A and for the generalized CP-stage with its A- and B-part CTS circuit blocks also in FIG. 4B, whereby the given explanations and the nomenclature as defined above within the context of FIGS. 2A & 2B still hold.

FIG. 4B depicts a generalization of a CP-stage, with its upper A-part CTS (410) and its lower B-part CTS (490), from said new triple-well enhanced circuit of the invention described with the help of FIG. 4A. The topological and electrical assembly of these circuit blocks is unchanged compared to the circuit blocks of FIG. 2B, except for all their MOSFET components having their bulk connections voltage controlled now, made possible by the triple-well process applied. Therefore the bulk voltage signals BST1\ and BST1/ are additionally introduced. Slash (/) and backslash (\) as placeholder X symbols reminding of the alternating use of A- and B-version control clock signals of BST1X in odd and even numbered CP-stages in such a way, that odd numbered CP-stages port A-version signals in A-part CTS circuit blocks as well as B-version signals in B-part CTS circuit blocks and even numbered CP-stages port B-version signals in A-part CTS circuit blocks as well as A-version signals in B-part CTS circuit blocks. This scheme is also important when it comes to expanding the circuit up to an arbitrary number of CP-stages.

Glancing over the block diagram shown in FIG. 4C with its accordingly adapted CTS circuit block designations named generally CTS3aAs (410) and CTS3aBs (490) (individually CTS3aA1 (411) and CTS3aB1 (491) as first, CTS3aA2 (412) and CTS3aB2 (492) as second and CTS3aA3 (413) and CTS3aB3 (493) as third stage) no essential difference compared to the circuit of FIG. 2C can be recognized, other than the already above described addition of the controlled bulk voltage signals BST1A and BST1B in the initial precharge stage and as understood from the above also in all CP-stages.

Another further modified embodiment of the current invention depicted in FIGS. 4D-4F as three CP-stage voltage multiplier circuit and described as follows utilizes for the bulk boosting voltages within the CP-stages 2 and 3 instead of the control clock signals BST1A and BST1B now control voltage signals derived from preceding main nodes. This principle allows an even closer tracking of bulk voltage potentials and as such also an expansion to more than three stages. Because of this making use always for shifting bulk potentials of a CP-stage by node voltages taken from antecedent CP-stages it has been baptised as leap-frog bulk potential tracking principle. Main nodes involved are N1A (510) and N1B (520) from the initial precharge stage as well as N2A (530) and N2B (540) from preceding CP-stage 1 as illustrated by FIG. 4D. For simplicity these voltages are named correspondingly VN1A, VN1B, VN2A, and VN2B. FIG. 4E shows as generalized schematics the generalized CP-stage with its A- (610) and B-part (690) CTS circuit blocks comparable to FIG. 4B, whereby the given explanations and the nomenclature as defined above within the context of FIGS. 2A & 2B are equally valid here. Especially symbol s for the CP-stage number is of importance here, because s is not only part of the generalized MOSFET names (MNsA, MNsAP, and MNsAPP as well as MNsB, MNsABP, and MNsBPP) and the internal node names (NsAP and NsAPP as well as NsBP and NsBPP) as already known, but also part of the new bulk voltage designations: VN(s-1)A and VN(s-1)B. This nomenclature lends itself to visualize the leap-frog connection scheme when always using the main node voltages VN(s-1)A and VN(s-1)B in CP-stage s from the preceding CP-stage (s-1). This formulation has been introduced already above when explaining the leapfrog bulk potential tracking principle. Equally of importance is the cross-over usage of the main node voltages VN(s-1)A and VN(s-1)B, which means the A-voltages VN(s-1)A are connected to the bulks of MOSFETs in the related B-part CTS circuit blocks (690) and vice-versa, i.e. the B-voltages VN(s-1)B are connected to the bulks of MOSFETs in the related A-part CTS circuit blocks (610), generally spoken. These rules are important for any expansion of this new three CP-stage voltage multiplier circuit to more than three stages. As an exception from these rules CP-stage 1 is still treated as before, i.e. the bulk boosting voltages are still the control clock signals BST1A and BST1B according to FIG. 4B, which itself is used unaltered for CP-stage 1 of this further modified new circuit drawn as block diagram in FIG. 4F, shown with its accordingly adapted CTS circuit block designations, named generally as CTS3bAs (610) and CTS3bBs (690) from FIG. 4E, now however herein individually: CTS3bA1 (611) and CTS3bB1 (691) as first, CTS3bA2 (612) and CTS3bB2 (692) as second and CTS3bA3 (613) and CTS3bB3 (693) as third stage. Recapitulating on a technological basis the advantages of this implementation: due to the employed triple-well process the P-Well of the buried NMOS transistors can be "boosted" i.e. its voltage potential can be raised in order to reduce the body or substrate bias effect thereby lowering threshold voltage drops and fostered by a so-called electric bulk potential tracking thereby also relaxing the gate oxide stress. It shall be put on record however, that the P-Wells in which the high order NMOS transistors are buried (for CP-stages 2 and 3) connect to the main nodes N1A, N1B, N2A and N2B with voltages VN1A, VN1B, VN2A and VN2B corresponding to the details explained above, the buried P-Wells of the other NMOS transistors however (within the A- and B-parts of initial precharge stage and CP-stage 1) still connect to control clock signals BST1A and BST1B respectively.

Hence, voltage multiplier circuits according to this invention for generation of a high positive output voltage VPP out from a low positive supply voltage VDD are advantageously built using multiple CP-stages assembled as explained above, with NMOS transistors fabricated in integrated MOS triple-well process technology and applying multi-phase control clock or pumping signals combined with an electric bulk potential tracking as described above in detail. When it comes to generate high negative output voltages derived from low supply voltages or ground however following general transformation method may be recommended: Implementing a negative voltage multiplier circuit with multiple CP-stages starting from a positive voltage multiplier circuit with multiple CP-stages according to this invention and described above requires the following steps:

- Replace all NMOS transistors (CN . . . , DN . . . , MN . . . ) by their corresponding PMOS transistors (CP . . . , DP . . . , MP . . . ).
- Exchange the positive low precharge supply voltage VDD by a low (absolute value) negative precharge supply voltage VSS or ground.
- Invert in phase all the multi-phase control clock signals used to operate the pumping process, i.e. transform all (BST . . . ) signals into inverted (BST_bar . . . ) signals.

It shall be emphasized however, that there is no general interdependence of polarities for supply and output voltages, given the multiphase control voltages are accordingly chosen. As already mentioned above, the most convenient power source is chosen as precharge voltage source and also the voltage swing of the control clock-signals is determined appropriately. Generally, most of modern IC systems only supply a positive voltage (VDD) and ground (VSS) for monolithic ICs to operate. It is therefore reasonable to use VDD as precharge source when generating a high positive voltage. Of course, VSS can also be used as precharge source for a high positive voltage generation, but its power consumption is not optimal and thus the circuit would not work efficiently. For a similar reason, using VSS (ground) as precharge source for generating high negative voltage is reasonable if the system does not supply any negative voltage power sources. Thus it is common practice and also economical, that the highest voltage supported by the external system serves as precharge source to generate a high positive voltage and the lowest voltage supplied by the external system serves as precharge source to generate a high negative voltage.

By this method a voltage multiplier circuit operating on positive voltages VDD and generating VPP is transferred into a circuit for negative voltages VSS or ground and generating VBB. An application of these rules to circuits with an arbitrary number of stages is also possible. Starting out now from the positive voltage circuit explained above with the help of FIGS. 4D-4F as last example for an embodiment of the invention a further modified voltage multiplier circuit with three CP-stages for a generation of a negative voltage is obtained by applying the above listed three steps appropriately to said positive voltage circuit.

Examining now FIGS. 4G-4K, another new embodiment of the current invention for the generation of negative voltages is described, based on the corresponding embodiment of the current invention for the generation of positive voltages from FIGS. 4D-4F whereby all remarks and explanations for the latter stay equally valid for the new embodiment. Application of the transformation rules leads directly from the positive voltage circuit in FIG. 4D to the negative voltage circuit presented in FIG. 4G; both of which are structurally identical, besides those differences in details regulated by said transformation rules.

A closer look onto FIG. 4G reveals that now all MOS components are from the PMOS type: capacitor type connected PMOS transistors CP1A & CP1B, CP2A & CP2B, CP3A & CP3B, and CP1AP, CP1APP & CP1BP, CP1BPP, and CP2AP, CP2APP & CP2BP, CP2BPP, and CP3AP, CP3APP & CP3BP, CP3BPP; diode type connected PMOS transistors DP0A and DP0B; switch type PMOS transistors MP0A, MP1A, MP2A, MP3A, and MP0B, MP1B, MP2B, MP3B, as well as MP1AP, MP2AP, MP3AP, and also MP1BP, MP2BP, MP3BP, MP1APP, MP2APP, MP3APP, and MP1BPP, MP2BPP, MP3BPP. The already explained symmetrical layout of the circuit is also sustained therefore the initial precharge stage with its A- and B-parts (700, 705) is followed by said three CP-stages with their upper A-part CTS circuit blocks (710, 720, 730) and their lower B-part CTS circuit blocks (719, 729, 739). The negative supply voltage VSS or ground (705) and the negative output voltage VBB (750) are referenced to GND (160), whereby the elevated output voltage VBB acts upon the load capacitor Cload (755) as usual in this invention. Taken from this circuit schematic are now the generalized CP-stage blocks in FIGS. 4H & 4I with their individual CTS circuit blocks CTS3cA1 (811) and CTS3cB1 (891) shown in FIG. 4H and their general CTS circuit blocks CTS3cAs (810) and CTS3cBs (890) shown in FIG. 4I. Besides that explained exchange from NMOS type transistors into PMOS type transistors, the diagrams remain unchanged in layout and assembly compared to the positive voltage type CP-stage versions described earlier.

FIG. 4J illustrates the new modified negative voltage multiplier circuit again, now as block diagram exhibiting all the individual versions of the CTS circuit blocks for all three CP-stages: CTS3cA1 (811) and CTS3cB1 (891), CTS3cA2 (812) and CTS3cB2 (892), and CTS3cA3 (813) and CTS3cB3 (893).

FIG. 4K displays a time diagram of the control clock signals BST1A_bar, BST2A_bar, BST3A_bar and BST1B_bar, BST2B_bar, BST3B_bar used for pumping the low (absolutely measured) negative supply voltage VSS or ground up to the high (absolutely measured) negative output voltage VBB, emphasizing a characteristic basic period subdivided in six particular time segments T1-T6. By comparison to the time diagram shown in FIG. 2D it becomes obvious, that only the polarity of the signals has been inverted, thus the designation by "_bar" is self-evident. As concluding note, a calculation of the ideally attainable maximum output voltage of the new voltage multiplier circuits of the current invention shall be given in both cases, i.e. for the circuits generating either positive or negative output voltages.

1. Output voltage VPP for voltage multiplier circuit (FIG. 4D) generating a higher positive output voltage from a lower precharge source voltage being VDD, having an amplitude VDD of the control clock signals used for pumping:

$VPP$ (ideal max)=$VDD$+(number of $CP$-stages)*$VDD$

2. Output voltage VBB for voltage multiplier circuit (FIG. 4G) generating a higher negative output voltage from a lower precharge source being VSS or ground, also having an amplitude VDD of the control clock signals used for pumping:

$VBB$ (ideal max)=$VSS$+(number of $CP$-stages)*($-VDD$)=(number of $CP$-stages)* $VDD$), if $VSS$=0 applies.

Figure 5A:
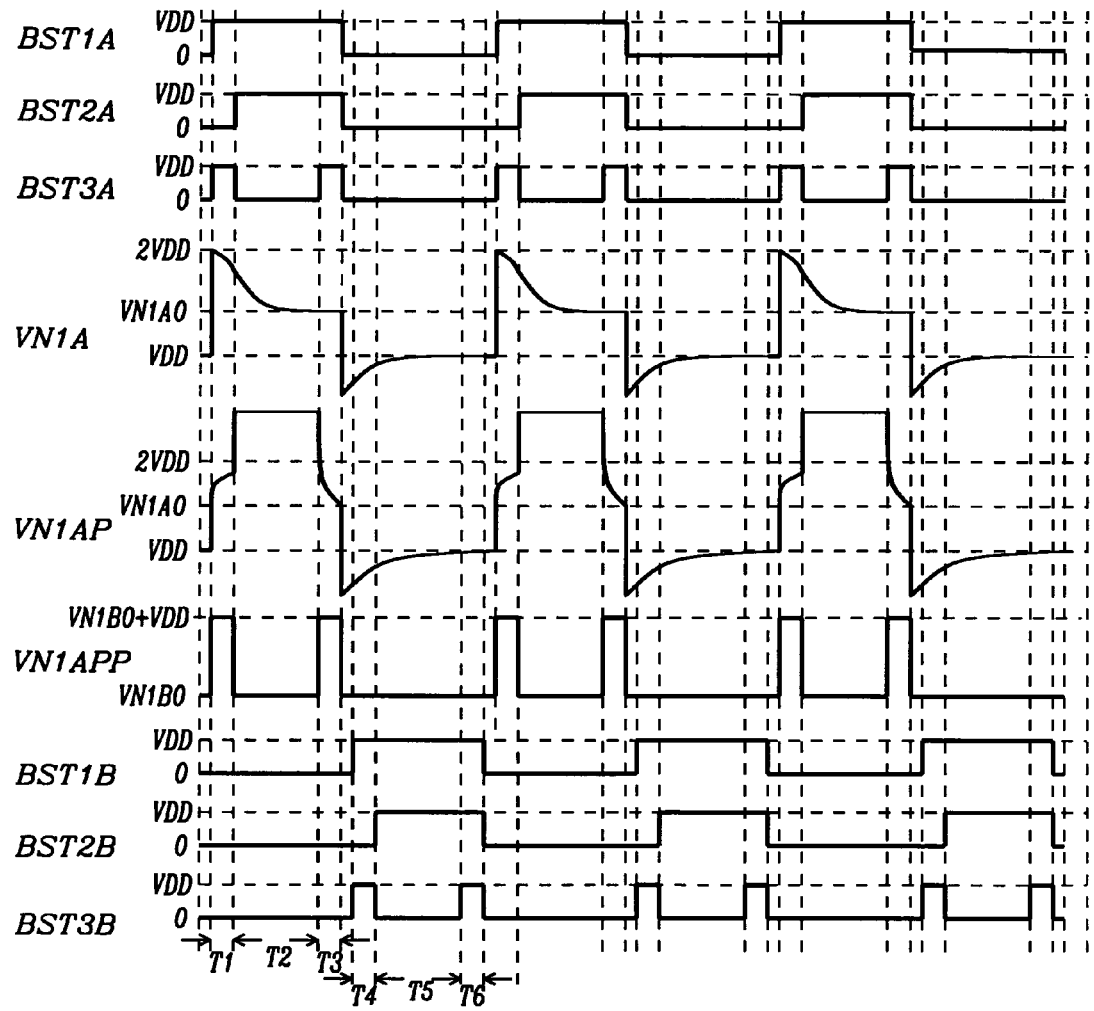
FIG. 5A presents in more detail a time diagram for the six essential multiphase control clock signals used in the new three stage voltage multiplier of FIG. 2A and shows also three additional time diagrams for three internal voltage signals from stage 1, all signals generated during six time segments of operation and exemplified for the first stage of the circuit.
Figure 6B:
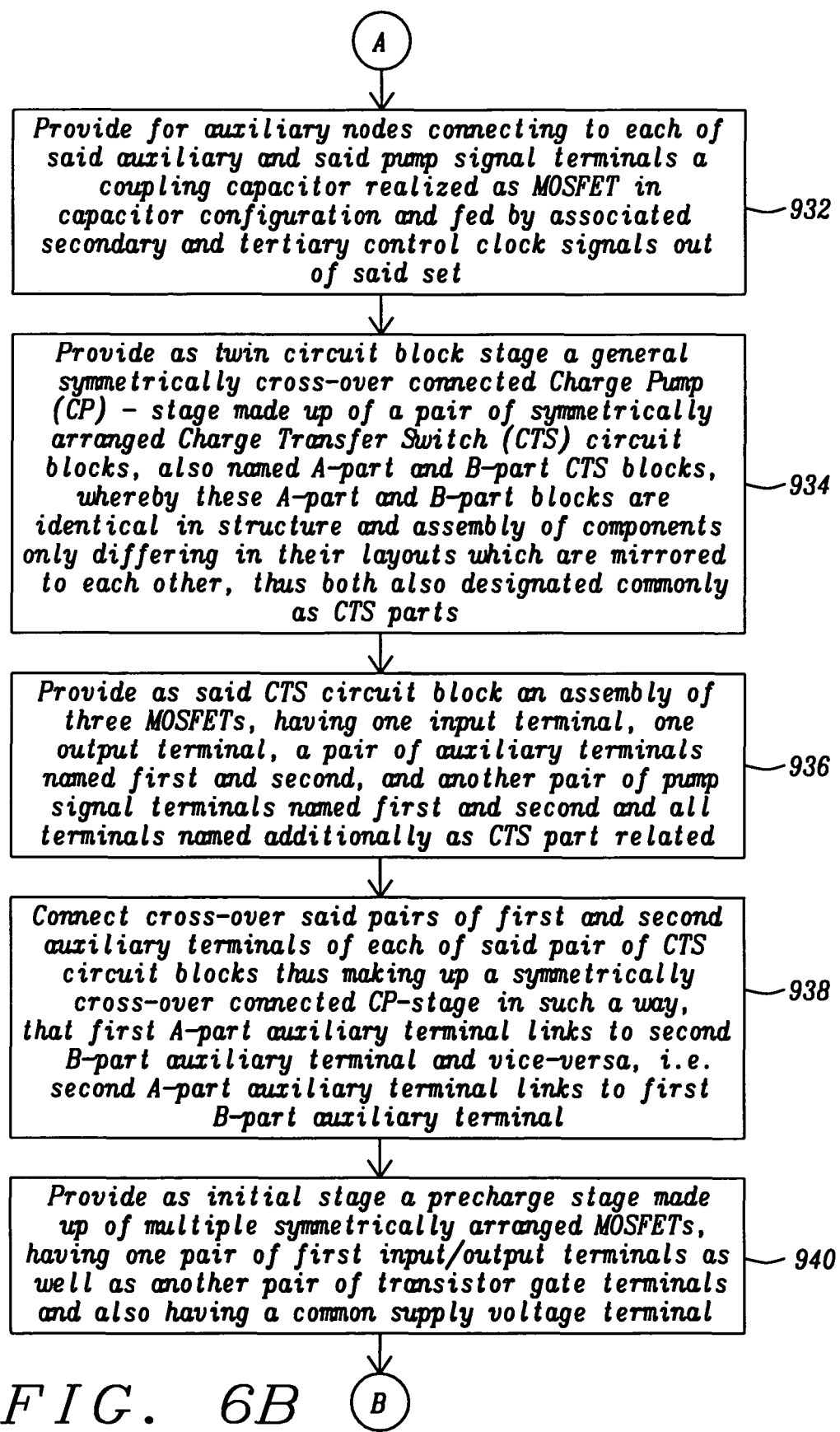
Figure 6C:
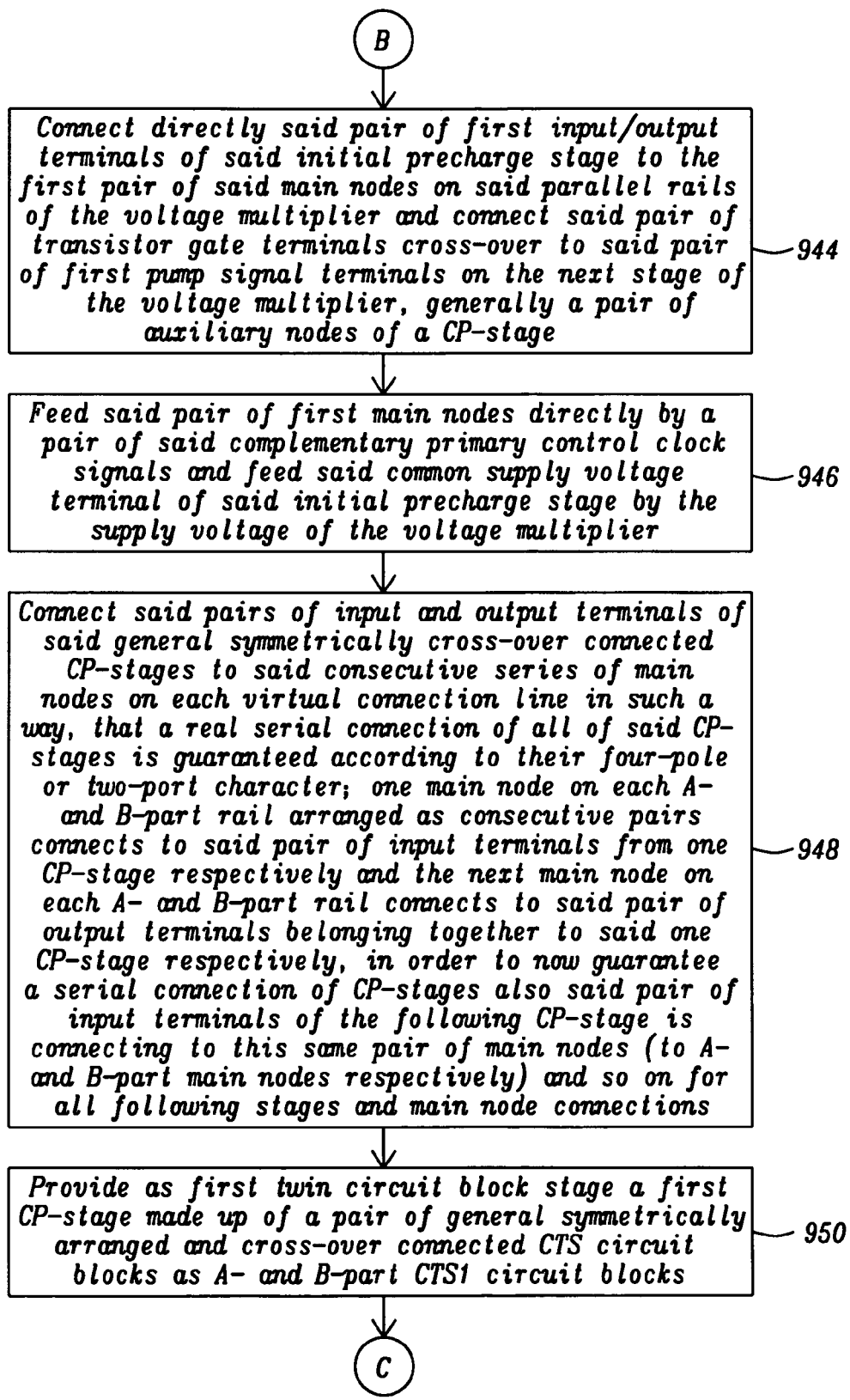
Figure 6D:
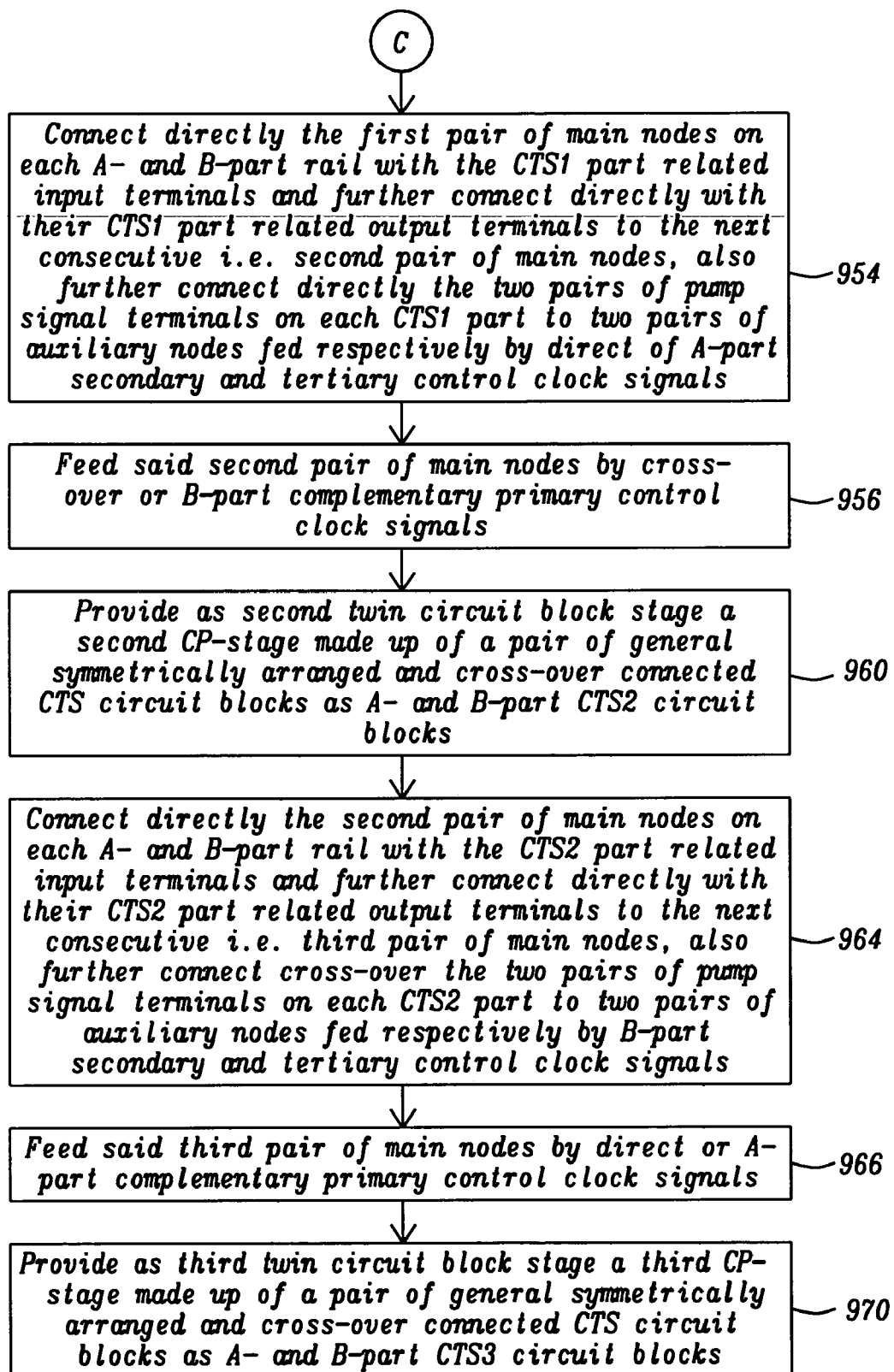
Figure 6E:
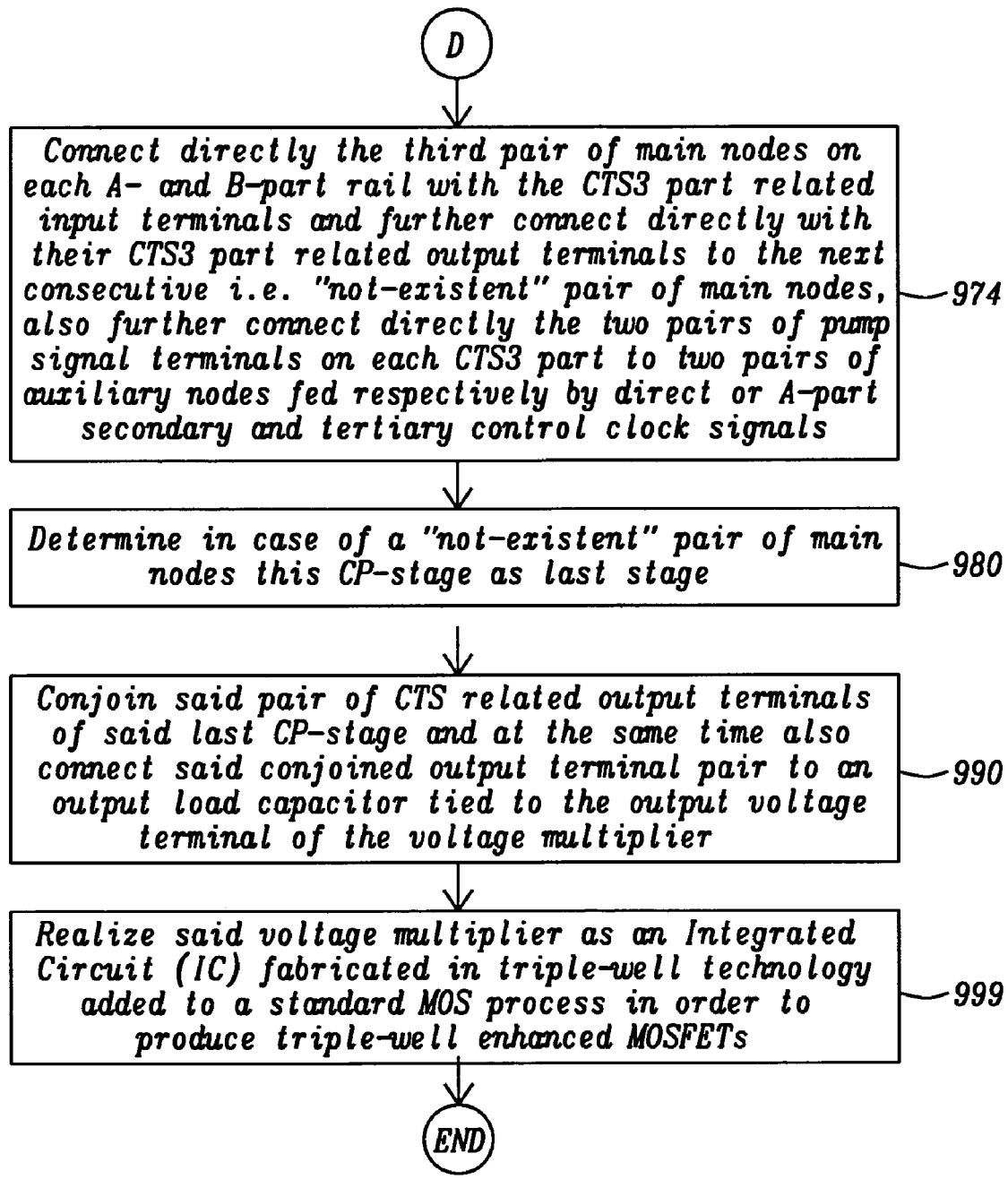

With the help of FIGS. 5A and 5B the detailed operation and function of the voltage multiplier circuit of the current invention as presented in FIGS. 2A-2E in its basic form and in its final modified form in FIGS. 4D-4F shall now be thoroughly explained during one complete characteristic basic period of its control clock signals, describing its behavior during every particular time segment T1-T6. FIG. 5A displays to this end the time diagram for all control clock signals BST1A, BST2A, BST3A and BST1B, BST2B, BST3B as well as for three selected node voltage signals VN1A, VN1AP, and VN1APP. As already mentioned above does the voltage swing of the control clock signals BST . . . . preferably make use of the full supply voltage VDD, which is shown as amplitude value. For simplicity the high voltage levels VDD of the clock control signals shall be called as HIGH, and zero voltage levels as LOW. The table presented in FIG. 5B lists the switching states of nine selected NMOS transistors in these circuits during the time segments T1-T6. Those switch type MOSFETs MN0A, MN1A, MN1AP, MN1APP, MN1B, MN1BP, MN1BPP, MN2A, MN3A are chosen because of their exemplary significance.

FIG. 5A: Waveform display of control clock signals BST1A, BST2A, BST3A and BST1B, BST2B, BST3B and node voltages VN1A, VN1AP, and VN1APP of CP-stage 1 shown as time diagrams.

FIG. 5B: Table presenting state of selected switch type MOSFETs from initial precharge stage MN0A, first CP-stage MN1A, MN1AP, MN1APP, MN1B, MN1BP, MN1BPP, second CP-stage MN2A, and third CP-stage MN3A during time segments T1-T6 of control clock signal period.

Notes:
○ MOS switch completely turned on (no threshold voltage drop)
× MOS switch completely turned off
Δ MOS switch incompletely turned on (i.e. threshold voltage drop effective) the following sentence, which only defines an alternative usage of terms.

Alternatively also used are the words 'fully' instead of 'completely' and 'partially' instead of 'incompletely'.

Before delving into the following explanations two important facts from the descriptions above should be brought in mind again: each Node ( . . . N . . . ) in the circuits is connected to one side of a capacitor (or more exactly a capacitor configured MOSFET) and at the same time the other side of said capacitor is powered by a control clock signal, therefore are such nodes capable of being boosted up to elevated voltage levels by appropriately charging their capacitors.

Now delving into FIGS. 5A and 5B with the help of FIGS. 4C and 4D the following activities for the circuits during time segments T1-T6 can be determined:

Time segment T1:

Control clock signals BST1A and BST3A transit from LOW to HIGH and main node N1A's voltage VN1A as well as auxiliary node N1APP's voltage VN1APP are being boosted to higher voltages in order to completely turn on transistor MN1APP and to incompletely turn on transistor MN1A where a threshold voltage drop is thus effective. Transistor MN1APP is now completely turned on and charges capacitor CN1AP at auxiliary node N1AP thus raising node voltage VN1AP up to main node N1A's voltage level VN1A, therefore transistor MN1A is forming a diode connection between the main nodes N1A and N2A. Transistor MN1A is incompletely turned on and starts the charge sharing process between main nodes N1A and N2A. Voltage VN1AP of the voltage boosted auxiliary node N1AP is now used to turn on transistor MN0B to precharge capacitor CN1B at main node N1B up to voltage level VDD. At the end of time segment T1, control clock signal BST3A transits to LOW and therefore turns off transistor MN1APP.

Time segment T2:

Control clock signal BST2A transits to HIGH and auxiliary node N1AP's voltage VN1AP is being boosted to a value higher than that reached in time segment T1 because transistor MN1APP is turned off. Therefore voltage VN1AP at auxiliary node N1AP can completely turn on the three transistors MN0B, MN1A, and MN1AP. Transistor MN0B completely turned on is used to precharge main node N1B's voltage VN1B up to voltage level VDD. Transistor MN1A also completely turned on is used to completely dump main node N1A's charge on capacitor CN1A to main node N2A's capacitor CN2A by charge sharing without any losses by a threshold voltage drop. Thus main node N1A's charge is totally shared with main node N2A. Once the charge sharing process between the main nodes N1A and N2A is completed, main node N1A's voltage VN1A will drop to voltage VN1A0 which is also main node N2A's voltage VN2A. Transistor MN1AP also completely turned on is used to precharge auxiliary node N1BPP to main node N1A's voltage level VN1A. Thus auxiliary node N1BPP's voltage VN1BPP equals voltage VN1A0 at the end of time segment T2. By a similar deduction is auxiliary node N1APP's voltage VN1APP made equal to voltage VN1B0 at the end of time segment T5.

Time segment T3:

Control clock signal BST3A transits to HIGH again and auxiliary node N1APP's voltage VN1APP is being boosted to a higher voltage. This higher voltage VN1APP of auxiliary node N1APP is now completely turning on transistor MN1APP. Transistor MN1APP completely turned on is used to discharge auxiliary node N1AP's capacitor CN1AP from high voltage level VN1AP to main node N1A's voltage level VN1A, thus transistor MN1A is forming a diode connection between main nodes N1A and N2A. At the end of time segment T3, the control clock signals BST1A, BST2A, and BST3A transit to LOW and thus main node N1A's voltage VN1A and auxiliary node N1AP's voltage VN1AP are shifted to LOW.

Time segment T4:

Control clock signals BST1B and BST3B transit to HIGH and main node N1B's voltage VN1B and auxiliary node N1BPP's voltage VN1BPP are being boosted to higher voltages to completely turn on transistor MN1BPP and to incompletely turn on transistor MN1B where a threshold voltage drop is thus effective. Transistor MN1BPP completely turned on now charges capacitor CN1BP at auxiliary node N1BP thus raising node voltage VN1BP up to main node N1B's voltage level VN1B, therefore transistor MN1B is forming a diode connection between main nodes N1B and N2B. Transistor MN1B incompletely turned on now starts the charge sharing process between main nodes N1B and N2B. Voltage VN1BP of the voltage boosted auxiliary node N1BP is now used to turn on transistor MN0A to precharge main node N1A up to VDD level. At the end of time segment T4, control clock signal BST3B transits to LOW and thus turns off transistor MN1BPP.

Time segment T5:

Control clock signal BST2B transits to HIGH and auxiliary node N1BP's voltage VN1BP is being boosted to a value higher than that reached in time segment T4 because transistor MN1BPP is turned off. Therefore auxiliary node N1BP's voltage VN1BP completely turns on the three transistors MN0A, MN1B, and MN1BP. Transistor MN0A now completely turned on is used to precharge main node N1A's voltage VN1A to voltage level VDD. Transistor MN1B completely turned on is used to completely dump main node N1B's charge on capacitor CN1B to main node N2B's capacitor CN2B by charge sharing without any losses by a threshold voltage drop. Thus main node N1B's charge is totally shared with main node N2B. Once the charge sharing process between main nodes N1B and N2B is completed, main node N1B's voltage VN1B will drop to VN1B0 which is also main node N2B's voltage VN2B. Transistor MN1BP completely turned on is used to precharge auxiliary node N1APP to main node N1B's voltage level VN1B. Thus auxiliary node N1APP's voltage VN1APP is equal to voltage VN1B0 at the end of time segment T5.

Time segment T6:

Control clock signal BST3B transits to HIGH again and auxiliary node N1BPP's voltage VN1BPP is being boosted to a higher voltage. This higher voltage VN1BPP of auxiliary node N1BPP is now completely turning on transistor MN1BPP. Transistor MN1BPP completely turned on is used to discharge auxiliary node N1BP's capacitor CN1BP from high voltage level VN1BP to main node N1B's voltage level VN1B, thus transistor MN1B is forming a diode connection between main nodes N1B and N2B. At the end of time segment T6, the control clock signals BST1B, BST2B, and BST3B transit to LOW and thus main node N1B's voltage VN1B and auxiliary node N1BP's voltage VN1BP are shifted to LOW.

Having understood all the necessary details for constructing and operating the novel circuits of the present invention, a summary of advantageous features of the proposed scheme shall be given, hereby especially emphasizing now solved drawbacks of prior art solutions.

First, during time segments T2 and T5 the charge sharing process is now being completely executed because there is no threshold voltage drop left between two charge sharing main nodes.

Second, owed to the absence of a threshold voltage drop, fewer CP-stages connected in series are needed in order to achieve the targeted high output voltage. Therefore less power will be consumed, because the power consumption is proportional to the number count of needed CP-stages serially connected. The fewer CP-stages are connected the higher a pumping efficiency is obtained.

Third, during time segments T2 and T5 the charge sharing process is executed when the bridged NMOS transistor (e.g. MN1A) is being operated in linear region. It is well known that the effective resistance of NMOS transistors operating in linear region is relatively small compared to NMOS transistors operating in saturation region. Thus the charge sharing time can be reduced and the pump current will increase because we can speed up the frequency of the ring oscillator, which is utilized as clock rate generator for the control clock signals. Furthermore NMOS transistor threshold voltages of higher order CP-stages will retain the same value as NMOS transistors of lower order CP-stages because the bulk voltage of said higher order NMOS transistors is biased to main node voltages of previous CP-stages as shown and described as electric bulk potential tracking above. Therefore all the NMOS transistors regardless if located in higher order or lower order CP-stages will be biased so that their body effects are nearly the same, thus their threshold voltages are almost the same and the charge sharing speeds are very comparable regardless if measured in higher order or lower order CP-stages. The overall performance will not be limited by the number of CP-stages connected in series, which generally is different for different applications, and the pumping frequency can always be kept in a best performance condition as for a one-stage charge pump circuit.

Fourth, from the explanation above it is understood that every serially connected CP-stage now offers almost the same performance, thus there is no limitation on the usable number of CP-stages connected in series within voltage multiplier applications compared to prior art solutions. The newly proposed scheme for a 'Charge Pump Circuit for High Voltage Generation' according to the current invention does therefore include the potential to generate very high voltages with a high number of CP-stages.

Fifth, for the same reason concerning the electric bulk potential tracking the gate oxide stress of NMOS transistors within CP-stages of higher order will not be larger than the gate oxide stress of NMOS transistors within CP-stages of lower order. Thus some of the reliability issues experienced in prior art solutions will not occur with this proposed scheme.

Regarding the flow diagram given by FIGS. 6A-6E, a method, explaining the construction and operation of the novel realization of an integrated circuit for voltage multiplier devices according to the invention and exemplified by FIGS. 2A & 5B is now described and defined by its steps, wherein a first step 901 provides a basic circuit structure built up as a series connection of an initial stage and one or more of following twin circuit block stages operating as CP-stages, each stage of an essential four-pole or two-port character i.e. each stage having a pair of input terminals and a pair of output terminals, apart from additional pairs of auxiliary and pump signal terminals for each of the twin circuit blocks. Step 905 arranges said basic circuit structure in a, versus a virtual middle line, fundamentally symmetrical configuration exhibiting two parallel rails of virtual connection lines each endowed with a consecutive series of pairs of main nodes whereby all upper parts of said pairs located above said virtual middle line are designated as A-parts, all lower parts located below said virtual middle line as B-parts. By the help of step 910 some definitions are given, such as "connect directly" as connecting A-part items to A-part items and B-part items to B-part items as well as "connect cross-over" as connecting A-part items to B-part items and vice-versa; translating this terminology also to other possible actions. Step 920 furnishes a set of three pairs of multiphase control clock signals, whereby direct A-part signals are shifted by one half clock cycle compared to B-part signals or vice-versa by designation and each pair individually named as primary, secondary and tertiary. By the following four steps 930, 932, 934, and 936 some further basics are provided, such as to provide for each of said main nodes a coupling capacitor realized as MOSFET in capacitor configuration and fed by associated primary control clock signals out of said set, and to provide for auxiliary nodes connecting to each of said auxiliary and said pump signal terminals a coupling capacitor realized as MOSFET in capacitor configuration and fed by associated secondary and tertiary control clock signals out of said set, and also provide as twin circuit block stage a general symmetrically cross-over connected Charge Pump (CP) stage made up of a pair of symmetrically arranged Charge Transfer Switch (CTS) circuit blocks, also named A-part and B-part CTS blocks, whereby these A-part and B-part blocks are identical in structure and assembly of components only differing in their layouts which are mirrored to each other, thus both also designated commonly as CTS parts as well as provide as said CTS circuit block an assembly of three MOSFETs with one input terminal, one output terminal, a pair of auxiliary terminals named first and second, and another pair of pump signal terminals named first and second and all named additionally as CTS part related. Step 938 now connects cross-over said pairs of first and second auxiliary terminals of each of said pair of CTS circuit blocks making up a symmetrically cross-over connected CP-stage in such a way, that first A-part auxiliary terminal links to second B-part auxiliary terminal and vice-versa, i.e. second A-part auxiliary terminal links to first B-part auxiliary terminal. With all these steps a fundament has been laid for a method, which is capable to be applied to an arbitrary number of CP-stages. As means to terminate the method an artificial "non-existent" main node has been introduced in order to determine the last CP-stage, as can be seen below. In step 940 the begin of an actual realization is described by providing as initial stage a precharge stage made up of multiple symmetrically arranged MOSFETs, having one pair of first input/output terminals as well as another pair of transistor gate terminals and also having a common supply voltage terminal. Whereby step 944 now connects directly said pair of first input/output terminals of said initial precharge stage to the first pair of said main nodes on said parallel rails of the voltage multiplier and connect said pair of transistor gate terminals cross-over to said pair of first pump signal terminals on the next stage of the voltage multiplier, generally a pair of auxiliary nodes of a CP-stage and step 946 now feeds said pair of first main nodes directly by a pair of said complementary primary control clock signals and feed said common supply voltage terminal of said initial precharge stage by the supply voltage of the voltage multiplier. A general step 948 describes the connecting of said pairs of input and output terminals of said general symmetrically cross-over connected CP-stages to said consecutive series of main nodes on each virtual connection line in such a way, that a real serial connection of all of said CP-stages is guaranteed according to their four-pole or two-port character; one main node on each A- and B-part rail arranged as consecutive pairs connects to said pair of input terminals from one CP-stage respectively and the next main node on each A- and B-part rail connects to said pair of output terminals belonging together to said one CP-stage respectively, in order to now guarantee a serial connection of CP-stages also said pair of input terminals of the following CP-stage is connecting to this same pair of main nodes (to A- and B-part main nodes respectively) and so on for all following stages and main node connections. The now following three groups of three steps each: 950, 954, 956, and 960, 964, 966, as well as 970 and 974 describe the actually three, serially arranged CP-stages by providing as first twin circuit block stage a first CP-stage made up of a pair of general symmetrically arranged and cross-over connected CTS circuit blocks as A- and B-part CTS1 circuit blocks, connecting directly the first pair of main nodes on each A- and B-part rail with the CTS1 part related input terminals and further connect directly with their CTS1 part related output terminals to the next consecutive i.e. second pair of main nodes, also further connecting directly the two pairs of pump signal terminals on each CTS1 part to two pairs of auxiliary nodes fed respectively by direct or A-part secondary and tertiary control clock signals and feeding said second pair of main nodes by crossover or B-part complementary primary control clock signals, then providing as second twin circuit block stage a second CP-stage made up of a pair of general symmetrically arranged and cross-over connected CTS circuit blocks as A- and B-part CTS2 circuit blocks, connecting directly the second pair of main nodes on each A- and B-part rail with the CTS2 part related input terminals and further connect directly with their CTS2 part related output terminals to the next consecutive i.e. third pair of main nodes, also further connecting cross-over the two pairs of pump signal terminals on each CTS2 part to two pairs of auxiliary nodes fed respectively by B-part secondary and tertiary control clock signals, and feeding said third pair of main nodes by direct or A-part complementary primary control clock signals, and further providing as third twin circuit block stage a third CP-stage made up of a pair of general symmetrically arranged and cross-over connected CTS circuit blocks as A- and B-part CTS3 circuit blocks, connecting directly the third pair of main nodes on each A- and B-part rail with the CTS3 part related input terminals and further connect directly with their CTS3 part related output terminals to the next consecutive i.e. "not-existent" pair of main nodes, also further connecting directly the two pairs of pump signal terminals on each CTS3 part to two pairs of auxiliary nodes fed respectively by direct or A-part secondary and tertiary control clock signals. For the sake of generalization step 980 finally determines in case of a "not-existent" pair of main nodes this CP-stage as last stage. This leads to step 990, wherein conjoining said pair of CTS related output terminals of said last CP-stage and at the same time also connecting said conjoined output terminal pair to an output load capacitor tied to the output voltage terminal of the voltage multiplier is shown. Last but not least step 999 realizes said voltage multiplier as an Integrated Circuit (IC) fabricated in triple-well technology added to a standard MOS process in order to produce triple-well enhanced MOSFETs.

The now following FIGS. 7A-7J illustrate the operation of the new circuits by displaying simulation results in form of time diagrams for characteristic voltages (waveforms of control clock signals and node voltages, as well as the output voltages) during pumping activities for four different embodiments of the present invention.

Figure 7A:
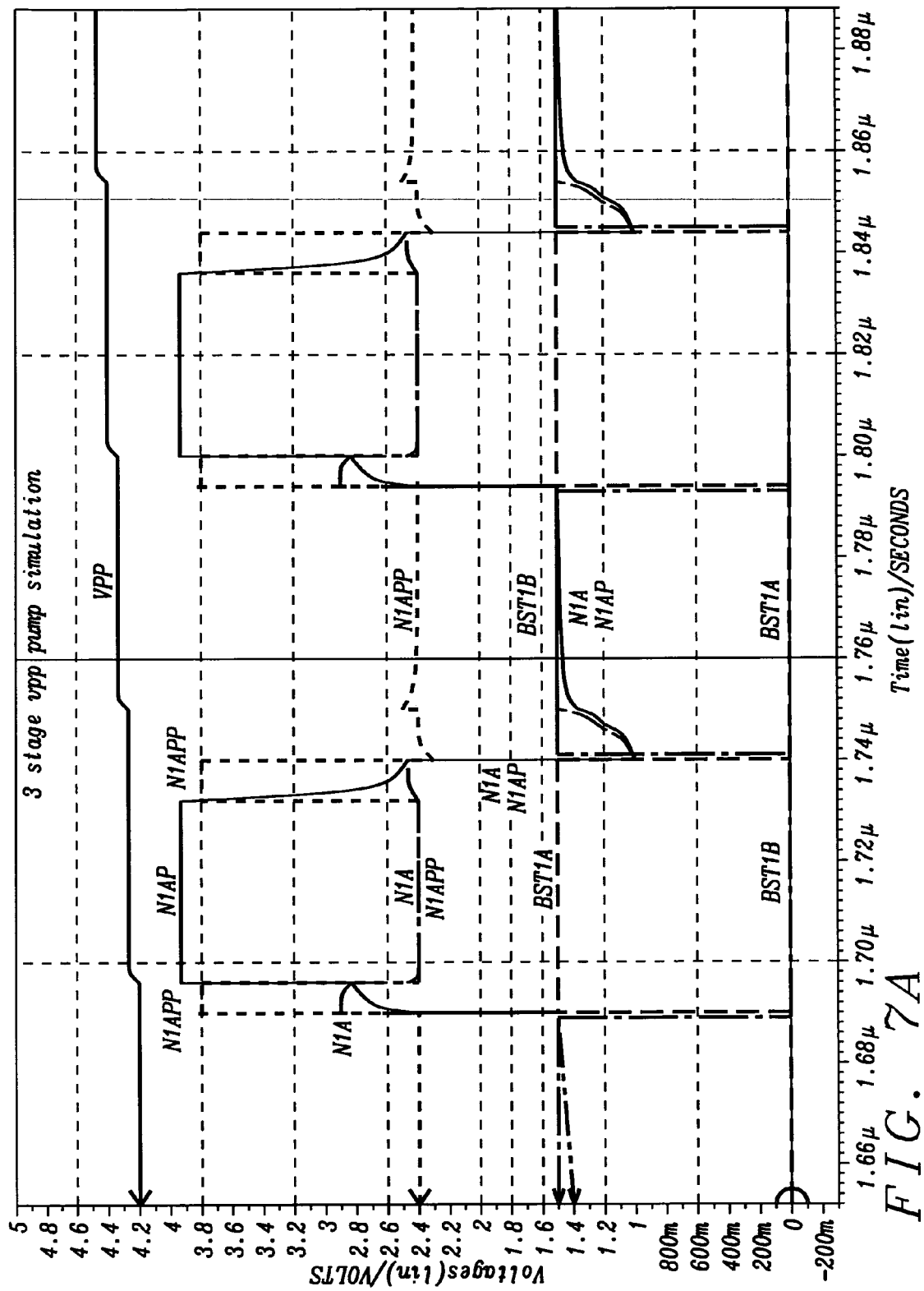
Figure 7B:
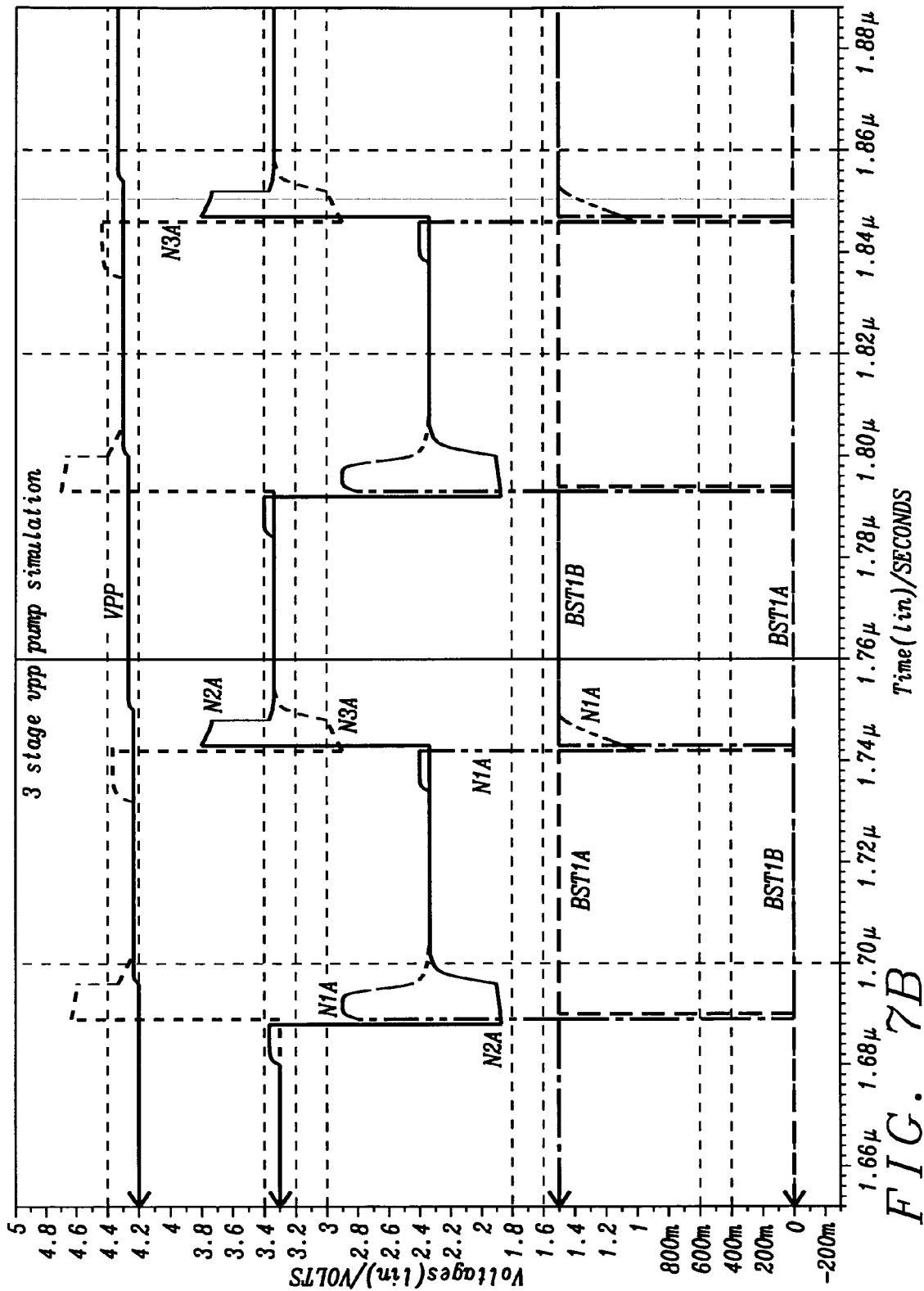
Figure 7C:
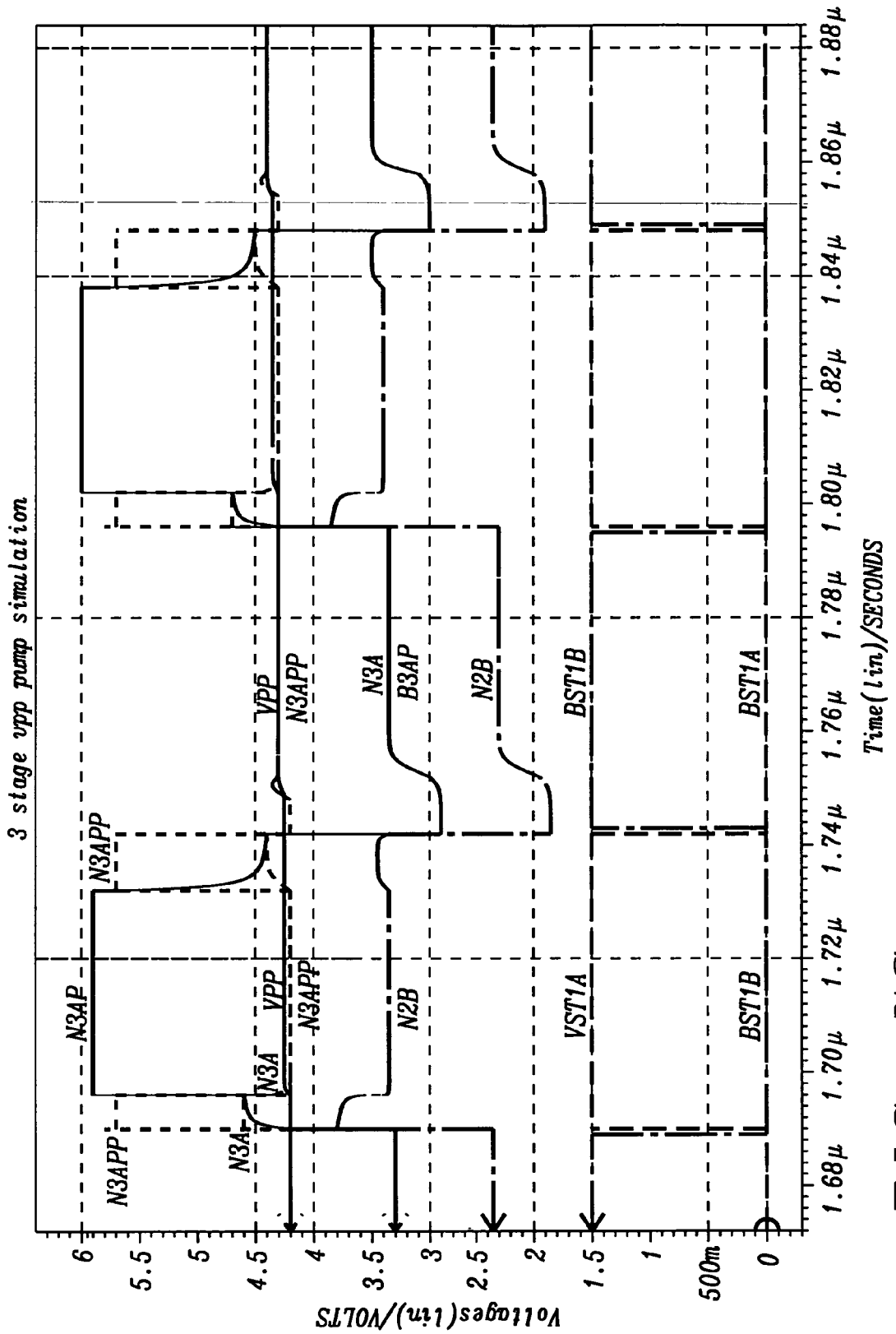

FIGS. 7A-7C: A three CP-stages voltage multiplier simulation with positive output voltage displaying the control clock signals BST1A and BST1B and the output voltage VPP always together with groups of voltages for the following nodes: N1A, N1AP, and N1APP as first group, N1A, N2A, and N3A as second group, as well as N2B, N3A, N3AP, and N3APP as third group.

Figure 7D:
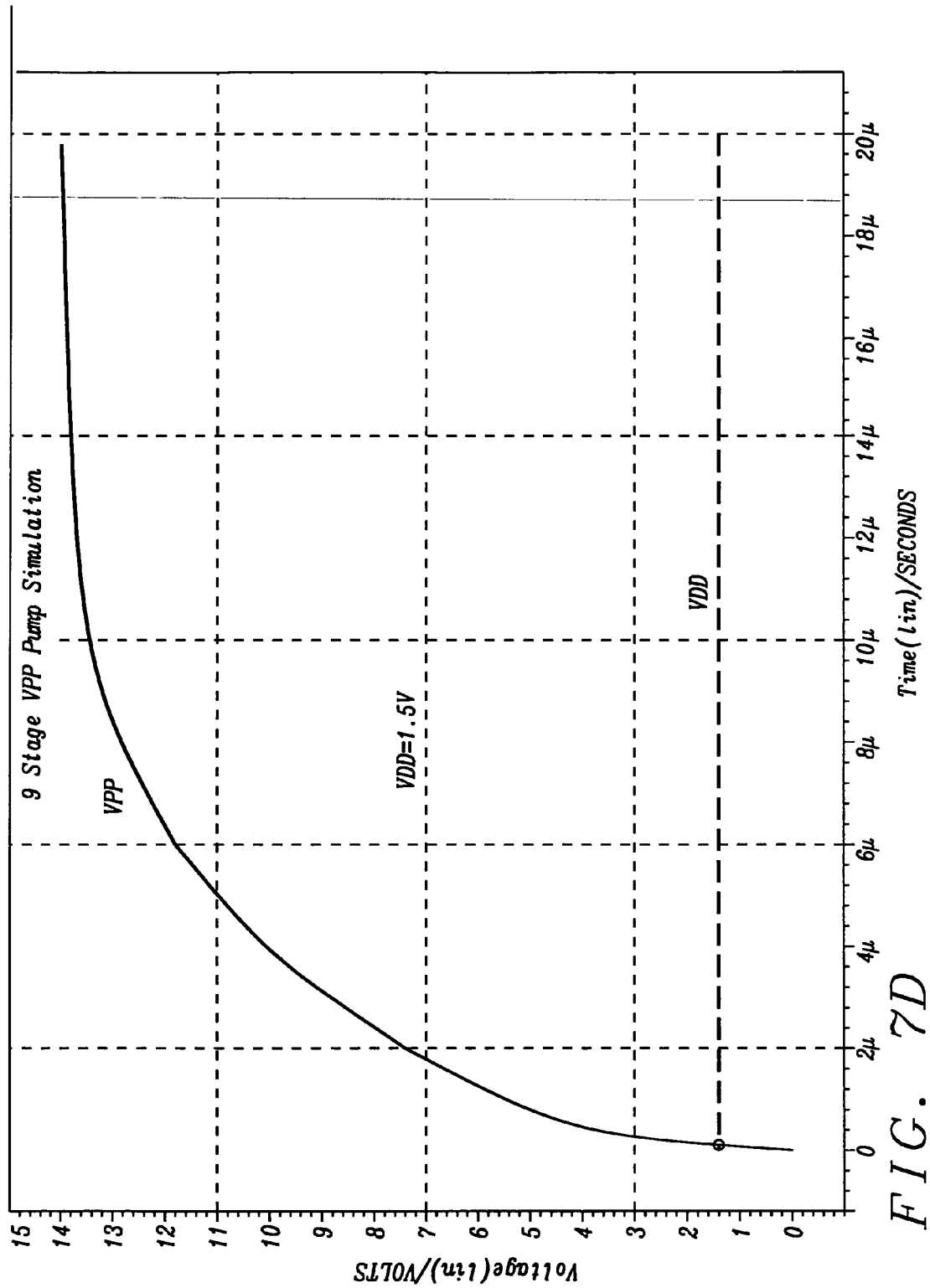
Figure 7E:
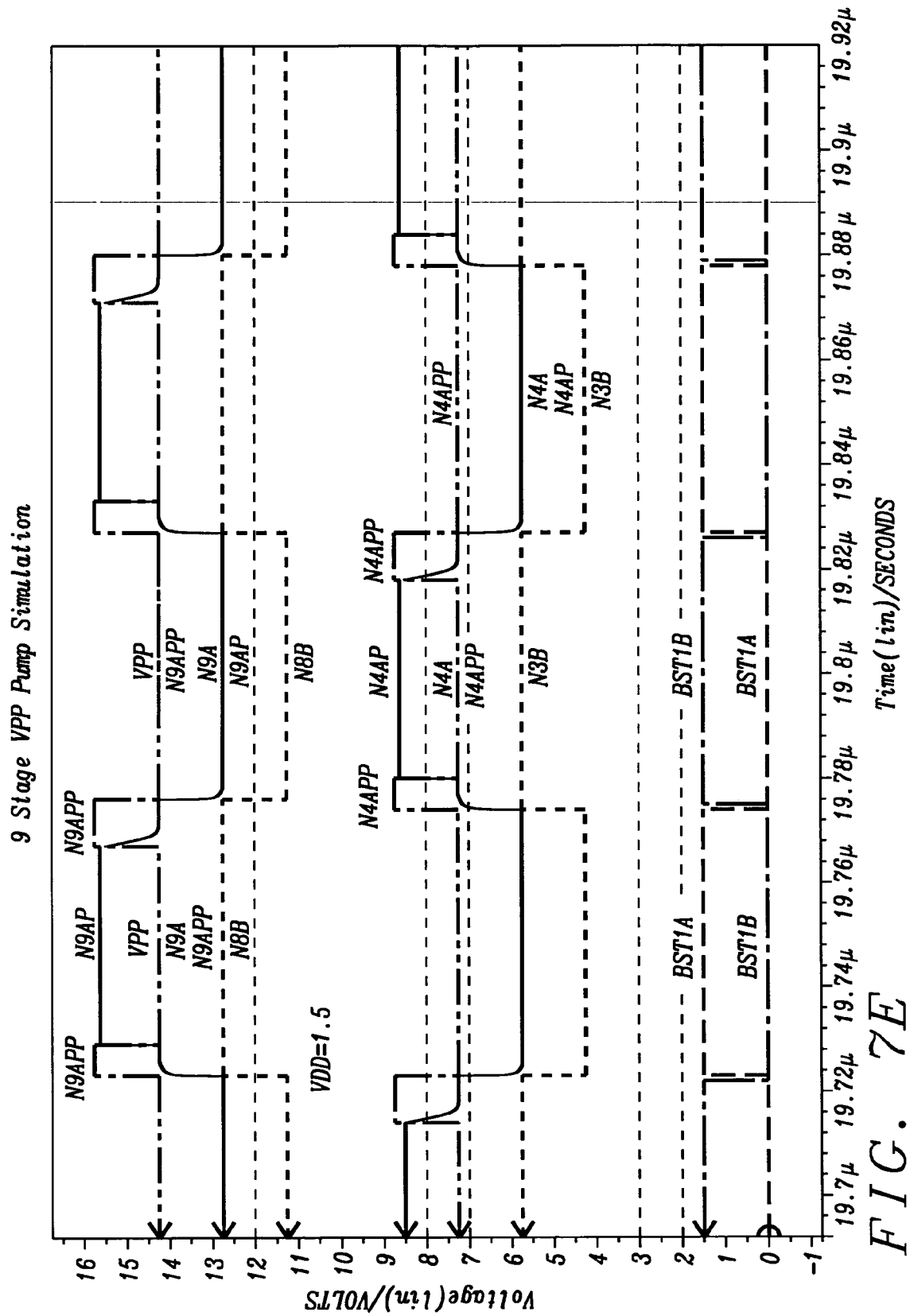

FIGS. 7D & 7E: A nine CP-stages voltage multiplier simulation with positive output voltage displaying the control clock signals BST1A and BST1B and the output voltage VPP either separately for a longer time or together with a group of voltages, during a shorter time but with higher resolution, for the following nodes: N3B, N4A, N4AP, and N4APP as well as N8B, N9A, N9AP, and N9APP.

Figure 7G:
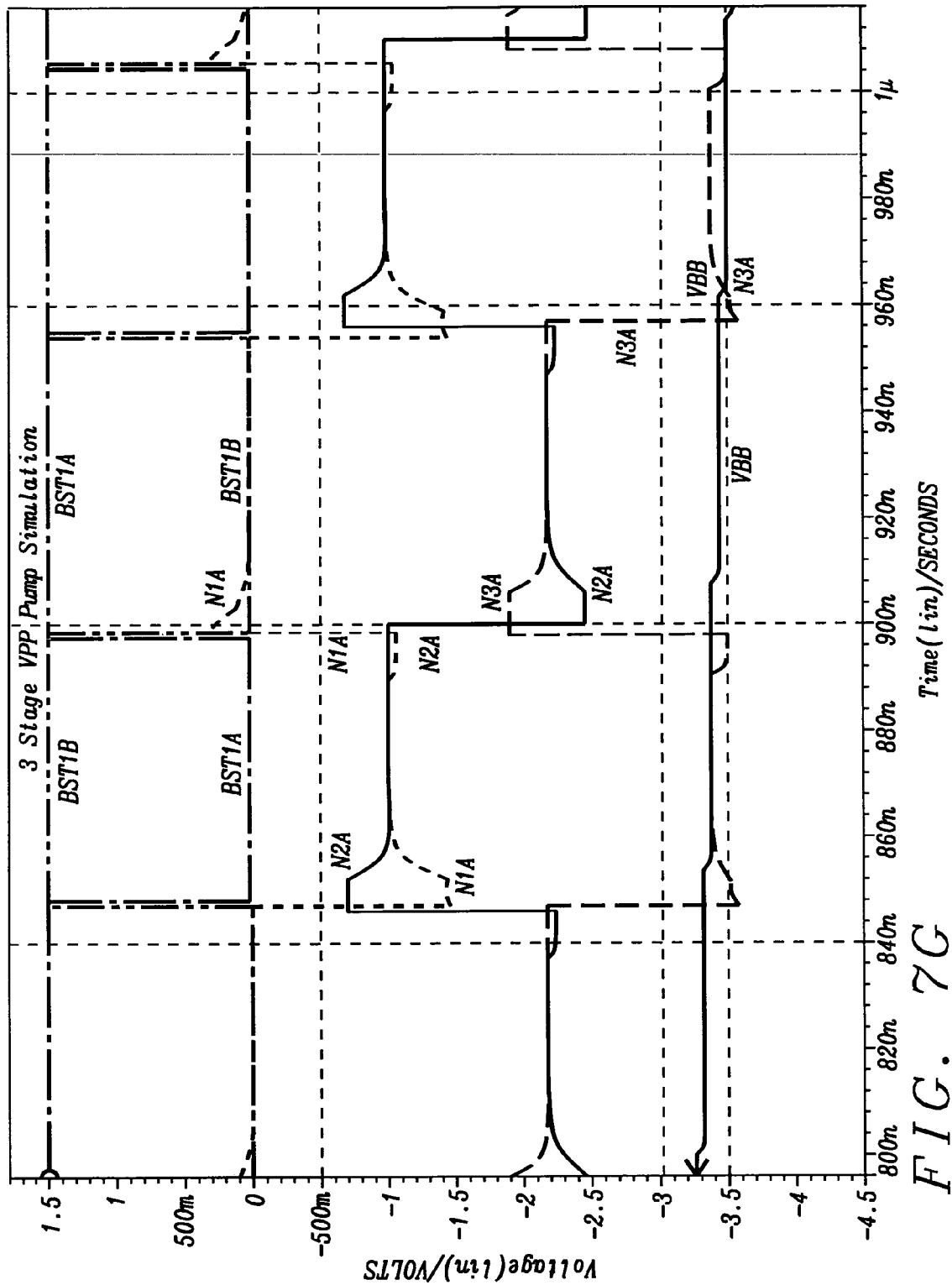
Figure 7H:
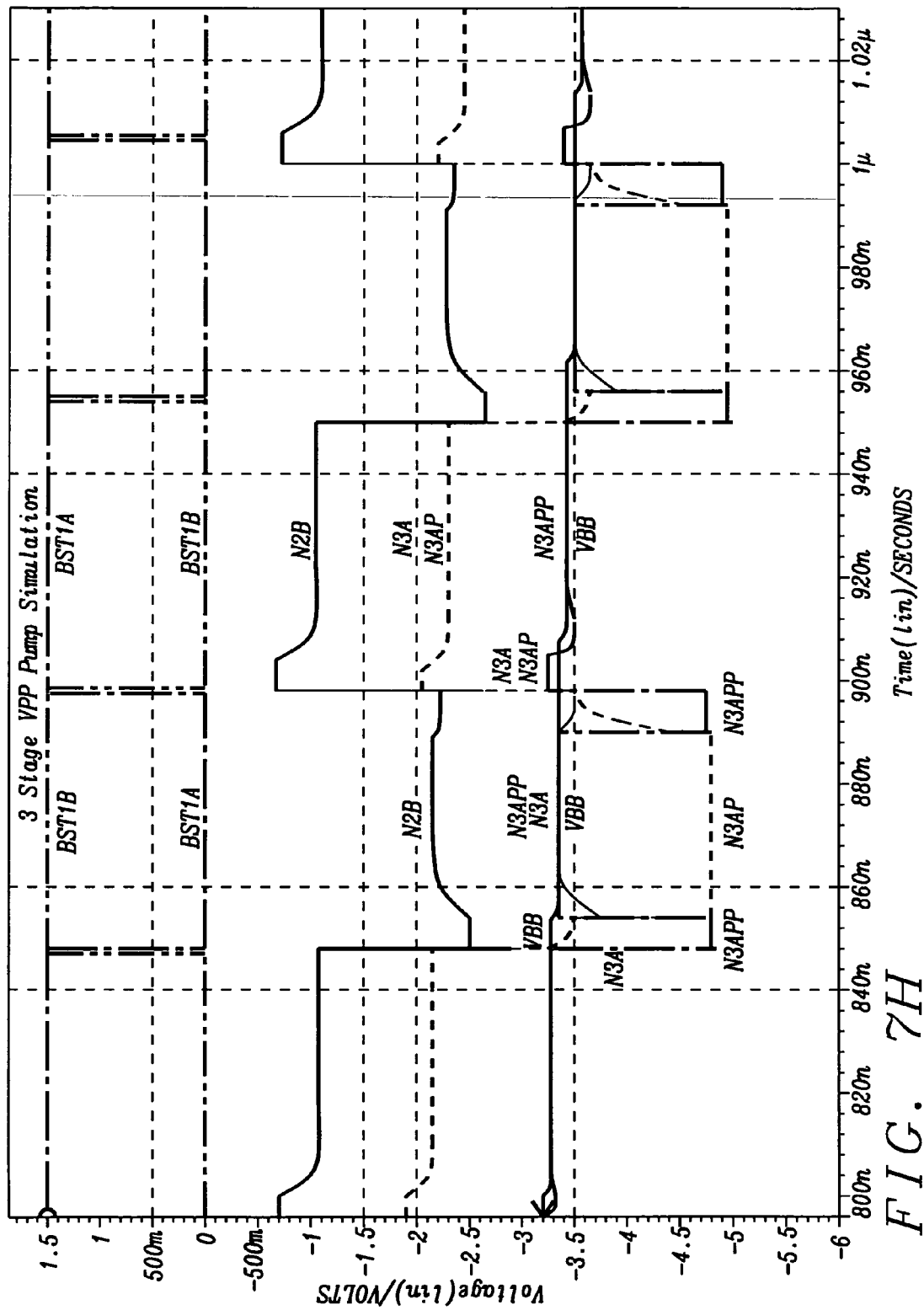
Figure 71:
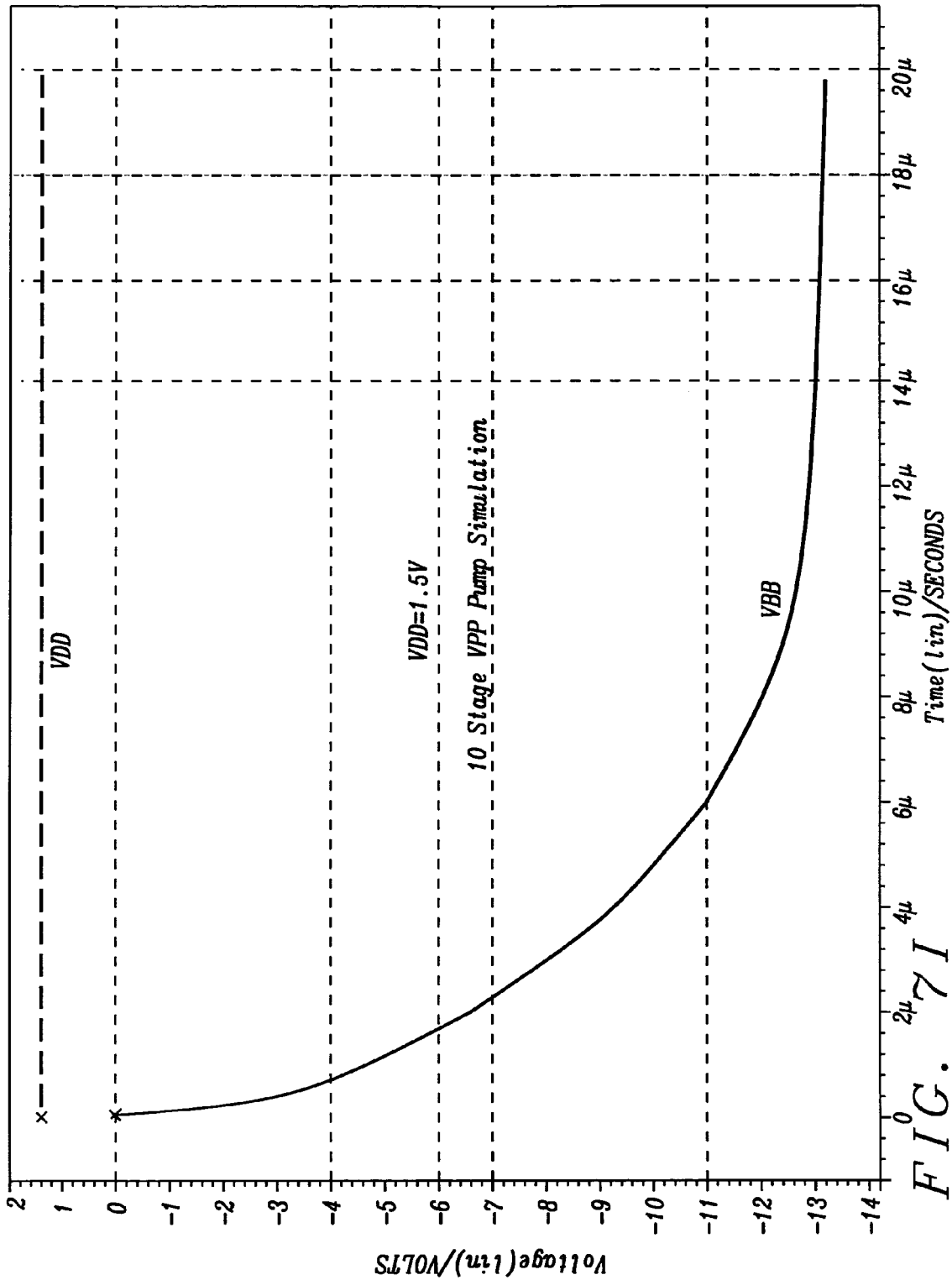

FIGS. 7F-7H A three CP-stages voltage multiplier simulation with negative output voltage displaying the control clock signals BST1A and BST1B and the output voltage VBB always together with groups of voltages for the following nodes: N1A, N1AP, and N1APP as first group, N1A, N2A, and N3A as second group, as well as N2B, N3A, N3AP, and N3APP as third group.

Figure 7J:
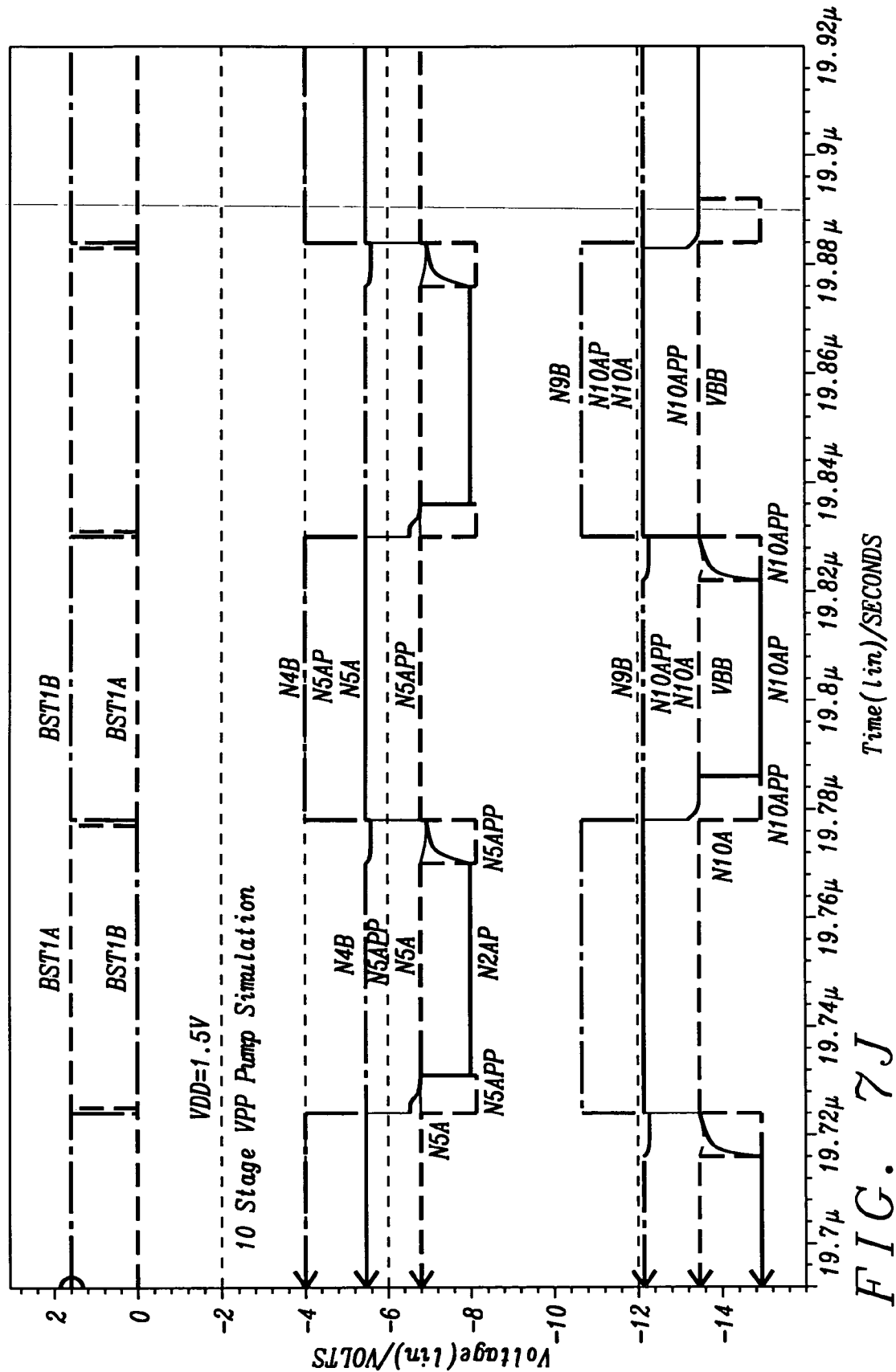

FIGS. 7I & 7J A ten CP-stages voltage multiplier simulation with positive output voltage displaying the control clock signals BST1A and BST1B and the output voltage VBB either separately for a longer time or together with a group of voltages, during a shorter time but with higher resolution, for the following nodes: N4B, N5A, N5AP, and N5APP as well as N9B, N10A, N10AP, and N10APP.

Some general observations, an interpretation of simulation results and concluding remarks shall now finalize the specification of the current invention:

1. It is understood that the proposed embodiments with three CP-stages particularly shown, described and explained above are chosen only as a demonstration for the teachings and ideas of this invention. The teachings and ideas of the proposed schemes can therefore also be applied to voltage multiplier circuits with an arbitrary n CP-stage implementation for specific high voltage generators, where n is a positive integer (n=1,2,3,4 . . . N). Several hints and remarks to this conclusion have already been given above.

2. For a one CP-stage voltage multiplier circuit implemented with teachings of this invention simulated maximum current efficiency values can approach 48.5%. The maximum voltage to which the proposed one CP-stage circuit can boost its output is about 2.87V if VDD=1.5V.

3. For a two CP-stage voltage multiplier circuit implemented with teachings of this invention simulated maximum current efficiency values can approach 32.7%. The maximum voltage to which the proposed one CP-stage circuit can boost its output is about 4.35V if VDD=1.5V.

4. For a three CP-stage voltage multiplier circuit implemented with teachings of this invention simulated maximum current efficiency values can approach 24.1%. The maximum voltage to which the proposed one CP-stage circuit can boost its output is about 5.7V if VDD=1.5V.

5. Voltage multiplier circuits with CP-stages utilizing the proposed multi-phase control clock scheme are apt to boost local nodes (main and/or auxiliary) in order to cancel threshold voltage drop effects and thus are capable to provide a higher pumping voltage gain, to feature a lower power consumption, to operate faster at a higher clock frequency, to employ more CP-stages serially connected, and to exhibit a better reliability and quality than comparable circuits of the prior art.

6. Rules have been set-up for translating a proposed voltage multiplier circuit with multiple CP-stages providing a positive output voltage VPP obtained from a positive supply voltage VDD into another voltage multiplier circuit according to this invention with multiple CP-stages providing a negative output voltage VBB obtained from a negative supply voltage VSS or ground.

The current invention has now been electrically and technologically described and explained in great detail. Revisiting the realization as integrated circuits in triple well technology some further explaining remarks shall be added: the manufacturing process for semiconductor realizations in MOS technology is expanded by using triple well implementations for pertinent MOSFET devices, which is per se not a claim of the invention; thus resulting however in much better physical operating conditions for the pertinent MOSFET devices due to the sophisticated methods of bulk potential tracking applied for critical components. The technology used hereby is very cost effective, because the introduction of a triple-well realization for MOSFETs added to a standard MOS process comprises only a few additional production steps to make enhanced MOS transistors. Triple well MOSFET structures are employed whereby an NMOS transistor is buried in an isolated or buried P-Well, which is separated from the P-Substrate by circumferential N-Well and base forming Deep N-Well layers, thus the P-Well bulk of the buried NMOS transistor can be isolated from the P-type substrate, i.e. its voltage is not fixed to VSS any more and the potential can be set freely reducing body effect, lowering threshold voltage drop and also relaxing the gate oxide stress at the buried NMOS transistor. In triple well structures either PMOS or buried NMOS transistors can be used as capacitor configured transistors, therefore the capacitor use in positive voltage charge pump circuits or in negative voltage charge pump circuits is always possible when realized by such capacitor type MOS transistors. In general, buried NMOS as capacitor configured transistors will be used for positive voltage charge pump circuits and PMOS as capacitor configured transistors will be used for negative voltage charge pump circuits, both in order to prevent CMOS latch-up problems, because then all circuit devices are only from one kind of type, which is either NMOS or PMOS.

Note: The circuits given in FIGS. 4G-4K for high negative output voltages are preferably implemented in a triple well process technology, where the PMOS bulk (buried N-well) can be isolated from the N-type substrate. This triple well process is different from the triple well process which is used for circuits to generate high positive output voltages, as in FIGS. 4A-4F, because the substrate for circuits generating a high positive voltage is from P-type whereas the substrate for circuits generating a high negative voltage is from N-type.

Summarizing the essential features of the realization of the circuit we find, that in integrated circuit embodiments of the present invention a novel circuit and method is implemented, able to provide a large range of high positive and negative output voltages starting from relatively low positive respectively negative supply voltages or ground, wherein a lower power consumption combined with a faster dynamic response is realized and whereby the pumping efficiency is ameliorated and at the same time the CP-stage count for a targeted output voltage value is diminished which altogether meets in better reliability and quality products.

As shown in the preferred embodiments and evaluated by circuit analysis, the novel system, circuits and methods provide an effective and manufacturable alternative to the prior art.

While the invention has been particularly illustrated and described with reference to preferred embodiments thereof, it will be understood by those skilled in the art that various changes in form and details may be made without departing from the spirit and scope of the invention. Having shown and explained the principles of this invention with the aid of a given method it should also be readily apparent to those skilled in the art that the invention can be modified in arrangement and structure without departing from such principles. We therefore claim all modifications coming within the spirit and scope of the accompanying claims.

What is claimed is:

1. A charge pump circuit, with transistors of the MOSFET type each having source, drain and gate, being driven by a first set of control clock signals and a second set of control clock signals, comprising:

a first circuit part with first through third transistors driven by said first set of control clock signals;

a second circuit part with fourth through sixth transistors driven by said second set of control clock signals, both of said circuit parts together making up a first circuit stage of said charge pump circuit;

the first circuit part comprising a first input and a first output terminal having their respective voltages at said terminals, also comprising said first transistor connecting said first input and output terminals, said second transistor linked between said first input terminal and the gate of said first transistor thus defining a first node including said gate, its own gate however tied to a second node which itself is connecting to said sixth transistor and a third transistor connected with its gate to said first node and itself connecting again to said first input terminal and leading to another node within the second circuit part later on introduced and named as fourth node, the second circuit part comprising a second input and a second output terminal having their respective voltages at said terminals, also comprising said fourth transistor connecting said second input and output terminals, said fifth transistor linked between said second input terminal and the gate of said fourth transistor thus defining a third node including said gate, its own gate however tied to a fourth node which itself is connecting to said third transistor within the first circuit part, and said sixth transistor connected with its gate to said third node and itself connecting again to said second input terminal and leading to said second node within the first circuit part; and wherein the transistors are implemented as isolated MOSFET components within an Integrated Circuit (IC) realization of said charge pump circuit implementing each transistor structure as completely buried within their own bulk regions enclosed in an isolated well separated from its substrate thus allowing to electrically isolate all bulk regions for each component from the potential of the substrate of the IC realization of said charge pump circuit by using separate bulk and substrate electrodes connected to said bulk regions and said substrate respectively and whereto first and second predetermined voltage levels are respectively defined as reference values, such that the gate oxide stress for the buried MOSFET transistors is relaxed during operation.

2. The circuit according to claim 1, wherein the third transistor is fully turned on to charge the gate of the fifth transistor to the first predetermined voltage level.

3. The circuit according to claim 1, wherein the charge pump circuit is operated by the first and second sets of control clock signals such that when the second transistor is fully turned on the first transistor is partially turned on.

4. The circuit according to claim 1, wherein the charge pump circuit is operated by the first and second sets of control clock signals such that when the fourth transistor is fully turned on the sixth transistor is fully turned on.

5. The circuit according to claim 4, wherein the sixth transistor is fully turned on to charge the gate of the second transistor to the second predetermined voltage level.

6. The circuit according to claim 4, wherein the charge pump circuit is operated by the first and second sets of control clock signals such that when the fifth transistor is fully turned on the fourth transistor is partially turned on.

7. The circuit according to claim 1, wherein the first set of control clock signals includes a first clock signal, a second clock signal, and a third clock signal coupled to the first circuit part respectively by a first capacitor, a second capacitor, and a third capacitor, and the second set of control clock signals includes a fourth clock signal, a fifth clock signal, and a sixth clock signal coupled to the second circuit part respectively by a fourth capacitor, a fifth capacitor, and a sixth capacitor, both sets of control clock signals are periodic signals and are distinct from each other also by individual phase differences between corresponding clock signals.

8. The circuit according to claim 7, wherein the first capacitor is connected to the first transistor at said first output terminal, and the fourth capacitor is connected to the fourth transistor at said second output terminal.

9. The circuit according to claim 8, further comprising:
   a third circuit part with seventh through ninth transistors driven by said second set of control clock signals;
   a fourth circuit part with tenth through twelfth transistors driven by said first set of control clock signals, both of said circuit parts together making up a second circuit stage of said charge pump circuit;
   the third circuit part comprising a third input and a third output terminal having their respective voltages at said terminals, also comprising said seventh transistor connecting said third input and output terminals, said eighth transistor between said third input terminal and the gate of said seventh transistor thus defining a fifth node including said gate, its own gate however tied to a sixth node which itself is connecting to said twelfth transistor and said ninth transistor with its gate connected to said fifth node and itself connecting again to said third input terminal and leading to another node within the fourth circuit part later on introduced and named as eighth node, the fourth circuit part comprising a fourth input and a fourth output terminal having their respective voltages at said terminals, also comprising said tenth transistor connecting said fourth input and output terminals, said eleventh transistor between said fourth input terminal and the gate of said tenth transistor thus defining a seventh node including said gate, its own gate however tied to an eighth node which itself is connecting to said ninth transistor within the third circuit part and said twelfth transistor with its gate connected to said seventh node and itself connecting again to said fourth input terminal and leading to said sixth node within the third circuit part;
   whereby the third circuit part is coupled to the first circuit part by connecting said third input terminal to said first output terminal, and the fourth circuit part is coupled to the second circuit part by connecting said fourth input terminal to said second output terminal thus cascading the first circuit stage to the second circuit stage of the charge pump circuit; and
   wherein the bulk region of each transistor implemented as said isolated MOSFET component of the third circuit part is driven by the voltage at said second input terminal, and the bulk region of each transistor implemented as said isolated MOSFET component of the fourth circuit stage is driven by the voltage at said first input terminal.

10. The circuit according to claim 7, wherein the bulk region of each transistor implemented as said isolated MOSFET component of the first circuit part is driven by the first clock signal, and the bulk region of each transistor implemented as said isolated MOSFET component of the second circuit part is driven by the fourth clock signal.

11. The circuit according to claim 7, wherein the phase difference between said first clock signal and said fourth clock signal is corresponding to a half period of the first clock signal, the phase difference between the second clock signal and the fifth clock signal is corresponding to a half period of the second clock signal, and the phase difference between said third clock signal and said sixth clock signal is corresponding to a half period of the third clock signal.

12. The circuit according to claim 7, wherein each of the first to the sixth capacitors is a transistor-type capacitor.

13. The circuit according to claim 1, wherein each transistor of the first circuit stage and the second circuit stage is an N-type transistor.

14. The circuit according to claim 1, wherein each transistor of the first circuit stage and the second circuit stage is a P-type transistor.

15. The circuit according to claim 1, wherein the charge pump circuit is operated by the first and second sets of control clock signals such that when the first transistor is fully turned on the third transistor is fully turned on.

16. The circuit according to claim 1, wherein all the transistors implemented as isolated MOSFET components are realized in triple well technology.

17. A circuit, realizing a Charge Pump (CP) for high voltage generation consisting of a basic circuit structure arranged in a, versus an imaginary, that is virtual middle axis of symmetry, fundamentally symmetrical configuration and being controlled by a set of three multiphase pairs of control clock signals either as a first pair of complementary signals or as second and third pairs of signals each member signal of which is shifted by one half clock cycle versus its other member signal, comprising:
   an input stage;
   an output stage;
   one or more of twin circuit block stages, each stage of an essential four-pole or two-port character i.e. each stage made up of a pair of circuit blocks each having an input terminal and an output terminal, apart from having two additional pairs of auxiliary terminals for each of said twin circuit blocks, which themselves are built as symmetrical items mirrored to each other, each of identical structure and layout and each consisting of the same number and kind of components, therefore said input stage, said twin circuit block stages made up of a pair of circuit blocks, and said output stage thus forming an entity of multiple stages of at least three;
   one pair of parallel virtual i.e. imaginary axes intended for arranging connection points of according input and output terminals as real connections between said input stage, one or more of said twin circuit blocks and said output stage and arranged symmetrically in parallel to said virtual middle axis of symmetry located in the middle between said pair of imaginary axes for connection points; and
   thus creating a consecutive series of numbers of pairs of connection points as main nodes being situated on said pair of imaginary axes for connection points and arranged in such a way, that always each pair of main nodes is allotted to a connection of said output terminals of the preceding stage or circuit blocks and said input terminals of the subsequent stage or circuit blocks each part of said entity of input stage, one or more twin circuit block stages, and output stage for all feasible pairs of input and output terminal connections respectively and located on said pair of imaginary axes for connection points.

18. The circuit according to claim 17 wherein each of said pair of main nodes is made up of two nodes each being coupled to a capacitor configured MOSFET connected to said node with one side and fed on its other side by one, from stage to stage alternating part of said first pair of control clock signals via said capacitors respectively thus using them as coupling capacitors.

19. The circuit according to claim 17 wherein said input stage is an initial precharge stage.

20. The circuit according to claim 19 whereby said initial precharge stage comprises four MOSFET components, a pair of two input terminals, a pair of two auxiliary input terminals, a pair of two output terminals, and a supply voltage terminal fed by a supply voltage.

21. The circuit according to claim 20 wherein said supply voltage is a positive voltage.

22. The circuit according to claim 20 wherein said supply voltage is a negative voltage.

23. The circuit according to claim 20 wherein said supply voltage is the ground voltage.

24. The circuit according to claim 20 wherein said MOSFET components are of the NMOS type.

25. The circuit according to claim 20 wherein said MOSFET components are of the PMOS type.

26. The circuit according to claim 20 wherein said four MOSFET components are arranged as two pairs, the first pair of which being MOS transistors configured as diodes both connecting with its anodes to said supply voltage terminal and with its cathodes each to one of said input terminals respectively and the second pair of which being MOS transistors operating as switches both connecting with its drains to said supply voltage terminal and each with its sources separately to one of said output terminals correspondingly, their gates being connected respectively to one of said auxiliary input terminals each.

27. The circuit according to claim 20 wherein said two input terminals connect to said two output terminals each respectively and at the same time also to said first pair of main nodes respectively.

28. The circuit according to claim 17 wherein, in case of using multiple twin circuit block stages, said twin circuit block stages operate as general CP-stages and comprise as said circuit blocks two Charge Transfer Switch (CTS) devices, arranged as a symmetrical pair of identically structured CTS-devices consisting of internal nodes, MOSFETs, and terminals, whereby each CTS-device has the same number and kind of components and where both CTS-devices are symmetrically arranged as mirrored twins signifying that one CTS-device can be topologically mirrored to the other and vice-versa and whereby said twin circuit block stages operating as general CP-stages further comprise, corresponding to each of its CTS-devices respectively one pair of two input terminals, one pair of two output terminals, and also comprise said two additional pairs of auxiliary terminals for each of said twin circuit blocks which are now specified more exactly as two pairs of two pump terminals coupled to corresponding auxiliary pump nodes as well as two pairs of cross-over terminals.

29. The circuit according to claim 28 realizing each of said CTS-devices used in said general CP-stages, comprising:
a first FET, a second FET, and a third FET each having gate, source and drain;
an input terminal connected to the drains of all said three FETs;
an output terminal connected to the source of said first FET;
a first cross-over terminal;
a second crossover terminal connecting to the source of said second FET;
a first pump terminal connecting to the source of said third FET as well as to the gates of said first FET and said second FET; and
a second pump terminal connecting to said first crossover terminal as well as to the gate of said third FET.

30. The circuit according to claim 28 wherein each of said twin circuit block stages are operating as general CP-stages and each comprising said two pairs of two pump terminals connecting with said pump terminals to corresponding pairs of multiphase control clock signals via coupling capacitors thus realizing two pairs of auxiliary pump nodes related to each CP-stage whereby said corresponding pairs of multiphase control clock signals are taken respectively from said set of multiphase control signals in such a way, that for odd numbered CP-stages these are pairs of direct control signals, and for even numbered CP-stages these are control signals shifted by one half clock cycle compared to the direct control signals.

31. The circuit according to claim 28 whereby each CTS-device exhibits six terminals, one input terminal, one output terminal, two pump terminals as well as a first cross-over terminal and a second cross-over terminal and both of said CTS circuit blocks are conjoined in such a way, that they are cross-over connected by their respective cross-over terminals which means that a first cross-over terminal from one CTS-device is connected to a second cross-over terminal from the other CTS-device respectively.

32. The circuit according to claim 28 whereby a first general CP-stage is being connected with its pair of input terminals to the first pair of said main nodes and with its pair of output terminals to the second pair of said main nodes, each respectively and whereby said pairs of pump terminals connect to said corresponding auxiliary pump nodes respectively.

33. The circuit according to claim 32 whereby a second general CP-stage is being connected with its pair of input terminals to the second pair of said main nodes and with its pair of output terminals to the third pair of said main nodes, each respectively and whereby said pairs of pump terminals connect to said corresponding auxiliary pump nodes respectively.

34. The circuit according to claim 33 whereby a third general CP-stage is being connected with its pair of input terminals to the third pair of said main nodes and with its pair of output terminals to the fourth pair of said main nodes, each respectively and whereby said pairs of pump terminals connect to said corresponding auxiliary pump nodes respectively.

35. The circuit according to claim 28 wherein an arbitrary number of general CP-stages are being connected serially to said pairs of main nodes, which signifies that their pairs of input terminals connect to one pair of said main nodes and their pairs of output terminals connect to the following pair of said main nodes, each respectively and whereby said pairs of pump terminals connect to said corresponding auxiliary pump nodes respectively.

36. The circuit according to claim 28 whereby a last general CP-stage is being connected with its pair of input terminals to the last existent pair of said main nodes and with its pair of output terminals to said pair of input terminals of said output stage, each respectively and whereby said pairs of pump terminals connect to said corresponding auxiliary pump nodes respectively depending on its odd or even numbering count.

37. The circuit according to claim 17 wherein said output stage comprises two input terminals and an output voltage terminal.

38. The circuit according to claim 37 whereby said output stage further comprises a load capacitor connected between said output voltage terminal and ground.

39. The circuit according to claim 37 whereby said two input terminals of said output stage are both connected directly to said output voltage terminal of said output stage.

40. The circuit according to claim 37 whereby said two input terminals of said output stage both connect individually but respectively to said pair of output terminals of the last CP-stage located on said pair of imaginary axes for connection points comprising all feasible pairs of input and output terminal connections respectively.

41. The circuit according to claim 17 manufactured as Integrated Circuit (IC) in monolithic MOS technology.

42. The circuit according to claim 17 manufactured as Integrated Circuit (IC) in MOS technology using a triple-well process.

43. The circuit according to claim 42 comprising only PMOS components.

44. The circuit according to claim 42 comprising only NMOS components.

45. The circuit according to claim 29 wherein said CTS devices used in said general CP-stages comprise FETs consisting of MOS transistors fabricated in triple well technology, each endowed with a separate bulk voltage connection terminal for each MOSFET and each such bulk voltage connection terminal able to be separately used in order to set the related bulk potential.

46. The circuit according to claim 45, in case of an implementation with more than two of said general CP-stages, where each of said separate bulk voltage connection terminals of said MOS transistors for every CTS device of each CP-stage is commonly connected to anteceding main nodes in such a way that alternately CTS devices located above said virtual middle line are connecting their bulk voltage connection terminals to anteceding main nodes located below said virtual middle line and vice-versa, starting out with even numbered stage two as first CP-stage, followed by odd-numbered CP-stage three, now connecting said bulk voltage connection terminals of its CTS device located below said virtual middle line to anteceding main node located above said virtual middle line and vice-versa and so on, thus establishing a leap-frog bulk potential tracking method, whereby the odd-numbered CP-stage one, not having any anteceding main node connects said separate bulk voltage connection terminals of said MOS transistors directly with said first pair of complementary multiphase control signals.

47. A method for implementing a Charge Pump (CP) Circuit for high voltage generation devices with multiphase control clock signals and with multiple CP-stages implemented as MOS transistor components and realized as an Integrated Circuit (IC) fabricated in MOS technology, comprising the steps of:
providing a basic circuit structure built up as a series connection of an initial stage and one or more following twin circuit block stages operating as CP-stages, each stage of an essential four-pole or two-port character wherein each stage has a pair of input terminals and a pair of output terminals, apart from additional pairs of auxiliary and pump signal terminals for each of the twin circuit blocks;
arranging said basic circuit structure in a, versus a virtual middle line, fundamentally symmetrical configuration exhibiting two parallel rails of virtual connection lines each endowed with a consecutive series of pairs of main nodes whereby all upper parts of said pairs located above said virtual middle line are designated as A-parts, all lower parts located below said virtual middle line as B-parts;
defining "connect directly" as connecting A-part items to A-part items and B-part items to B-part items as well as "connect cross-over" as connecting A-part items to B-part items and vice-versa; and translating this terminology also to other possible actions;
furnishing a set of three pairs of multiphase control clock signals, whereby direct A-part signals are shifted by one half clock cycle compared to B-part signals or vice-versa by designation and each pair is individually named as primary, secondary and tertiary;
providing for each of said main nodes a corresponding coupling capacitor realized as MOSFET in capacitor configuration and fed by associated primary control clock signals out of said set;
providing for auxiliary nodes connecting to each of said auxiliary and said pump signal terminals another corresponding coupling capacitor realized as MOSFET in capacitor configuration and fed by associated secondary and tertiary control clock signals out of said set;
providing as twin circuit block stage a general symmetrically cross-over connected Charge Pump (CP)-stage made up of a pair of symmetrically arranged Charge Transfer Switch (CTS) circuit blocks, also named A-part and B-part CTS blocks, whereby these A-part and B-part blocks are identical in structure and assembly of components only differing in their layouts which are mirrored to each other, thus both also designated commonly as CTS parts;
providing as said CTS circuit block an assembly of three MOSFETs, having one input terminal, one output terminal, a pair of auxiliary terminals named first and second, and another pair of pump signal terminals named first and second and all terminals named additionally as CTS part related;
connecting cross-over said pairs of first and second auxiliary terminals of each of said pair of CTS circuit blocks thus making up a symmetrically cross-over connected CP-stage in such a way, that first A-part auxiliary terminal links to second B-part auxiliary terminal and vice-versa;
connecting said pairs of input and output terminals of said general symmetrically cross-over connected CP-stages to said consecutive series of main nodes on each virtual connection line in such a way, that a real serial connection of all of said CP-stages is guaranteed according to their four-pole or two-port character; one main node on each A- and B-part rail arranged as consecutive pairs connects to said pair of input terminals from one CP-stage respectively and the next main node on each A- and B-part rail connects to said pair of output terminals belonging together to said one CP-stage respectively, in order to now guarantee a serial connection of CP-stages also said pair of input terminals of the following CP-stage is connecting to this same pair of main nodes (to A- and B-part main nodes respectively) and so on for all following stages and main node connections; and
feeding said two pairs of auxiliary nodes connecting to said pump signal terminals by pairs of secondary and tertiary control clock signals respectively.

48. The method according to claim 47 comprising additional steps for optimizations concerning the reduction of power consumption and transfer losses during charge transfer, as well as maximizing the conversion efficiency by choosing a six part segmentation for said three pairs of multiphase control signals defining time segments T1 to T6, and by choosing the specification of the related control signal transition voltage window limits adapted to its desired output voltage generated in such a way, that the highest voltage available in an external system serves as upper limit when generating a high positive voltage and the lowest voltage available in an external system serves as lower limit when generating a high negative voltage.

49. The method according to claim 47 where the step of providing as said CTS circuit block an assembly of three MOSFETs, having one input terminal, one output terminal, a pair of auxiliary terminals named first and second, and another pair of pump signal terminals named first and second and all terminals named additionally as CTS part related, comprises MOSFETs consisting of MOS transistors fabricated in triple well technology, each endowed with a separate bulk voltage connection terminal and each terminal separately added to the number of auxiliary terminals of said CTS circuit blocks.

50. The method according to claim 49, in case of an implementation with more than two of said CP-stages, where each of said separate bulk voltage connection terminals of said MOS transistors for every CTS block of each CP-stage are commonly connected to anteceding main nodes in such a way that A-part and B-part CTS blocks are alternately connecting to B-part and A-part anteceding main nodes and vice-versa, starting out with even numbered stage two as first CP-stage, followed by odd-numbered CP-stage three and so on, thus establishing said leap-frog bulk potential tracking method, whereby the odd-numbered CP-stage one, not having any anteceding main node connects said separate bulk voltage connection terminals of said MOS transistors to the respective primary pair of multiphase control signals directly, observing directly also the A and B-part CTS block relations.

* * * * *